(12) United States Patent
Coffey et al.

(10) Patent No.: US 7,759,415 B2
(45) Date of Patent: *Jul. 20, 2010

(54) METHOD TO MAKE AN ARTICLE COMPRISING POLYMER CONCENTRATE

(75) Inventors: James N. Coffey, League City, TX (US); Wen Li, Houston, TX (US); Bryan R. Chapman, Annandale, NJ (US); Bruce R. Lundmark, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 954 days.

This patent is subject to a terminal disclaimer.

(21) Appl. No.: 11/408,084

(22) Filed: Apr. 19, 2006

(65) Prior Publication Data

US 2006/0247332 A1    Nov. 2, 2006

Related U.S. Application Data

(63) Continuation-in-part of application No. 11/118,925, filed on Apr. 29, 2005, now Pat. No. 7,662,885, which is a continuation-in-part of application No. 10/640,435, filed on Aug. 12, 2003, now Pat. No. 7,619,026.

(60) Provisional application No. 60/402,665, filed on Aug. 12, 2002.

(51) Int. Cl.
    *C08J 3/20* (2006.01)
(52) U.S. Cl. ...................................... 523/351
(58) Field of Classification Search .................. 523/351
    See application file for complete search history.

(56) References Cited

U.S. PATENT DOCUMENTS

| | | | |
|---|---|---|---|
| 3,201,364 A | 8/1965 | Salyer | |
| 3,415,925 A | 12/1968 | Marans | |
| 4,073,782 A | 2/1978 | Kishi et al. | |
| 4,132,698 A | 1/1979 | Gessler et al. | |
| 4,170,586 A | 10/1979 | Clampitt et al. | |
| 4,210,570 A | 7/1980 | Trotter et al. | |
| 4,325,850 A | 4/1982 | Mueller | |
| 4,483,886 A | 11/1984 | Kowalski | |
| 4,536,537 A | 8/1985 | Klingensmith et al. | |
| 4,604,322 A | 8/1986 | Reid | |
| 4,645,791 A | 2/1987 | Theodore et al. | |
| 4,774,277 A | 9/1988 | Janac et al. | |
| 4,960,820 A | 10/1990 | Hwo | |
| 5,482,780 A | 1/1996 | Wilkie et al. | |
| 5,834,562 A | 11/1998 | Silvestri et al. | |
| 5,869,555 A | 2/1999 | Simmons et al. | |
| 5,912,296 A * | 6/1999 | Wang et al. | .................. 524/534 |
| 6,069,196 A | 5/2000 | Akao et al. | |
| 6,372,847 B1 | 4/2002 | Wouters | |
| 6,448,349 B1 | 9/2002 | Razavi | |
| 6,465,109 B2 | 10/2002 | Ohtsuka | |
| 6,515,231 B1 | 2/2003 | Strobech et al. | |
| 6,632,385 B2 | 10/2003 | Kauschke et al. | |
| 6,653,385 B2 | 11/2003 | Wang et al. | |
| 6,730,754 B2 | 5/2004 | Resconi et al. | |
| 6,803,103 B2 | 10/2004 | Kauschke et al. | |
| 6,858,767 B1 | 2/2005 | DiMaio et al. | |
| 6,887,944 B2 | 5/2005 | Wakabayashi et al. | |
| 6,992,131 B2 | 1/2006 | Faissat et al. | |
| 7,271,209 B2 * | 9/2007 | Li et al. | ...................... 524/284 |
| 7,294,681 B2 | 11/2007 | Jiang et al. | |
| 7,319,077 B2 | 1/2008 | Mehta et al. | |
| 7,365,137 B2 | 4/2008 | Resconi et al. | |
| 7,476,710 B2 | 1/2009 | Mehta et al. | |
| 7,524,910 B2 | 4/2009 | Jiang et al. | |
| 2002/0050124 A1 | 5/2002 | Jaeger | |
| 2003/0060525 A1 | 3/2003 | Gupta | |
| 2003/0204017 A1 | 10/2003 | Stevens et al. | |
| 2004/0030287 A1 | 2/2004 | Matthijs et al. | |
| 2004/0054040 A1 | 3/2004 | Lin et al. | |
| 2004/0091631 A1 | 5/2004 | Belli et al. | |
| 2004/0106723 A1 | 6/2004 | Yang et al. | |
| 2004/0186214 A1 | 9/2004 | Li et al. | |
| 2004/0249046 A1 | 12/2004 | Abhari et al. | |
| 2004/0260001 A1 | 12/2004 | Lin et al. | |
| 2005/0106978 A1 | 5/2005 | Cheng et al. | |
| 2006/0178483 A1 | 8/2006 | Mehta et al. | |
| 2006/0183860 A1 | 8/2006 | Mehta et al. | |

FOREIGN PATENT DOCUMENTS

EP    0 168 923    1/1986

(Continued)

OTHER PUBLICATIONS

Chemical Additives for Plastics Industry, entitled "Plasticizers", Radian Corp., Noyes Data Corporation, New Jersey, pp. 107-116, 1987.
Maltby et al., Slip Additives for film Extrusion, Journal of Plastic Film & Sheeting, 1998, vol. 14, pp. 111-120.
Chemical Additives for the Plastics Industry, Radian Corporation, 1987, pp. 107-116.
Rubber Technology Handbook, Werner Hoffman, Hanser Publishers, New York, 1989, pp. 294-305.
Additives for Plastics, J. Stepek and H. Daoust, Springer Verlag, New York, 1989, pp. 6-69.

(Continued)

*Primary Examiner*—Edward J Cain
(74) *Attorney, Agent, or Firm*—Catherine L. Bell

(57) ABSTRACT

This invention relates to a method to make an article comprising the steps of combining a semi-amorphous polymer having a heat of fusion of less than 70 J/g with a plasticizer and optionally one or more additives, to produce a polymer concentrate, combining the polymer concentrate with one or more final materials to produce an article precursor; and forming the article at least partially from the article precursor, wherein the polymer concentrate preferably shows no visible phase separation as demonstrated by the polymer concentrate having no visually detectable loss of the plasticizer after a portion of the polymer concentrate is aged on an absorbent surface for 24 hours at 25° C. An article produced by the method is also disclosed.

89 Claims, No Drawings

FOREIGN PATENT DOCUMENTS

| | | |
|---|---|---|
| EP | 0 240 563 | 10/1987 |
| EP | 0 300 689 | 1/1989 |
| EP | 0 448 259 | 9/1991 |
| EP | 0 565 073 | 10/1993 |
| EP | 0 315 363 | 1/1994 |
| EP | 0 604 917 | 7/1994 |
| EP | 0 774 347 | 5/1997 |
| EP | 1 028 145 | 8/2000 |
| EP | 1 201 406 | 5/2002 |
| EP | 1 342 249 | 1/2009 |
| FR | 2 094 870 | 3/1972 |
| GB | 977113 | 2/1964 |
| GB | 1108298 | 4/1968 |
| GB | 1329915 | 9/1973 |
| GB | 1352311 | 5/1974 |
| JP | 69-029554 | 12/1969 |
| JP | 01-282280 | 11/1989 |
| JP | 06316659 | 11/1994 |
| JP | 07-292167 | 11/1995 |
| JP | 08-067782 | 3/1996 |
| JP | 09-208761 | 8/1997 |
| JP | 11-012402 | 1/1999 |
| WO | WO 97/33921 | 9/1997 |
| WO | WO 98/44041 | 10/1998 |
| WO | WO 01/18109 | 3/2001 |
| WO | WO 02/18487 | 3/2002 |
| WO | WO 02/31044 | 4/2002 |
| WO | WO 03/048252 | 6/2003 |
| WO | WO 03/083003 | 10/2003 |
| WO | WO 2004/014997 | 2/2004 |
| WO | WO 2004/014998 | 2/2004 |
| WO | WO 2005/014872 | 2/2005 |
| WO | WO 2007/048422 | 5/2007 |

OTHER PUBLICATIONS

Rudnick et al., Synthetic Lubricants and High-Performance Functional Fluids, Second Edition, Marcel Dekker, Inc., New York, 1999, pp. 3-52 and 409-411.

Jens Stehr, Investigation of the Effects of Poly(α-olefin) Plasticizers on the Properties of Elastomers. KGK, Jan./Feb. 2007, pp. 14-19 (translated from German by McElroy Translation Company.

* cited by examiner

METHOD TO MAKE AN ARTICLE COMPRISING POLYMER CONCENTRATE

CROSS REFERENCE TO RELATED APPLICATION

This application is a continuation-in-part of Non-Provisional application Ser. No. 11/118,925, filed Apr. 29, 2005, now U.S. Pat. No. 7,662,885 which is a continuation-in-part of U.S. application Ser. No. 10/640,435 filed Aug. 12, 2003, now U.S. Pat. No. 7,619,026 which claims priority to and the benefit of U.S. Provisional Application No. 60/402,665, filed Aug. 12, 2002.

FIELD OF THE INVENTION

This invention relates to a method to make an article comprising combining a polymer with a polymer concentrate. The invention also relates to a polymer concentrate, also known as a masterbatch, and a process of making the polymer concentrate.

BACKGROUND OF THE INVENTION

Polyolefins are widely used in a number of everyday articles, machines, consumer goods, and the like. Polyolefins are relatively inexpensive to produce and are capable of providing a number of useful functions. Polyolefins may be formed into various shapes, films, laminates, and the like. Polyolefins may be coated on, or co-extruded with various substrates. Polyolefins may also be combined with other materials to form a structure having a plurality of layers, each layer having a specific purpose. Laminates, for example, may comprise a plurality of layers, such as a configurationally rigid core layer, an outer liquid-tight layer, an oxygen gas barrier such as a mid-layer of aluminum foil, and/or other layers depending on application needs.

However, polyolefins may have relatively high glass transition temperatures. This may render various polyolefins brittle, inflexible, and thus unsuitable for particular uses, particularly uses at lower temperatures. Many applications of polyolefins would benefit from a polyolefin having useful properties over a wide range of temperatures, and under a variety of conditions. Such useful properties may include both high and low temperatures performance in the areas of impact strength, toughness, flexibility, and the like. One way in which such properties may be obtained is by the addition of plasticizers to polyolefins.

Examples of the addition of plasticizers to polyolefins may be found, for example, in U.S. Pat. Nos. 4,960,820, 4,132,698, 3,201,364, and in WO 02/31044, WO 01/18109, and EP 0 300 689. These and other references are directed to the addition of functionalized plasticizers to polyolefins. Examples of functionalized plasticizers include mineral oils containing aromatic groups. These exampled fail to provide improvements in impact strength, transparency, and other properties of polyolefins. Other references which are directed to the addition of plasticizers to polyolefins include EP 0 448 259, EP 1 028 145, U.S. Pat. Nos. 4,073,782, and 3,415,925.

It would be desirable to utilize compounds such as paraffins to plasticize polyolefins. However, such an approach is taught to be counter to producing improved polyolefins (See e.g., Chemical Additives for Plastics Industry 107-116 (Radian Corp., Noyes Data Corporation, NJ 1987); and WO 01/18109 A1.)

U.S. patent application Ser. No. 10/716,306, filed Feb. 19, 2004 published as US2005-0106978 is directed to a plasticized polyolefin composition comprising one or more polyolefins and one or more non-functionalized plasticizers. The plasticized polyolefins produced are reported to comprise improved softness, better flexibility (lower flexural modulus), a depressed glass transitions temperature, and/or improved impact strength when compared to plasticized polyolefins known in the art. Likewise, WO 04/014998, WO 04/014997, WO 2005014872, US2004/0186214, US2004/0260001, and US2004/0054040 also disclose combinations of polyolefins with non-functionalized plasticizers.

However, a need remains for facile incorporation of plasticizers into polyolefins. Plasticizers are often liquids. On the other hand, polyolefins are typically formulated, compounded, and/or combined as solids or partially molten semi-solids in extruders, mixers, kneaders, and the like. Such processes are not readily amenable to addition of liquids. Addition of liquids to an extruder, for example, may require utilization of metering pumps and extruder configurations in opposite to those useful to produce polyolefin articles of commerce. Accordingly, there remains a need for a method by which plasticizers may be incorporated into polyolefin compositions wherein the plasticizers are in a solid form that is flowable.

SUMMARY OF THE INVENTION

This invention relates to a method to make an article comprising:
  combining a semi-amorphous polymer having a heat of fusion of less than 70 J/g with a plasticizer and optionally one or more additives, to produce a polymer concentrate;
  combining the polymer concentrate with one or more polymers to produce an article precursor; and
  forming the article at least partially from the article precursor.

This invention further relates to a method to make an article comprising:
  combining a semi-amorphous polymer having a heat of fusion of less than 70 J/g with a semi-crystalline polymer having a melting point of 100° C. or greater, and optionally one or more additives, with a non-functionalized plasticizer to produce a polymer concentrate, pelletizing the polymer concentrate into a plurality of free flowing particles;
  combining at least a portion of the particles of the polymer concentrate with one or more polymers to produce an article precursor; and
  forming the article at least partially from the article precursor.

In a preferred embodiment, the semi-amorphous polymer comprises 55 to 95 mole % of a first alpha olefin having 2 to 6 carbon atoms (preferably propylene), and 5 to 45 mole % of at least one comonomer comprising an alpha-olefin having 2 to 6 carbon atoms which is different from the first alpha olefin (preferably ethylene), and where the semi-amorphous polymer has a heat of fusion of less than 45 joules per gram, and preferably has an mm triad tacticity index of 75% or greater.

In another preferred embodiment, the semi-amorphous polymer comprises 55 to 95 mole % of a first alpha olefin having 2 to 4 carbon atoms (preferably ethylene), and 5 to 45 mole % of at least one comonomer comprising an alpha-olefin having 2 to 10 carbon atoms which is different from the first alpha olefin (preferably butene, hexene, or octene), and where the semi-amorphous polymer has a heat of fusion of less than 60 joules per gram, and a melting point of 80° C. or less.

In another preferred embodiment, the polymer concentrate shows no visible phase separation as demonstrated by the polymer concentrate having no visually detectable loss of the plasticizer on an absorbent surface, after a portion of the polymer concentrate is aged on the absorbent surface for 24 hours at 25° C.

In another preferred embodiment the plasticizer has a VI of 120 or more and a pour point of −10° C. or less. In yet another preferred embodiment, the plasticizer has a specific gravity of 0.86 or less and a flash point of 200° C. or more. In a particularly preferred embodiment, the plasticizer has all four of these properties.

An article produced according to the above methods is also disclosed. These and other features, aspects and advantages of the present invention will become better understood with reference to the following description and claims.

This invention also relates to a process to make an article comprising combining an elastomer and at least 10 wt % semi-crystalline polymers (preferably at least 20 wt %, preferably 30 wt %, based upon the weight of the elastomer and the semi-crystalline polymer) with an NFP having a VI of 120 or more and a pour point of −10 degc or less, and a specific gravity of less than 0.86 to form a concentrate, thereafter combining the concentrate with a polymer to form an article precursor and thereafter forming an article from the precursor. Useful elastomers include olefin based elastomers such ethylene-propylene rubbers, ethylene-propylene-diene-monomer rubbers and styrenic block copolymers, and the like.

DETAILED DESCRIPTION

Definitions

For the purposes of this invention and the claims thereto, and for ease of reference herein, when a polymer is referred to as comprising an olefin, the olefin present in the polymer is the polymerized form of the olefin. Likewise the use of the term polymer is meant to encompass homopolymers and copolymers. In addition the term copolymer includes any polymer having 2 or more chemically distinct monomers, and encompasses interpolymers and block copolymers of 2 or more chemically distinct monomer types.

Thus, as used herein, the term "polypropylene" means a polymer made of at least 50 mole % (preferably at least 60 mole %, more preferably at least 70 mole %, more preferably at least 80 mole %, even more preferably at least 90 mole %, even more preferably at least 95 mole % or 100 mole %) propylene units; and having less than 35 wt % ethylene units. Thus, a propylene polymer as it is defined here can not be an EP Rubber as defined below. If present, the comonomers in a polypropylene copolymer are preferably chosen from among ethylene and $C_4$ to $C_{24}$ olefins.

Also, as used herein, the term "polyethylene" means a polymer made of at least 50 mole % (preferably at least 60 mole %, more preferably at least 70 mole %, more preferably at least 80 mole %, even more preferably at least 90 mole %, even more preferably at least 95 mole % or 100 mole %) ethylene units; and having less than 20 wt % propylene units. Thus, an ethylene polymer as it is defined here can not be an EP Rubber as defined below. If present, the comonomers in a polyethylene copolymer are preferably chosen from $C_3$ to $C_{24}$ olefins.

For purposes of this invention and the claims thereto, an EP Rubber is defined to be a copolymer of ethylene and propylene, and optionally diene monomer(s), where the ethylene content is from 35 to 80 wt %, the diene content is 0 to 15 wt %, and the balance is propylene with a minimum propylene content of 20 wt %; and where the copolymer has a Mooney viscosity, ML(1+4) @ 125° C. (measured according to ASTM D1646) of 15 to 100.

For ease of reference, polypropylene is abbreviated PP, isotactic polypropylene is abbreviated iPP, syndiotactic polypropylene is abbreviated sPP.

Unless noted otherwise:

Percents express a weight percent (wt %), based on the total amount of the material or component at issue;

Kinematic viscosity (KV), also referred to merely as viscosity, is expressed as centistokes (cSt) and is determined at the temperature specified according to ASTM D445;

Glass transition temperature (Tg) is determined according to ASTM E 1356 using the midpoint temperature convention;

Distillation range is determined according to ASTM D 86;

Initial boiling point and final boiling point are each determined according to ASTM D 86;

Pour point is determined according to ASTM D 97;

Specific gravity is determined according to ASTM D 4052, 15.6° C.;

Weight average molecular weight (Mw), number average molecular weight (Mn), and z average molecular weight (Mz) are each determined utilizing gel permeation chromatography (GPC);

Molecular weight distribution (MWD) is defined as the weight average molecular weight divided by the number average molecular weight (Mw/Mn);

Flash point is determined according to ASTM D 92;

Dielectric constant is determined at 1 kHz, 20° C.;

Density is determined according to ASTM 4052, 15.6° C.; and

Viscosity index is determined according to ASTM D-2270.

Upper and lower limitations on physical properties and process conditions may comprise any combination of those limits recited in any combination herein for a particular component, compound, composition, and/or process.

For purposes of this disclosure, the term oligomer refers to compositions having 2-40 mer units and the term polymer refers to compositions having 41 or more mer units. A mer is defined as a unit of an oligomer or polymer that originally corresponded to the monomer(s) used in the oligomerization or polymerization reaction. For example, the mer of polyethylene would be ethylene. For simplicity, when polymers are referred to, the reference may also apply to oligomers, unless specifically noted otherwise. Accordingly, the term polymer and oligomer may be referred to interchangeably herein, unless otherwise specified. In addition, unless otherwise stated, the term "polymer" may include both homopolymers (i.e., a polymer comprising essentially one monomer), and/or copolymers (i.e., a polymer comprising more than one monomer.)

For purposes of this invention an oligomer is defined to have an Mn of less than 21,000 g/mol, preferably less than 20,000 g/mol, preferably less than 19,000 g/mol, preferably less than 18,000 g/mol, preferably less than 16,000 g/mol, preferably less than 15,000 g/mol, preferably less than 13,000 g/mol, preferably less than 10,000 g/mol, preferably less than 5000 g/mol, preferably less than 3000 g/mol.

The terms "semi-crystalline polymer" and "semi-crystalline polyolefin" may be used interchangeably herein, and are defined to be an olefin polymer having a melting point (Tm) of 100° C. or greater. Melting point is measured by differential scanning calorimetry (DSC) second melt, as described herein.

The terms "semi-amorphous polymer" and "semi-amorphous polyolefin" may be used interchangeably herein, and are defined to be an olefin polymer having a heat of fusion of 70 J/g or less (preferably between 0.5 and 70 J/g, more preferably between 2 and 60 J/g, even more preferably between 3 and 50 J/g, as determined by DSC, described herein), and a melting point (first melt) of less than 100° C. (preferably less than 90° C., more preferably less than 80° C., even more preferably less than 70° C. and preferably greater than 0° C., preferably greater than 10° C., preferably greater than 20° C., preferably greater than 30° C., preferably greater than 35° C., preferably greater than 40° C.).

For purposes of this invention, the term "elastomer" is defined to be a polymer having an Hf of 0.5 j/g or less or an unmeasureable J/g and a melting point (second melt, if one can be measured) of less than 0° C.

By heterogeneous composition it is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using optical microscopy, scanning electron microscopy (SEM) or atomic force microscopy (AFM), in the event the optical microscopy, SEM and AFM provide different data, then the SEM data shall be used. By continuous phase is meant the matrix phase in a heterogeneous blend. By discontinuous phase is meant the dispersed phase in a heterogeneous blend.

By homogeneous composition it is meant a composition having substantially one morphological phase in the same state. For example, a blend of two polymers where one polymer is miscible with another polymer is said to be homogeneous in the solid state. Such morphology is determined using optical microscopy, scanning electron microscopy (SEM) or atomic force microscopy (AFM), in the event the optical microscopy, SEM and AFM provide different data, then the SEM data shall be used. Miscible may also include a blend of two or more polymers that exhibits single-phase behavior for the glass transition temperature, e.g. the Tg would exist as a single transition temperature on the DMTA trace. By contrast, two separate transition temperatures would be observed for an immiscible blend, typically corresponding to the temperatures for each of the individual components of the blend. Thus in an embodiment, a polymer blend is miscible when there is one Tg indicated on the DMTA trace. A miscible blend is homogeneous, while an immiscible blend is heterogeneous.

For the purposes of this invention and the claims thereto, a propylene copolymer useful in the present invention may comprise propylene, and at least one additional olefinic component. Accordingly, the propylene copolymer of the present invention may include propylene and a plurality of other monomers in polymerized form. A preferred semi-amorphous propylene copolymer of the present invention, which is described in detail below, may be referred to as a random copolymer of propylene, a random copolymer of propylene and ethylene (wherein ethylene is the comonomer), or as a propylene-ethylene plastomer.

For purposes of this invention and the claims thereto, the term paraffin includes all isomers such as normal paraffins (n-paraffins), branched paraffins, isoparaffins, cycloparaffins, and may include cyclic aliphatic species, and blends thereof, and may be derived synthetically by means known in the art, or from refined crude oil in such a way as to meet the requirements described for desirable modifiers described herein. The term isoparaffin means that the paraffin chains possess $C_1$ to $C_{18}$ (more commonly $C_1$ to $C_{10}$) alkyl branching along at least a portion of each paraffin chain, and may include cycloparaffins with branched side chains as a minor component. More particularly, isoparaffins are saturated aliphatic hydrocarbons whose molecules have at least one carbon atom bonded to at least three other carbon atoms or at least one side chain (i.e., a molecule having one or more tertiary or quaternary carbon atoms); various isomers of each carbon number (i.e., structural isomers) will typically be present. Isoparaffins may also include cycloparaffins with branched side chains, generally as a minor component of the isoparaffin. Isoparaffins with multiple alkyl branches may include any combination of regio and stereo placement of those branches.

For purposes of the present invention and the claims thereto, the term mineral oil includes any fluid derived from petroleum crude oil that has been subjected to refining steps (such as distillation, solvent processing, hydroprocessing, and/or dewaxing). This also includes petroleum-based oils that are extensively purified and/or modified through severe processing treatments. It excludes synthetic oils, which have been manufactured by combining monomer units using catalysts and/or heat. In the polymer processing art, mineral oils are often called process oils, extender oils, white oils, technical oils, or food grade oils. Such fluids typically have a viscosity index less than 120, most have a viscosity index less than 110, and many have a viscosity index of 100 or less.

For purposes of this invention and the claims thereto, Group I, II, and III basestocks are defined to be mineral oils having the following properties:

|  | Saturates (wt %) | Sulfur (wt %) | Viscosity Index |
| --- | --- | --- | --- |
| Group I | <90 &/or | >0.03% & | ≧80 & <120 |
| Group II | ≧90 & | ≦0.03% & | ≧80 & <120 |
| Group III | ≧90 & | ≦0.03% & | ≧120 |

Saturates content, sulfur content, and Viscosity Index are measured following ASTM D2007, ASTM D2622, and ASTM D2270, respectively. Even in cases where a mineral oil is not identified by a Group classification, it is still possible to categorize it into one of two classes based on Viscosity Index: Group I/II mineral oils, which have VI less than 120; and Group III mineral oils, which have VI of 120 or more.

For purposes of this invention and the claims thereto, Group IV basestocks are defined to be polyalphaolefins, which are hydrocarbon liquids manufactured by the catalytic polymerization of linear alpha-olefins having 5 or more carbon atoms, preferably 6 or more carbon atoms, preferably 8 or more carbon atoms. The polyalphaolefins may be characterized by any degree of tacticity, including isotacticity or syndiotacticity, and/or may be atactic. In another embodiment the polyalphaolefin has more than 50% meso dyads as measured by $^{13}$C-NMR, preferably more than 60%. In another embodiment the polyalphaolefin has more than 50% racemic dyads as measured by $^{13}$C-NMR, preferably more than 60%.

For purposes of this invention and the claims thereto, when melting or crystallization point is referred to and there is a range of melting or crystallization temperatures, the melting or crystallization point is defined to be the peak melting or crystallization temperature from a differential scanning calorimetry (DSC) trace, and, unless noted otherwise, when there is more than one melting or crystallization peak, it refers to the peak melting or crystallization temperature for the largest peak among principal and secondary melting peaks, as opposed to the peak occurring at the highest temperature, thereby reflecting the largest contribution to the calorimetric response of the material.

Polymer Concentrate

The polymer concentrate of the present invention preferably comprises a plasticizer in combination with a semi-amorphous polymer. The semi-amorphous polymer may include a polymer or blend of polymers, at least one of which is at least partially amorphous (particularly having a heat of fusion of less than 70 J/g) and preferably partially crystalline (e.g. having an mm triad tacticity index of 75% or more) to which the plasticizer, and optionally other additives are mixed with, blended with, incorporated within, and the like.

A polymer concentrate may comprise one or more semi-amorphous polyolefins in combination with one or more plasticizers, preferably one or more non-functionalized plasticizers.

Concentrate blends (e.g., a masterbatch) containing relatively large amounts of plasticizer (i.e., at least about 5 wt %, preferably at least about 10 wt %, preferably at least about 20 wt %, preferably at least about 30 wt %, preferably at least about 40 wt %, preferably at least about 50 wt %, preferably at least about 60 wt %, preferably at least about 70 wt %, preferably at least about 80 wt %, preferably at least about 90 wt %) may be obtained by mixing the semi-amorphous polymer, preferably in a molten or partially molten state, with the plasticizer in a mixing apparatus, preferably a single or twin screw extruder, under high shear conditions. Typically the shear rate is 100 sec$^{-1}$ or more, preferably 200 sec$^{-1}$ or more, 300 sec$^{-1}$ or more, 400 sec$^{-1}$ or more up to 2000 sec$^{-1}$, typically up to 1000 sec$^{-1}$.

The present invention therefore may also provide a process for the production of polymer concentrate compositions comprising blending under high shear conditions, one or more semi-amorphous polyolefins, with one or more plasticizers, and optionally one or more additives, to produce a concentrate comprising at least about 5 wt %, preferably 10 to 90 wt % of plasticizer. In a preferred embodiment, the concentrate comprises at least 50 wt % of plasticizer. In another preferred embodiment, the concentrate comprises at least 30 wt % of plasticizer. In another embodiment, the polymer concentrate comprises 1-70 wt % of plasticizer, preferably 5-60 wt %, more preferably 10-50 wt %, more preferably 15-50 wt %, more preferably 20-50 wt % of plasticizer. In yet another embodiment, the polymer concentrate comprises 2-50 wt % of plasticizer, preferably 5-40 wt %, more preferably 5-30 wt %, more preferably 5-20 wt %, more preferably 10-40 wt %, more preferably 10-30 wt %, more preferably 10-20 wt % plasticizer.

The concentrate of the present invention is preferably a solid material, capable of being pelletized. Alternately, the concentrate of the present invention is preferably a solid material formed into a free-flowing particle. The concentrate may subsequently be blended with other materials wherein the plasticizer may be released (let down) from the concentrate to produce a resultant blend comprising the plasticizer at a concentration in the final blend which is less than the concentration of the plasticizer in the concentrate. It is to be understood that the polymer used to make the polymer concentrate of the present invention need not be the same polymer used in subsequent processes wherein the plasticizer is released or let down. The ratio of the mixture of the plasticizer, and additional additives, and the semi-amorphous polymer in the concentrate composition typically depends upon the quantity of plasticizer and additives and semi-amorphous polymer desired in the end product and the ability of the fabrication machinery to handle incorporation of additives, and or masterbatch feeds.

The plasticizer and the polymer concentrate are preferably blended under conditions where both components are molten and under sufficiently high shear conditions to ensure intimate mixing of the plasticizer within the polymer concentrate. If necessary or convenient, the components may be physically blended prior to melt blending. The components of the concentrate are conveniently melt blended in a single or twin screw extruder or a kneader. Alternatively, a Banbury mixer may be used. Where a single or twin screw extruder or a kneader is used, it may be preferred to cool the screw or operate at lower temperatures than would be employed for an unplasticized composition particularly when producing concentrates containing plasticizer content which prevents the composition from sticking to the screw or prevents sufficient friction to allow efficient mixing.

The concentrate of the present invention typically comprises from 0.1-95 wt % of semi-amorphous polymer, preferably 0.5-70 wt %, more preferably 1-50 wt %, more preferably 1-10 wt %, more preferably 5-20 wt % of the semi-amorphous polymer.

In a preferred embodiment, a polymer concentrate of this invention is formed into a pellet, particle or other solid shape and is thereafter blended with a polyolefin, preferably melt blended, to form a let down blend that is then formed into an article, (such as combining plasticizer, semi-amorphous polymer and optionally polypropylene having a Tm of 100° C. or more, pelletizing the blend, then blending the pellets with another polymer such as a polypropylene or polyethylene having a Tm over 100° C. and forming the blend into a parison and shaping it to form an article).

In another embodiment the concentrate comprises a semi crystalline (Tm over 100° C., preferably over 120, preferably over 140) polyolefin present at 1 to 50 wt %, preferably 2 to 25 wt %, preferably 5 to 20 wt %, and a semi amorphous (Tm under 100° C. and an Hf of 70 J/g or less, preferably having a Tm of 10° C. to 90° C.) polyolefin present at 20 to 90 wt %, preferably 30 to 80 wt %, preferably 40 to 70 wt %, and a plasticizer present at 5 to 60 wt %, preferably 10 to 50 wt %, preferably 15 to 40 wt %, based upon the weight of the composition.

In another embodiment, the polymer present in the concentrate as the semi-crystalline polymer is an in situ impact copolymer (also called an "in reactor" impact copolymer) and is present at 50 to 95 wt %, preferably 55 to 90 wt %, more preferably 60 to 85 wt %, and a plasticizer present at 5 to 50 wt %, preferably 10 to 45, more preferably 15 to 40 wt %, based upon the weight of the composition. For purposes of this invention and the claims thereto an in-situ impact copolymer having a melting point above 100° C. shall be considered a semi-crystalline copolymer. The impact copolymer may be present as the semi-crystalline copolymer or may be present in addition to another semi-crystalline polymer.

Plasticizer

The plasticizer of the present invention is any compound which improves particular properties of the polymer concentrate directed towards softness, a depressed glass transition temperature, impact strength (e.g., Gardner impact), toughness, flexibility (e.g., lower flexural modulus), and or processability (e.g., higher melt flow) and the like.

Preferred plasticizers of this invention are characterized in that, when blended with the polymer concentrate to form a polymer concentrate, the plasticizer and the polymer concentrate form a homogeneous composition, also referred to as a homogeneous blend.

Preferably, the plasticizer is miscible with the polymer in the concentrate, as indicated by no change in the number of peaks in the Dynamic Mechanical Thermal Analysis trace (DMTA) determined according to ASTM D4065, as compared to the DMTA trace of the polymer concentrate in the absence of the plasticizer.

Plasticizers suitable for use herein may comprises a paraffin, a hydrocarbon fluid, a polyalpha olefin oligomer, a polybutene, a mineral oil, a phthalate, a substituted phthalate, a substituted mellitate, a substituted adipate, or a combination thereof, wherein the substitutions comprise $C_1$ to $C_{20}$ hydrocarbons. In a preferred embodiment, plasticizers suitable for use herein include both functionalized and non-functionalized paraffins (e.g., isoparaffins, normal or linear paraffins, cyclic paraffins, dearomaticized aliphatic hydrocarbons, high purity hydrocarbon fluids, mixtures thereof, and the like), poly alpha olefin oligomers (PAOs), polybutenes, and/or mineral oils.

Particularly preferred plasticizers include PAOs, Group III basestocks (including those derived from so-called Gas-To-Liquids processes), and mineral oils with VI>100, pour point less than –20° C., specific gravity less than 0.86, and flash point greater than 200° C.

Preferably, the plasticizer is a PAO, which may be manufactured by the catalytic oligomerization or polymerization of olefins having 4 or more carbon atoms, preferably 5 or more carbon atoms. A PAO thus includes synthetic fluids produced by oligomerization and or polymerization. PAO's may also be functionalized to comprise, for example, esters, polyethers, polyalkylene glycols, and the like. (see *Synthetic Lubricants and High-Performance Functional Fluids*, Second edition, Rudnick, Shubkin, eds., Marcel Dekker, Inc. New York, 1999.)

Non-Functionalized Plasticizer

In a preferred embodiment, the polymer concentrate of the present invention includes a non-functionalized plasticizer ("NFP"). The NFP of the present invention is defined for use herein to include a compound comprising carbon and hydrogen, that does not include, to an appreciable extent, functional groups comprising oxygen, nitrogen, sulfur, and/or phosphorus (i.e., polar functional groups). Examples of such functional groups include hydroxide, carboxyls, esters, ethers, amines, and the like.

By an "appreciable extent", it is meant that functional groups and compounds comprising functional groups are not deliberately added to the NFP, and if present at all, are present at less than 5 wt %, based on the total weight of the NFP. More preferably, functional groups are present at less than 4 wt %, more preferably less than 3 wt %, more preferably less than 2 wt %, more preferably less than 1 wt %, more preferably less than 0.7 wt %, more preferably less than 0.5 wt %, more preferably less than 0.3 wt %, more preferably less than 0.1 wt %, more preferably less than 0.05 wt %, more preferably less than 0.01 wt %, more preferably less than 0.001 wt %, based upon the total weight of the NFP.

Paraffins

In an embodiment, an NFP may comprise, or may consist essentially of one or more paraffins. For purposes of the present invention and the description herein, the term "paraffin" includes all isomers such as normal or linear paraffins (n-paraffins), branched paraffins, also referred to as isoparaffins, and cyclic paraffins, preferably cyclic aliphatic paraffins. Paraffins may be derived synthetically by means known in the art, or may be refined from crude oil in such a way as to meet the requirements of an NFP as described herein. It is to be understood that the classes of materials described herein that are useful as NFP's can be utilized alone, or admixed with other NFP's, other plasticizers, and the like.

In an embodiment, an NFP may comprise, or may consist essentially of one or more $C_6$ to $C_{200}$ paraffins. In a preferred embodiment, the NFP may comprise $C_6$ to $C_{100}$ paraffins, more preferably $C_6$ to $C_{200}$ paraffins, more preferably $C_8$ to $C_{100}$ paraffins. In another preferred embodiment, the NFP may comprise $C_{20}$ to $C_{1500}$ paraffins, preferably $C_{20}$ to $C_{500}$ paraffins, more preferably $C_{30}$ to $C_{400}$ paraffins, even more preferably $C_{40}$ to $C_{250}$ paraffins.

A preferred NFP or blend thereof may comprise a paraffin having one or more of the following properties:

1. a distillation range as determined by ASTM D 86 having a difference between the upper temperature and the lower temperature of 40° C. or less, preferably 35° C. or less, preferably 30° C. or less, preferably 25° C. or less, preferably 20° C. or less, preferably 15° C. or less, preferably 10° C. or less, preferably 6 to 40° C., preferably 6 to 30° C.; and/or 2. an initial boiling point as determined by ASTM D 86 greater than 50° C., preferably greater than 100° C., preferably greater than 120° C., preferably greater than 130° C., preferably greater than 140° C., preferably greater than 150° C., preferably greater than 160° C., preferably greater than 170° C., preferably greater than 180° C., preferably greater than 190° C., preferably greater than 200° C., preferably greater than 210° C., preferably greater than 220° C., preferably greater than 230° C., preferably greater than 240° C.; and/or 3. a pour point of 10° C. or less (as determined by ASTM D 97), preferably 0° C. or less, preferably-5° C. or less, preferably –10° C. or less, preferably –15° C. or less, preferably –20° C. or less, preferably –25° C. or less, preferably –30° C. or less, preferably –40° C. or less, preferably –50° C. or less, preferably –60° C. or less; and/or 4. a specific gravity (ASTM D 4052, 15.6° C.) of less than 0.88, preferably less than 0.85, preferably less than 0.80, preferably less than 0.75, preferably less than 0.70, preferably 0.65 to 0.88, preferably 0.70 to 0.86, preferably 0.75 to 0.85, preferably 0.79 to 0.85, preferably 0.80 to 0.84; and/or 5. a final boiling point as determined by ASTM D 86 of less than 700° C., preferably 115° C. to 500° C., preferably 200° C. to 450° C., preferably 250° C. to 400° C.; and/or 6. a weight average molecular weight (Mw) less than 21,000 g/mol determined by GPC, preferably 100 to 10000, preferably 500 to 5000, preferably 100 to 2000, preferably 150 to 1500, more preferably 200 to 1000 g/mol; and/or 7. a number average molecular weight (Mn) of 100 to 2000 g/mol determined by GPC, preferably 300 to 10000, preferably 500 to 5000, preferably 150 to 1500, more preferably 200 to 1000; and/or 8. a flash point as measured by ASTM D 56 of greater than –30° C., preferably –30° C. to 150° C., more preferably greater than 200° C. and/or 9. a dielectric constant at 20° C. of less than 3.0, preferably less than 2.8, preferably less than 2.5, preferably less than 2.3, preferably less than 2.1; and/or 10. a density (ASTM 4052, 15.6/15.6° C.) of less than 0.90 g/cm³, preferably 0.70 to 0.83; and/or 11. a viscosity (ASTM 445, 25° C.) of 0.5 to 20 cSt at 25° C.; and/or 12. a carbon number of 6 to 150, preferably 7 to 100, more preferably 10 to 30, more preferably 12 to 25; and/or 13. a kinematic viscosity ("KV") of 2 centi Stokes (cSt) or less at 100° C., preferably 1.5 cSt or less, preferably 1.0 cSt or less, preferably 0.5 cSt or less, as determined according to ASTM D 445; and/or 14. a glass transition temperature (Tg) according to ASTM E 1356 of less than 30° C. preferably less than 20° C., more preferably less than 10° C., more preferably less than 0° C., more preferably less than −5° C., more preferably less than −10° C., more preferably less than −15° C., still more preferably a Tg that cannot be determined according to ASTM E 1356.

n-Paraffins

NFPs useful herein may comprise or consist essentially of linear or normal paraffins (n-paraffins). Preferred n-paraffins comprise at least 50 weight %, preferably at least 60 wt %, preferably at least 70 wt %, preferably at least 80 wt %, preferably at least 90 wt %, preferably at least 95 wt % preferably essentially 100 wt % of $C_5$ to $C_{25}$ n-paraffins, more preferably $C_5$ to $C_{20}$ n-paraffins, more preferably $C_5$ to $C_{15}$ n-paraffins. Preferred n-paraffins may also comprise less than 0.1%, preferably less than 0.01% aromatics. In a preferred embodiment, the n-paraffins may have:

a KV of 2 cSt or less at 100° C.; and/or a distillation range of 30° C. or less, preferably 20° C. or less; and/or an initial boiling point greater than 150° C., preferably greater than 200° C.; and/or a specific gravity of 0.65 to 0.85, more preferably 0.70 to 0.80, more preferably 0.75 to 0.80; and/or a flash point greater than 60° C., more preferably greater than 90° C., more preferably greater than 100° C., still more preferably greater than 120° C.

Examples of suitable n-paraffins are commercially available under the tradename NORPAR (ExxonMobil Chemical Company, Houston Tex.), and are sold commercially as NORPAR series of n-paraffins, examples of which are summarized in Table 1a.

TABLE 1a

NORPAR Series n-paraffins

| Name | distillation range (° C.) | pour point (° C.) | Avg. Specific Gravity | Viscosity @ 25° C. (cSt) | saturates and aromatics (wt %) |
|---|---|---|---|---|---|
| NORPAR 12 | 189-218 | | 0.75 | 1.6 | <0.01 |
| NORPAR 13 | 222-242 | | 0.76 | 2.4 | <0.01 |
| NORPAR 14 | 241-251 | | 0.77 | 2.8 | <0.01 |
| NORPAR 15 | 249-274 | 7 | 0.77 | 3.3 | <0.01 |

Isoparaffins

The NFP useful herein may comprise or consist essentially of branched paraffin, also referred to as isoparaffin. By isoparaffin it is meant that a paraffin chain possess $C_1$ to $C_{10}$ alkyl branching along at least a portion of the paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, more preferably between 10 and 24, still more preferably from 10 to 15. Various isomers of each carbon number may be present. Suitable isoparaffins for use as NFP's may also include cycloparaffins having branched side chains. Cycloparaffins may also exist as a minor component of a particular isoparaffin.

The NFP may comprise at least 50 wt %, preferably at least 60 wt %, preferably at least 70 wt %, preferably at least 80 wt %, preferably at least 90 wt %, preferably at least 95 wt % preferably essentially 100 wt % of $C_6$ to $C_{150}$ isoparaffins. More preferably, the NFP comprises $C_6$ to $C_{100}$ isoparaffins, more preferably $C_6$ to $C_{25}$ isoparaffins, more preferably $C_8$ to $C_{20}$ isoparaffins.

Preferred isoparaffins may have:

a density of 0.70 to 0.83 g/cm$^3$; and/or a pour point of −40° C. or less, preferably −50° C. or less; and/or a viscosity (ASTM 445, 25° C.) of 0.5 to 20 cSt at 25° C.; and/or a weight average molecular weight (Mw) of 100 to 300 g/mol determined by GPC.

The isoparaffins may include greater than 50 wt % (by total weight of the isoparaffin) mono-methyl species, for example, 2-methyl, 3-methyl, 4-methyl, 5-methyl or the like, with minimum formation of branches with substituent groups of carbon number greater than 1, (e.g., ethyl, propyl, butyl and the like), based on the total weight of isoparaffins in the NFP. In one embodiment, the isoparaffin includes greater than 70 wt % mono-methyl species, based on the total weight of the isoparaffin present.

Preferably, the isoparaffin has a boiling point of from 100° C. to 350° C., more preferably 110° C. to 320° C. In preparing different grades of isoparaffin, a paraffinic mixture may be fractionated into cuts having narrow boiling ranges, for example, of about 35° C.

Suitable isoparaffins are commercially available under the tradename ISOPAR (ExxonMobil Chemical Company, Houston Tex.), and are described in, for example, U.S. Pat. No. 6,197,285 (column 5, lines 1-18), U.S. Pat. Nos. 3,818, 105 and 3,439,088, and sold commercially as ISOPAR series of isoparaffins, examples of which are summarized in Table 1b.

TABLE 1b

ISOPAR Series Isoparaffins

| Name | distillation range (° C.) | pour point (° C.) | Avg. Specific Gravity | Viscosity @ 25° C. (cSt) | saturates and aromatics (wt %) |
|---|---|---|---|---|---|
| ISOPAR E | 117-136 | −63 | 0.72 | 0.85 | <0.01 |
| ISOPAR G | 161-176 | −57 | 0.75 | 1.46 | <0.01 |
| ISOPAR H | 178-188 | −63 | 0.76 | 1.8 | <0.01 |
| ISOPAR K | 179-196 | −60 | 0.76 | 1.85 | <0.01 |
| ISOPAR L | 188-207 | −57 | 0.77 | 1.99 | <0.01 |
| ISOPAR M | 223-254 | −57 | 0.79 | 3.8 | <0.01 |
| ISOPAR V | 272-311 | −63 | 0.82 | 14.8 | <0.01 |

Other suitable isoparaffins for use as NFPs are commercially available under the trade names SHELLSOL (by Shell Chemical Co.), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

Paraffin Blends

In another embodiment, the NFP may comprise paraffin blends comprising a mixture or blend of two or more cyclic, branched, or normal paraffins. Preferred blends have a KV of 2 cSt or less at 100° C. Paraffins in the blends preferably comprise from 6 to 50 carbon atoms, more preferably 10 to 24 carbon atoms. The paraffin blends may have a branch paraffin to n-paraffin molar ratio (moles branched paraffin:moles n-paraffin) of 0.5:1 to 9:1, preferably 1:1 to 4:1, based on the total moles of paraffin present in the blend.

The paraffin blend may include isoparaffins having greater than 50 wt % (by total weight of the blend) mono-methyl species, for example, 2-methyl, 3-methyl, 4-methyl, 5-methyl or the like, with minimum formation (i.e., less than 10 wt %) of branches with substituent groups of carbon number greater than 1, (e.g., ethyl, propyl, butyl and the like), based on the total weight of isoparaffins in the NFP. In one embodiment, the isoparaffins of the composition contain greater than 70 wt % of the mono-methyl species, based on the total weight of the isoparaffins present in the mixture or blend. Preferably, the paraffin blend has a boiling point of 100° C. to 350° C., more preferably 110° C. to 320° C.

Dearomaticized Aliphatic Hydrocarbon

In an embodiment, the NFP may comprise or consist essentially of a dearomaticized aliphatic hydrocarbon, which may comprise normal paraffins, isoparaffins and/or cycloparaffins. Preferred dearomaticized aliphatic hydrocarbons have a KV of 2 cSt or less at 100° C., and preferably comprise at least 50 weight %, preferably at least 60 wt %, preferably at least 70 wt %, preferably at least 80 wt %, preferably at least 90 wt %, preferably at least 95 wt % preferably essentially 100 wt % of dearomaticized aliphatic hydrocarbon.

Preferred dearomaticized aliphatic hydrocarbons may include a mixture of $C_4$ to $C_{25}$ normal paraffins, isoparaffins and cycloparaffins, more preferably $C_5$ to $C_{18}$, still more preferably $C_5$ to $C_{12}$. Preferred dearomaticized aliphatic hydrocarbons may contain less than 0.1 wt %, preferably less than 0.01 wt % aromatics, based on the total weight of the dearomaticized aliphatic hydrocarbon.

In a preferred embodiment the dearomaticized aliphatic hydrocarbon may have:

a distillation range of 30° C. or less, preferably 20° C. or less; and/or an initial boiling point greater than 50° C., preferably greater than 100° C., preferably greater than 200° C.; and/or a specific gravity (15.6° C.) of 0.65 to 0.85, more preferably 0.70 to 0.85, more preferably 0.75 to 0.85, still more preferably 0.80 to 0.85; and/or a flash point greater than 60° C., more preferably greater than 90° C., more preferably greater than 100° C., still more preferably greater than 110° C.

Suitable dearomaticized aliphatic hydrocarbons are commercially available under the tradename EXXSOL (Exxon-Mobil Chemical Company, Houston Tex.), and are sold commercially as EXXSOL series of dearomaticized aliphatic hydrocarbons, some of which are summarized in Table 1c.

TABLE 1c

EXXSOL Series

| Name | distillation range (° C.) | Pour point (° C.) | Avg. Specific Gravity | Viscosity @ 25° C. (cSt) | saturates and aromatics (wt %) |
|---|---|---|---|---|---|
| EXXSOL isopentane | | | 0.63 | 0.3 | — |
| EXXSOL methylpentane naphtha | 59-62 | | 0.66 | 0.5 | — |
| EXXSOL hexane fluid | 66-69 | | 0.67 | 0.5 | — |
| EXXSOL DSP 75/100 | 78-99 | | 0.72 | 0.6 | — |
| EXXSOL heptane fluid | 94-99 | | 0.70 | 0.6 | — |
| EXXSOL DSP 90/120 Naphtha | 98-115 | | 0.74 | | |
| EXXSOL DSP 115/145 Naphtha | 116-145 | | 0.75 | 0.8 | — |
| EXXSOL D Naphtha | 158-178 | | 0.77 | 1.2 | — |
| EXXSOL D 40 | 161-202 | | 0.79 | 1.4 | 0.3 |
| EXXSOL D 60 | 188-210 | | 0.80 | | 0.4 |
| EXXSOL D 80 | 208-234 | | 0.80 | 2.2 | 0.4 |
| EXXSOL D 95 | 224-238 | | 0.80 | 2.1 | 0.7 |
| EXXSOL D 110 | 249-268 | | 0.81 | 3.5 | 0.8 |
| EXXSOL D 130 | 282-311 | −45 | 0.83 | 6.9 | 1.5 |

Process Oils

In another embodiment, typical process oils (also called mineral oils) may be used as plasticizers herein. Characteristics of some commercially available mineral oils used as process oils are listed in Table 1 d. Such fluids typically have a viscosity index less than 120, most have a viscosity index less than 110, and many have a viscosity index of 100 or less.

TABLE 1d

Commercial Examples of Process Oils

| Grade | KV @ 100° C., cSt | VI | Pour Point, ° C. | Specific gravity | Flash Point, ° C. | APHA Color |
|---|---|---|---|---|---|---|
| Drakeol 34[1] | 9 | 99 | −12 | 0.872 | 254 | 10 |
| Paralux 1001R[2] | 4 | 99 | −17 | 0.849 | 212 | 25 |
| Paralux 2401R[2] | 6 | 101 | −12 | 0.863 | 234 | 45 |
| Paralux 6001R[2] | 12 | 102 | −21 | 0.871 | 274 | 45 |
| Sunpar 120[3] | 6 | 106 | −15 | 0.872 | 228 | >200 |
| Sunpar 150[3] | 11 | 97 | −9 | 0.881 | 245 | >300 |
| Sunpar 2280[3] | 31 | 95 | −9 | 0.899 | 305 | >300 |
| Plastol 135[4] | 5 | 104 | −9 | 0.865 | 210 | 10 |
| Plastol 537[4] | 11 | 97 | −3 | 0.880 | 240 | 10 |
| Plastol 2105[4] | 30 | 110 | −15 | 0.885 | 270 | 10 |
| Flexon 843[4] | 5 | 91 | −12 | 0.869 | 218 | >250 |
| Flexon 865[4] | 11 | 93 | −3 | 0.879 | 252 | >250 |
| Flexon 815[4] | 32 | 101 | −9 | 0.895 | 310 | >300 |
| Shellflex 210[5] | 4 | 95 | −18 | 0.860 | 216 | >200 |
| Shellflex 330[5] | 9 | 95 | −10 | 0.875 | 256 | >250 |
| Shellflex 810[5] | 33 | 95 | −9 | 0.896 | 324 | >300 |

[1]Available commercially from Penreco.
[2]Available commercially from ChevronTexaco.
[3]Available commercially from Sunoco.
[4]Available commercially from ExxonMobil.
[5]Available commercially from Shell.

Other examples f useful plasticizers include processing oils produced using an all-hydroprocessing route which transforms the molecular structure of undesirable aromatics into highly desirable saturates to produce a process oil with particular physical and chemical properties including low aromatic content, low volatility, and ease of processability. Such oils are available commercially under the tradename Paralux™ processing oils, which are available from ChevronTexaco Global Lubricants, San Ramon, Calif. Properties of some of the available Paralux oils are summarized in Table 1e below.

TABLE 1e

Paralux Series

| Physical Properties | ASTM Method | Paralux 701R | Paralux 1001R | Paralux 2401R | Paralux 6001R |
|---|---|---|---|---|---|
| Viscosity at: 40° C., cst | D445 | 12.1 | 20.0 | 43.3 | 117.6 |
| Viscosity at: 100° C., cst | D445 | 2.9 | 4.1 | 6.5 | 12.5 |
| Viscosity index | D2270 | 80 | 99 | 101 | 102 |
| Specific gravity 60° F. | D4052 | 0.8509 | 0.853 | 0.8665 | 0.8747 |
| Density at 20° C. g/cc | D4052 | 0.8517 | 0.8493 | 0.8632 | 0.8712 |
| Molecular weight | D2502 | 318 | 360 | 430 | 582 |
| Pour point, ° C. | D97 | −40 | −17 | −12 | −21 |
| Clay - gel mass % | D2007 | | | | |
| Asphaltenes | | 0.0 | 0.0 | 0.0 | 0.0 |
| Polar compounds | | 0.1 | 0.1 | 0.1 | 0.1 |
| Aromatics | | 0.3 | 0.5 | 1.3 | 3.1 |
| Total aromatics | | 0.3 | 0.5 | 1.3 | 3.1 |
| Saturates | | 99.6 | 99.4 | 98.6 | 96.8 |
| Carbon type by ndM | D3238 | | | | |
| % Carbon in paraffinic structure | | 61 | 68 | 66 | 70 |
| % Carbon in naphthenic structure | | 39 | 32 | 34 | 30 |
| % Carbon in aromatic structure | | 0 | 0 | <0.3 | 0 |
| Carbon type analysis, % | D2140 | | | | |
| Ca | | <1 | <1 | <1 | <1 |
| Cn | | 37 | 32 | 34 | 31 |
| Cp | | 63 | 68 | 66 | 69 |
| Aromatics by HPLC | Chevron | <1 | <1 | <1 | <1 |
| Saturates by HPLC | Chevron | >99 | >99 | >99 | >99 |

High Purity Hydrocarbon Fluids

The NFP useful in the present invention may comprise or consist essentially of a "high purity" hydrocarbon fluid, preferably comprising one or more paraffins having 6 to 1500 carbon atoms, preferably 8 to 1000 carbon atoms, preferably 10 to 500 carbon atoms, preferably 12 to about 200 carbon atoms, preferably 14 to 150 carbon atoms, preferably 16 to 100 carbon atoms, preferably 20 to 500 carbon atoms, preferably 30 to 400 carbon atoms, preferably 40 to 200 carbon atoms, preferably 20 to 100 carbon atoms. The high purity hydrocarbon fluid composition may have an isoparaffin:n-paraffin ratio of about 0.5:1 to about 9:1, preferably about 1:1 to about 4:1. The isoparaffins of the "high purity" hydrocarbon fluid composition may contain greater than fifty percent mono-methyl species, e.g., 2-methyl, 3-methyl, 4-methyl, ≧5-methyl or the like, with minimum formation of branches with substituent groups of carbon number greater than 1, i.e., ethyl, propyl, butyl or the like, based on the total weight of isoparaffins in the mixture. Preferably, the isoparaffins of the "high purity" hydrocarbon fluid composition contain greater than 70 percent of the mono-methyl species, based on the total weight of the composition.

A preferred high purity hydrocarbon fluid may have:

a KV at 25° C. of 1 to 100,000 cSt, preferably 10 cSt to 2000 cSt; and/or a KV at 40° C. of 1 to 30,000 cSt, preferably 10 cSt to 2000 cSt; and/or a pour point below −10° C., preferably below −20° C., more preferably below −30° C., more preferably from about −20° C. to about −70° C.

In a preferred embodiment, a high purity hydrocarbon fluid may comprise paraffins having:

a number average molecular weight of 500 to 21,000 g/mol; and/or less than 10% side chains having 4 or more carbons, preferably less than 8 weight %, preferably less than 5 weight %, preferably less than 3 weight %, preferably less than 2 weight %, preferably less than 1 weight %, preferably less than 0.5 weight %, preferably less than 0.1 weight %, preferably at less than 0.1 weight %, preferably at 0.001 weight %; and/or at least 1 or 2 carbon branches present at 15 weight % or more, preferably 20 weight % or more, preferably 25 weight % or more, preferably 30 weight % or more, preferably 35 weight % or more, preferably 40 weight % or more, preferably 45 weight % or more, preferably 50 weight % or more; and/or less than 2.5 weight % cyclic paraffins, preferably less than 2 weight %, preferably less than 1 weight %, preferably less than 0.5 weight %, preferably less than 0.1 weight %, preferably at less than 0.1 weight %, preferably at 0.001 weight %.

In another preferred embodiment, a high purity hydrocarbon fluid may comprise paraffins having:

a KV of 2 cSt or more at 100° C.; and/or a viscosity index of 120 or more, preferably 130 or more, preferably 140 or more, preferably 150 or more, preferably 170 or more, preferably 190 or more, preferably 200 or more, preferably 250 or more, preferably 300 or more; and/or a mixture of paraffins of carbon number ranging from about $C_8$ to $C_{20}$, preferably from about $C_8$ to $C_{500}$; and/or a molar ratio of isoparaffins to n-paraffins of about 0.5:1 to about 9:1; and/or greater than 50 percent of mono-methyl species, based on the total weight of the isoparaffins; and/or a pour point of about −20° F. to about −70° F., preferably −10 to −70° C.; and/or a kinematic viscosity at 25° C. of about 1 cSt to about 10 cSt; and/or a kinematic viscosity at 100° C. of about 3 to about 25 cSt; and/or a carbon number of $C_{10}$ to about $C_{16}$, preferably of about $C_{20}$ to about $C_{100}$; and/or greater than 70 percent mono-methyl species; and/or a boiling temperature of about 320° F. to about 650° F., more preferably of about 350° F. to about 550° F.

In a preferred embodiment, the high purity hydrocarbon fluid comprises a mixture of paraffins having a carbon number of $C_{10}$ to about $C_{16}$, preferably of about $C_{20}$ to about $C_{100}$; contains greater than 70 percent mono-methyl species; has a boiling temperature of about 350° F. to about 550° F., and has a molar ratio of isoparaffins to n-paraffins of about 1:1 to about 4:1.

The high purity hydrocarbon fluid may also be derived from a Fischer-Tropsch process followed by a wax isomerization process, such as those disclosed in U.S. Pat. No. 5,906,727.

In another embodiment, the nonfunctionalized plasticizer (NFP) is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant base stock or oil, which includes:

1. hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and
2. hydroisomerized synthetic waxes, such as Fischer-Tropsch waxes (i.e., the high boiling point residues of Fischer-Tropsch synthesis, including waxy hydrocarbons);

or mixtures thereof. Particularly preferred are lubricant base stocks or oils derived from hydrocarbons synthesized in a Fischer-Tropsch process as part of an overall Gas-to-Liquids (GTL) process.

In one embodiment, the mixture of paraffins useful as an NFP has:

1. a naphthenic content of less than 40 wt %, preferably less than 30 wt %, preferably less than 20 wt %, preferably less than 15 wt %, preferably less than 10 wt %, preferably less than 5 wt %, preferably less than 2 wt %, preferably less than 1 wt % (based on the total weight of the hydrocarbon mixture); and/or
2. a normal paraffins content of less than 5 wt %, preferably less than 4 wt %, preferably less than 3 wt %, preferably less than 1 wt % (based on the total weight of the hydrocarbon mixture); and/or
3. an aromatic content of 1 wt % or less, preferably 0.5 wt % or less; and/or
4. a saturates level of 90 wt % or higher, preferably 95 wt % or higher, preferably 98 wt % or higher, preferably 99 wt % or higher; and/or
5. the percentage of carbons in chain-type paraffinic structures ($C_P$) of 80% or more, preferably 90% or more, preferably 95% or more, preferably 98% or more; and/or
6. a branched paraffin:normal paraffin ratio greater than about 10:1, preferably greater than 20:1, preferably greater than 50:1, preferably greater than 100:1, preferably greater than 500:1, preferably greater than 1000:1; and/or
7. sidechains with 4 or more carbons making up less than 10% of all sidechains, preferably less than 5%, preferably less than 1%; and/or
8. sidechains with 1 or 2 carbons making up at least 50% of all sidechains, preferably at least 60%, preferably at least 70%, preferably at least 80%, preferably at least 90%, preferably at least 95%, preferably at least 98%; and/or
9. a sulfur content of 300 ppm or less, preferably 100 ppm or less, preferably 50 ppm or less, preferably 10 ppm or less (where ppm is on a weight basis); and/or
10. a nitrogen content of 300 ppm or less, preferably 100 ppm or less, preferably 50 ppm or less, preferably 10 ppm or less (where ppm is on a weight basis).

In another embodiment, the mixture of paraffins useful as NFP's herein has:

1. a number-average molecular weight of 300 to 1800 g/mol, preferably 400 to 1500 g/mol, preferably 500 to 1200 g/mol, preferably 600 to 900 g/mol; and/or
2. a kinematic viscosity at 40° C. of 10 cSt or more, preferably 25 cSt or more, preferably between about 50 and 400 cSt; and/or
3. a kinematic viscosity at 100° C. ranging from 2 to 50 cSt, preferably 3 to 30 cSt, preferably 5 to 25 cSt, preferably 6 to 20 cSt, more preferably 8 to 16 cSt; and/or
4. a viscosity index (VI) of 80 or greater, preferably 100 or greater, preferably 120 or greater, preferably 130 or greater, preferably 140 or greater, preferably 150 or greater, preferably 160 or greater, preferably 180 or greater; and/or
5. a pour point of −5° C. or lower, preferably −10° C. or lower, preferably −15° C. or lower, preferably −20° C. or lower, preferably −25° C. or lower, preferably −30° C. or lower; and/or
6. a flash point of 200° C. or more, preferably 220° C. or more, preferably 240° C. or more, preferably 260° C. or more; and/or
7. a specific gravity (15.6° C./15.6° C.) of 0.86 or less, preferably 0.85 or less, preferably 0.84 or less; and/or
8. an aniline point of 120° C. or more; and/or
9. a bromine number of 1 or less.

In a preferred embodiment, the mixture of paraffins comprises a GTL base stock or oil. GTL base stocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and $H_2$) derived from a suitable source, such as natural gas and/or coal. GTL base stocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL base stocks and oils may further comprise other hydroisomerized base stocks and base oils. Particularly preferred GTL base stocks or oils are those comprising mostly hydroisomerized F-T waxes and/or other liquid hydrocarbons obtained by a F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant base stock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350, often used in conjuction with a Group VIII metal such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL base stocks and oils, Fischer-Tropsch hydrocarbon derived base stocks and oils, and wax isomerate hydroisomerized base stocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents EP 324528, EP 532116, EP 532118, EP 537815, EP 583836, EP 666894, EP 668342, EP 776959; WPO patent applications WO 97/31693, WO 99/20720, WO 99/45085, WO 02/64710, WO 02/64711, WO 02/70627, WO 02/70629, WO 03/33320; and British Patents 1,350,257; 1,390,359; 1,429,494; and 1,440,230. Particularly favorable processes are described in European Patent Applications EP 464546 and EP 464547. Processes using Fischer-Tropsch wax feeds are described in U.S. Pat. Nos. 4,594,172; 4,943,672; 6,046,940; 6,103,099; 6,332,974; 6,375,830; and 6,475,960.

Desirable GTL-derived fluids are expected to become broadly available from several commercial sources, including Chevron, ConocoPhillips, ExxonMobil, Sasol, SasolChevron, Shell, Statoil, and Syntroleum.

This invention also relates to compositions where one or more NFP is a high purity hydrocarbon fluid derived from a GTL process comprising a mixture of paraffins of carbon number ranging from about $C_{20}$ to $C_{100}$, a molar ratio of isoparaffins:n-paraffins greater than about 50:1, the percentage of carbons in paraffinic structures ($C_P$) of 98% or more, a pour point ranging from about −20 to −60° C., and a kinematic viscosity at 100° C. ranging from about 6 to 20 cSt.

As used herein, the following terms have the indicated meanings: "naphthenic" describes cyclic (mono-ring and/or multi-ring) saturated hydrocarbons (i.e., cycloparaffins) and branched cyclic saturated hydrocarbons; "aromatic" describes cyclic (mono-ring and/or multi-ring) unsaturated hydrocarbons and branched cyclic unsaturated hydrocarbons; "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

Polyalpha Olefins (PAOs)

Preferred NFP's useful as plasticizers herein comprise or consist essentially of a Poly-Alpha-Olefin (PAO), comprising oligomers or low molecular weight polymers of branched and/or linear alpha olefins. PAOs useful as plasticizers in the present invention may comprise $C_{20}$ to $C_{1500}$ paraffins, preferably $C_{30}$ to $C_{1000}$ paraffins, preferably $C_{40}$ to $C_{1000}$ paraffins, preferably $C_{50}$ to $C_{750}$ paraffins, preferably $C_{30}$ to $C_{500}$ paraffins, preferably $C_{40}$ to $C_{500}$ paraffins, preferably $C_{50}$ to $C_{500}$ paraffins. Preferred PAO's comprise linear alpha olefins having 5 to 18 carbon atoms, preferably 5 to 16 carbon atoms, more preferably 5 to 14 carbon atoms, more preferably 6 to 12 carbon atoms, more preferably 8 to 12 carbon atoms, still more preferably an average of about 10 carbon atoms.

In an embodiment, PAO's may include dimers, trimers, tetramers, pentamers, and the like of $C_5$ to $C_{24}$ α-olefins, preferably $C_5$ to $C_{18}$ α-olefins, preferably $C_5$ to $C_{16}$ α-olefins, preferably $C_5$ to $C_{14}$ α-olefins, preferably $C_6$ to $C_{12}$ α-olefins, more preferably $C_8$ to $C_{12}$ α-olefins. Suitable α-olefins includes 1-pentene, 1-hexene, 1-heptene, 1-octene, 1-nonene, 1-decene, 1-undecene and/or 1-dodecene.

In a preferred embodiment, the alpha olefin is 1-decene, and the NFP includes a mixture of oligomers of 1-decene (e.g., dimers, trimers, tetramers and pentamers and higher). Preferred PAO's are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999).

In another preferred embodiment, PAO's may include oligomers of two or more $C_5$ to $C_{24}$ α-olefins, preferably two or more $C_5$ to $C_{18}$ α-olefins, preferably two or more $C_5$ to $C_{16}$ α-olefins, preferably two or more $C_5$ to $C_{14}$ α-olefins, preferably two or more $C_6$ to $C_{12}$ α-olefins, preferably two or more $C_8$ to $C_{12}$ α-olefins.

Preferred PAO's may also have:

a KV at 100° C. of 4 cSt or more, preferably 5 cSt or more, preferably 6 cSt or more, preferably 8 cSt or more, preferably 10 cSt or more, more preferably 20 cSt or more, more preferably 30 cSt or more, more preferably 40 cSt or more, preferably 50 cSt or more, preferably 80 cSt or more, preferably 100 cSt or more, preferably 110 or more, preferably 150 cSt or more, preferably 200 cSt or more, preferably 300 cSt or more, preferably 500 cSt or more, preferably 750 cSt or more, preferably 1000 cSt or more, preferably 1500 cSt or more, preferably 2000 cSt or more, still more preferably 2500 or more, preferably 10 cSt to 3000 cSt, preferably 10 cSt to 1000 cSt, still more preferably 10 cSt to 40 cSt; a kinematic viscosity at 100° C. of 0.1 to 3000 cSt, more preferably 0.5 to 1000 cSt, more preferably 1 to 250 cSt, more preferably 1 to 200 cSt, more preferably 4 to 500 cSt, more preferably 6 to 300 cSt, more preferably 10 to 500 cSt, more preferably 0.1 to 150 cSt, still more preferably less than 2 cSt; and/or a viscosity index of 90 or more, more preferably 100 or more, more preferably 105 or more, more preferably 110 or more, more preferably 115 or more, more preferably 120 or more, more preferably 125 or more, more preferably 130 or more, more preferably 140 or more, more preferably 150 or more, more preferably 190 or more, more preferably 200 or more, more preferably 250 or more, still more preferably 300 or more, more preferably 90 to 400, still more preferably 120 to 350; and/or a number average molecular weight (Mn) of 100 to 21,000, more preferably 300 to 15,000, more preferably 200 to 10,000, more preferably 200 to 7,000, more preferably 600 to 3,000, more preferably 200 to 2,000, still more preferably 200 to 500 g/mole; and/or a weight average molecular weight Mw of less than 20,000 g/mol, more preferably less than 10,000 g/mol, more preferably less than 5,000 g/mol, more preferably less than 4,000 g/mol, more preferably less than 2,000 g/mol, more preferably less than 500 g/mol, more preferably less than 100 g/mol; and/or a pour point of less than 0° C., more preferably −5° C. or less, more preferably −10° C. or less, more preferably −20° C. or less, still more preferably less than −40° C.; and/or a dielectric constant at 20° C. of less than 3.0, preferably less than 2.8, more preferably less than 2.5, more preferably less than 2.3, still more preferably less than 2.1; and/or a specific gravity (ASTM D 4052, 15.6/15.6° C.) of less than 0.920, more preferably less than 0.910, more preferably less than 0.86, more preferably less than 0.855, more preferably less than 0.85, more preferably 0.650 to 0.900, more preferably 0.700 to 0.860, more preferably 0.750 to 0.855, more preferably 0.790 to 0.850, more preferably 0.800 to 0.840; and/or a boiling point of 100° C. to 500° C., more preferably 200° C. to 450° C., still more preferably 250° C. to 400° C.

In a preferred embodiment, the NFP is a PAO comprising $C_6$ to $C_{14}$ olefins having a kinematic viscosity of 10 cSt or more at 100° C., and a viscosity index of 120 or more, preferably 130 or more, as determined by ASTM D-2270.

Particularly preferred PAO's for use here in are those having a flash point of 200° C. or more, preferably 220° C., ore more, preferably 230° C. or more, preferably 240° C. or more, preferably 250° C. or more.

Particularly preferred PAO's for use here in are those having a flash point of 200° C. or more (preferably 220° C., or more, preferably 230° C. or more, preferably 250° C. or more) and a pour point less than −25° C. (preferably less than −30° C., preferably less than −35° C., preferably less than −40° C.), or a kinematic viscosity at 100° C. of 35 cSt or more (preferably 40 cSt or more, preferably 50 cSt or more, preferably 60 cSt or more).

Desirable PAO's are commercially available under the tradename SHF, SuperSyn, and SpectraSyn PAO's (Exxon-Mobil Chemical Company, Houston), some of which are summarized in the Table 2 below.

TABLE 2

SHF and SuperSyn Series Polyalphaolefins

| PAO | specific gravity (15.6/15.6° C.) | Viscosity @ 100° C., cSt | VI | Pour Point, ° C. |
|---|---|---|---|---|
| SHF-20 | 0.798 | 1.68 | — | −63 |
| SHF-21 | 0.800 | 1.70 | — | −57 |
| SHF-23 | 0.802 | 1.80 | — | −54 |
| SHF-41 | 0.818 | 4.00 | 123 | −57 |
| SHF-61/63 | 0.826 | 5.80 | 133 | −57 |
| SHF-82/83 | 0.833 | 7.90 | 135 | −54 |
| SHF-101 | 0.835 | 10.0 | 136 | −54 |
| SHF-403 | 0.850 | 40.0 | 152 | −39 |
| SHF-1003 | 0.855 | 107 | 179 | −33 |
| SuperSyn 2150 | 0.850 | 150 | 214 | −42 |
| SuperSyn 2300 | 0.852 | 300 | 235 | −30 |
| SuperSyn 21000 | 0.856 | 1,000 | 305 | −18 |
| SuperSyn 23000 | 0.857 | 3,000 | 388 | −9 |
| SpectraSyn 2 | 0.798 | 1.7 | — | −66 |
| SpectraSyn 2B | 0.799 | 1.8 | — | −54 |
| SpectraSyn 4 | 0.820 | 4.1 | 126 | −66 |
| SpectraSyn 5 | 0.824 | 5.1 | 138 | −57 |
| SpectraSyn 6 | 0.827 | 5.8 | 138 | −57 |
| SpectraSyn 8 | 0.833 | 8 | 139 | −48 |
| SpectraSyn 10 | 0.835 | 10 | 137 | −48 |
| SpectraSyn 40 | 0.850 | 40 | 147 | −36 |
| SpectraSyn 100 | 0.855 | 100 | 170 | −30 |
| SpectraSyn Ultra 150 | 0.850 | 150 | 218 | −33 |
| SpectraSyn Ultra 300 | 0.852 | 300 | 241 | −27 |
| SpectraSyn Ultra 1000 | 0.856 | 1000 | 307 | −18 |

Other useful PAO's include those sold under the tradenames Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

Polybutene

Polybutenes may be useful as plasticizers in the present invention. Suitable polybutenes, also referred to herein as polybutene processing oils, include homopolymers or copolymers of olefin derived units having from 3 to 8 carbon atoms, preferably from 4 to 6 carbon atoms, more preferably 4 carbon atoms. In a preferred embodiment, the polybutene is a homopolymer or copolymer of a $C_4$ raffinate. Examples of suitable polybutene polymers are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999)

Suitable polybutenes may include a copolymer comprising isobutylene derived units, 1-butene derived units, and/or 2-butene derived units. Preferred polybutenes include homopolymers, copolymers, and/or terpolymer of the three units or more. Preferred polybutenes include those in which isobutylene derived units comprise 40 to 100 wt %, preferably 40 to 99 wt %, more preferably 40 to 96 wt % of the polymer; and/or the 1-butene derived units comprise 0 to 40 wt %, preferably 2 to 40 wt % of the copolymer; and/or the 2-butene derived units comprise 0 to 40 wt %, more preferably 0 to 30 wt %, still more preferably 2 to 20 wt % of the polymer.

In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Preferred polybutenes may have a Mn of less than 15,000, and a Mw of 60,000 or less. Particularly preferred polybutene processing oils include those having a number average molecular weight (Mn) of less than 10,000 g/mol, more preferably less than 8000 g/mol, still more preferably less than 6000 g/mol; and/or a number average molecular weight Mn of greater than 400 g/mol, preferably greater than 700 g/mol, more preferably greater than 900 g/mol. A preferred embodiment can be a combination of any lower molecular weight limit with any upper molecular weight limit described herein. For example, in one embodiment of the polybutene of the invention, the polybutene has a number average molecular weight of from 400 g/mol to 10,000 g/mol, and from 700 g/mol to 8000 g/mol in another embodiment, and from 900 g/mol to 3000 g/mol in yet another embodiment.

Suitable polybutenes may also have a viscosity of greater than 35 cSt at 100° C., preferably greater than 100 cSt at 100° C., more preferably 10 to 6000 cSt at 100° C., still more preferably 35 to 5000 cSt at 100° C.

Commercial examples of useful polybutenes include the PARAPOL™ Series of processing oils (Infineum, Linden, N.J.), such as PARAPOL™ 450, 700, 950, 1300, 2400 and 2500 and the Infineum "C" series of polybutenes, including C9945, C9900, C9907, C9913, C9922, C9925 as listed below. The commercially available PARAPOL™ and Infineum Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD of the PARAPOL™ oils range from 1.8 to 3 in one embodiment, and from 2 to 2.8 in another embodiment; the pour points of these polybutenes are less than 25° C. in one embodiment, less than 0° C. in another embodiment, and less than −10° C. in yet another embodiment, and between −80° C. and 25° C. in yet another embodiment; and densities (IP 190/86 at 20° C.) range from 0.79 to 0.92 g/cm$^3$, and from 0.81 to 0.90 g/cm$^3$ in another embodiment.

Below, Tables 3a and 3b show some of the properties of the PARAPOL™ oils and Infineum oils useful in embodiments of the present invention, wherein the viscosity was determined as per ASTM D445-97, and the number average molecular weight ($M_n$) by gel permeation chromatography.

TABLE 3a

PARAPOL ™ Grades of polybutenes

| Grade | $M_n$ | Viscosity @ 100° C., cSt |
|---|---|---|
| 450 | 420 | 10.6 |
| 700 | 700 | 78 |
| 950 | 950 | 230 |
| 1300 | 1300 | 630 |
| 2400 | 2350 | 3200 |
| 2500 | 2700 | 4400 |

TABLE 3b

Infineum Grades of Polybutenes

| Grade | $M_n$ | Viscosity @ 100° C., cSt | Viscosity Index |
|---|---|---|---|
| C9945 | 420 | 10.6 | ~75 |
| C9900 | 540 | 11.7 | ~60 |
| C9907 | 700 | 78 | ~95 |
| C9995 | 950 | 230 | ~130 |
| C9913 | 1300 | 630 | ~175 |
| C9922 | 2225 | 2500 | ~230 |
| C9925 | 2700 | 4400 | ~265 |

Lubricant Basestocks

Suitable plasticizers may also include lubricant basestocks, which may be distinguished by their viscosity indices determined according to ASTM D-2270, and an amount of saturates and sulfur they contain. Hydrocarbon basestocks have been classified as Group I, II or III by the American Petroleum Institute (API). Group I basestocks are solvent refined mineral oils. They contain the most unsaturates and sulfur of the three groups, and have the lowest viscosity indices. Group II and Group III basestocks are referred to as High Viscosity Index and Very High Viscosity Index basestocks respectively. They are hydroprocessed mineral oils. The Group III oils contain less unsaturates and sulfur than the Group I oils, and have higher viscosity indices compared to Group II oils.

In an embodiment, plasticizers may comprise

Group I basestocks, including mineral oils that may have been refined using solvent extraction of aromatics, solvent dewaxing, and hydrofining to reduce sulfur content. Group I basestocks may have sulfur levels greater than 0.03 weight %, saturates levels of 60 to 80%, and a viscosity index of about 90 by ASTM D-2270; and/or Group II basestocks, including mineral oils that have been mildly hydrocracked with conventional solvent extraction of aromatics, solvent dewaxing, and more severe hydrofining to reduce sulfur levels to less than or equal to 0.03 weight %, as well as removing double bonds from some of the olefinic and aromatic compounds such that saturate levels are greater than 95-98% and the viscosity index is about 80-120 by ASTM D-2270; and/or Group III basestocks, including mineral oils that have been hydrotreated to comprise saturates levels greater than 95%, to virtually 100%, sulfur contents of less than or equal to 0.03 weight % (preferably between 0.001 and 0.01%), and VI is in excess of 120 by ASTM D-2270.

In another embodiment the plasticizer comprises a Group III hydrocarbon basestock. Preferably the plasticizer comprises a mineral oil having a saturates levels of 90% or more, preferably 92% or more, preferably 94% or more, preferably 96% or more, preferably 98% or more, preferably 99% or more, and sulfur contents less than 0.03%, preferably between 0.001 and 0.01% and a viscosity index of 120 or more, preferably 130 or more.

In a preferred embodiment any of the plasticizers described above has a flash point of 200° C. or more (preferably 220° C., or more, preferably 230° C. or more, preferably 250° C. or more). In a particularly preferred embodiment any of the plasticizers described above has a flash point of 200° C. or more (preferably 220° C., or more, preferably 230° C. or more, preferably 250° C. or more) and a pour point of −20° C. or less (preferably less than −25° C., preferably less than −30° C., preferably less than −35° C., preferably less than −40° C.), and/or a kinematic viscosity at 100° C. of 35 cSt or more (preferably 40 cSt or more, preferably 50 cSt or more, preferably 60 cSt or more).

In a preferred embodiment any of the plasticizers described above has flash point of 200° C. or greater, preferably 220° C. or greater, preferably 200 to 350° C., preferably 210 to 300° C., preferably 215 to 290° C., preferably 220 to 280° C., preferably 240 to 280° C., wherein a desirable range may be any combination of any lower limit with any upper limit described herein.

In a preferred embodiment any of the plasticizers described above has a pour point of −10° C. or less, preferably −20° C. or less, preferably −30° C. or less, preferably −40° C. or less, preferably −45° C. or less, preferably −50° C. or less, preferably −10 to −80° C., preferably −15 to −75° C., preferably −20 to −70° C., preferably −25 to −65° C., wherein a desirable range may be any combination of any lower limit with any upper limit described herein.

In a preferred embodiment any of the plasticizers described above has a viscosity index (VI) of 100 or more, preferably 110 or more, preferably 120 or more, preferably 120 to 350, preferably 135 to 300, preferably 140 to 250, preferably 150 to 200, wherein a desirable range may be any combination of any lower limit with any upper limit described herein.

In a preferred embodiment any of the plasticizers described above has a specific gravity of 0.86 or less, preferably 0.855 or less, preferably 0.84 or less, preferably 0.78 to 0.86, preferably 0.80 to 0.85, preferably 0.82 to 0.845, wherein a desirable range may be any combination of any lower limit with any upper limit described herein.

In a preferred embodiment any of the plasticizers described above has a kinematic viscosity at 100° C. (KV100) of 4 cSt or more, preferably 5 cSt or more, preferably 6 to 5000 cSt, preferably 8 to 3000 cSt, preferably 10 to 1000 cSt, preferably 12 to 500 cSt, preferably 15 to 350 cSt, preferably 35 cSt or more, preferably 40 cSt or more, wherein a desirable range may be any combination of any lower limit with any upper limit described herein.

In a preferred embodiment any of the plasticizers described above has a number-average molecular weight (Mn) of 300 g/mol or more, preferably 500 g/mol or more, preferably 300 to 21,000 g/mol, preferably 300 to 10,000 g/mol, preferably 400 to 5,000 g/mol, preferably 500 to 3,000 g/mol, preferably less than 1,000 g/mol, wherein a desirable range may be any combination of any lower limit with any upper limit described herein.

In a preferred embodiment any of the plasticizers described above has a average carbon number (Cn) of 20 to 1500, preferably 20 to 500, preferably 30 to 400, preferably 20 to 300, preferably 40 to 300, preferably less than 200, preferably less than 100, wherein a desirable range may be any combination of any lower limit with any upper limit described herein.

In a preferred embodiment any of the plasticizers described above has a specific gravity of 0.86 or less (preferably 0.855 or less, preferably 0.85 or less), and one or more of the following:

a) a VI of 120 or more (preferably 135 or more, preferably 140 or more), and/or b) a flash point of 200° C. or more (preferably 220° C. or more, preferably 240° C. or more).

In a preferred embodiment any of the plasticizers described above has a pour point of −10° C. or less (preferably −15° C. or less, preferably −20° C. or less, preferably −25° C. or less), a VI of 120 or more (preferably 135 or more, preferably 140 or more), and optionally a flash point of 200° C. or more (preferably 220° C. or more, preferably 240° C. or more).

In a preferred embodiment any of the plasticizers described above has a pour point of −20° C. or less (preferably −25° C. or less, preferably 30° C. or less, preferably −40° C. or less) and one or more of the following:

a) a flash point of 200° C. or more (preferably 220° C. or more, preferably 240° C. or more), and/or b) a VI of 120 or more (preferably 135 or more, preferably 140 or more), and/or c) a KV100 of 4 cSt or more (preferably 6 cSt or more, preferably 8 cSt or more, preferably 10 cSt or more), and/or d) a specific gravity of 0.86 or less (preferably 0.855 or less, preferably 0.85 or less).

In a preferred embodiment any of the plasticizers described above has a KV100 of 4 cSt or more (preferably 5 cSt or more, preferably 6 cSt or more, preferably 8 cSt or more, preferably 10 cSt or more), a specific gravity of 0.86 or less (preferably 0.855 or less, preferably 0.85 cSt or less), and a flash point of 200° C. or more (preferably 220° C. or more, preferably 240° C. or more).

In a preferred embodiment any of the plasticizers described above has a flash point of 200° C. or more (preferably 220° C. or more, preferably 240° C. or more), a pour point of 110° C. or less (preferably 15° C. or less, preferably 20° C. or less, preferably 25° C. or less), a specific gravity of 0.86 or less (preferably 0.855 or less, preferably 0.85 or less), a KV100 of 4 cSt or more (preferably 5 cSt or more, preferably 6 cSt or more, preferably 8 cSt or more, preferably 10 cSt or more), and optionally a VI of 100 or more (preferably 120 or more, preferably 135 or more).

In a preferred embodiment any of the plasticizers described above has a KV100 of 35 cSt or more (preferably 40 or more) and a specific gravity of 0.86 or less (preferably 0.855 or less), and optionally one or more of the following:

a) a flash point of 200° C. or more (preferably 220° C. or more, preferably 240° C. or more), and/or b) a pour point of 10° C. or less (preferably 15° C. or less, preferably 20° C. or less, preferably 25° C. or less).

In a preferred embodiment any of the plasticizers described above has a flash point of 200° C. or more (preferably 210° C. or more, preferably 220° C. or more), a pour point of 10° C. or less (preferably 20° C. or less, preferably 30° C. or less), and a KV100 of 6 cSt or more (preferably 8 cSt or more, preferably 10 cSt or more, preferably 15 cSt or more).

In a preferred embodiment any of the plasticizers described above has a pour point of 40° C. or less (preferably 50° C. or less) and a specific gravity of 0.84 or less (preferably 0.83 or less).

Other Oils

The polymer concentrate may also comprise oils in addition to the plasticizer including aliphatic napthenic oils, white oils, and the like. Particularly preferred oils include paraffinic or napthenic oils such as Primol 352, or Primol 876 available from ExxonMobil Chemical France, S.A. in Paris, France.

Other Plasticizers

Other types of plasticizers suitable for use in the polymer concentrate include phthalates, mellitates, adipates, and the like. Examples of suitable plasticizers also include the substituted phthalates, mellitates, adipates, and the like, wherein the substitutions comprise C1 to C20 hydrocarbons. Preferred plasticizers include di-iso-undecyl phthalate (DIUP), di-iso-nonylphthalate (DINP), dioctylphthalates (DOP) combinations thereof, and/or derivatives thereof, and/or the like. Examples of suitable plasticizers include those commercially available under the trade name JayFlex™, available from ExxonMobil, Baytown Tex., examples of which are listed in Table 3c.

TABLE 3c

Other Plasticizers

| Tradename | Chemical Name | Specific Gravity 20/20° C. | Density @ 20° C. lb/Gal | Viscosity @ 40° C. Cst |
|---|---|---|---|---|
| Jayflex 77 | diisoheptyl phthalate | 0.994 | 8.29 | 18 |
| Jayflex DHP | dihexyl phthalate | 1.007 | 8.39 | 15 |

TABLE 3c-continued

Other Plasticizers

| Tradename | Chemical Name | Specific Gravity 20/ 20° C. | Density @ 20° C. lb/Gal | Viscosity @ 40° C. Cst |
|---|---|---|---|---|
| Jayflex DIDP | diisodecyl phthalate | 0.967 | 8.07 | 38 |
| Jayflex DIDP-E | diisodecyl phthalate | 0.968 | 8.07 | 39 |
| Jayflex DINP | diisononyl phthalate | 0.974 | 8.12 | 33 |
| Jayflex DIOP | diisooctyl phthalate | 0.985 | 8.21 | 25 |
| Jayflex DTDP | diisotridecyl phthalate | 0.955 | 7.96 | 86 |
| Jayflex UDP | undecyl dodecyl phthalate | 0.957 | 7.98 | 70 |
| Jayflex L11P-E | electrical grade | 0.954 | 7.96 | 29 |
| Jayflex L11P | di-1-undecyl) phthalate | 0.955 | 7.96 | 28 |
| Jayflex L711P | di-1-undecyl) phthalate | 0.970 | 8.09 | |
| Jayflex L911P | di-1-(nonyl, undecyl) phthalate | 0.962 | 8.02 | 25 |
| Jayflex L9P | di-1-nonyl phthalate | 0.970 | 8.09 | 22 |
| Jayflex TINTM | triisononyl trimellitate | 0.978 | 8.16 | 129 |
| Jayflex TIOTM | triisooctyl trimellitate | 0.990 | 8.26 | 92 |
| Jayflex DIDA | diisodecyl adipate | 0.919 | 7.66 | 13 |
| Jayflex DINA | diisononyl adipate | 0.922 | 7.69 | 12 |
| Jayflex DIOA | diisooctyl adipate | 0.928 | 7.74 | 9 |
| Jayflex DTDA | ditridecyl adipate | 0.914 | 7.62 | 27 |
| Jayflex 210 | naphthenic hydrocarabon | 0.887 | 7.40 | 9.3 |
| Jayflex 215 | aliphatic hydrocarbon | 0.769 | 6.41 | 2.4 |

Additives

The polymer concentrate of the present invention may also comprise one or more additives in combination with the polymer concentrate. In one embodiment, the additives may also function as a plasticizer (i.e., may affect various physical and/or chemical properties of the polymer concentrate). Additives suitable for use in the inventive polymer concentrate disclosed herein may comprise one or more of aPP-g-iPP grafted polymers (i.e., amorphous polypropylene grafted to isotactic polypropylene) as described below, $C_2$-$C_{40}$ polymers, elastomers, random copolymers, impact copolymers, tackifiers, crosslinking agents, antioxidants, neutralizing agents, nucleating agents, slip agents, fillers, adhesion promoters, waxes, low molecular weight polymers, ester polymers, and/or other such additives. Additives may be present at up to 50 wt % (preferably up to 40 wt %, preferably up to 30 wt %, preferably up to 20 wt %, preferably up to 10 wt %, preferably up to 5 wt %, preferably up to 2 wt %, preferably up to 1 wt %) of the polymer concentrate.

aPP-g-iPP Polymers

Preferred additives include grafted polymers, which are described in U.S. Ser. No. 10/686,951, filed Oct. 15, 2003 and U.S. Ser. No. 10/687,508, filed Oct. 15, 2003, which are incorporated by reference herein. In particular, pages 23 to 91 of U.S. Ser. No. 10/686,951 and pages 22 to 168 of U.S. Ser. No. 10/687,508 provide specific instruction on how to produce the grafted polymers useful herein. In general preferred grafted polymers comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of semi-amorphous polypropylene present in the grafted polymer is grafted to isotactic polypropylene, represented herein as (aPP-g-iPP) and/or such that an amount of isotactic polypropylene present in the grafted polymer is grafted to amorphous polypropylene, represented herein as (iPP-g-aPP). In another embodiment, the semi-amorphous polymer of the concentrate may be an aPP-g-iPP polymer, provided the aPP-g-iPP polymer has a heat of fusion of 70 J/g or less.

Elastomers

Elastomers suitable for use in the polymer concentrate include all natural and synthetic rubbers, including those defined in ASTM D 1566. In a preferred embodiment, elastomers may be rubber toughened compositions. In a particularly preferred embodiment, the rubber toughened composition is a two (or more) phase system where the rubber is a discontinuous phase within a continuous phase comprising a semi-crystalline polyolefin. Examples of preferred elastomers include ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene. Elastomers may be present as part of the concentrate in some embodiments or as part of the article presursor other embodiments.

Random Copolymers

In another embodiment, the polymer concentrate may comprise a random copolymer. Random copolymers suitable for use herein may be produced by copolymerizing propylene in a single reactor process with other monomers such as ethylene, butene and higher alpha-olefins, the most common one being ethylene. Ethylene content for these additive copolymers preferably ranges from 2-3 mole % (preferably 3-4 mole %), up to 14-17 mole %.

Impact Copolymers

In another embodiment the polymer concentrate may further comprise one or more impact copolymers (as a semicrystalline polymer), also called heterophasic blends, heterophasic copolymers or block copolymers. Impact copolymers suitable for use herein may be defined to be a blend of isotactic PP and an elastomer such as an ethylene-propylene rubber. In a preferred embodiment the impact copolymer blend is present in a two (or more) phase system where the impact copolymer is a discontinuous phase in the polymer concentrate and one or more of the other additives as described above, is the continuous phase.

Tackifiers

The polymer concentrate may also include tackifiers. Examples of suitable tackifiers may be selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar, meaning that the tackifier is substantially free of monomers having polar groups. Preferably, the polar groups are not present, however if they are present, they are preferably not present at more that 5 wt %, preferably not more that 2 wt %, even more preferably no more than 0.5 wt %. In some embodiments the tackifier may have a Ring and Ball softening point, as measured by ASTM E-28 of 80° C. to 150° C., preferably 100° C. to 130° C. In another embodiment the resins is liquid and has a Ring and Ball softening point of between 10° C. and 70° C.

Preferred additives include hydrocarbon resins used as tackifiers or modifiers which include resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. No. 5,571, 867, U.S. Pat. No. 5,171,793 and U.S. Pat. No. 4,078,132. These resins may be obtained from the cationic polymerization of compositions containing one or more of the following monomers: C5 diolefins (such as 1-3 pentadiene, isoprene, and the like); C5 olefins (such as 2-methylbutenes, cyclopentene, and the like); C6 olefins (such as hexene), C9 vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).

Also preferred additives include hydrocarbon resins used as tackifiers or modifiers which include resins obtained by the thermal polymerization of dicyclopentadiene, and/or the thermal polymerization of dimers or oligomers of cyclopentadiene and/or methylcyclopentadiene, and/or with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins for use as additives herein include those described in U.S. Pat. No. 4,078,132; WO 91/07472; U.S. Pat. No. 4,994,516; EP 0 046 344 A; EP 0 082 726 A; and U.S. Pat. No. 5,171,793.

Crosslinking Agents

In another embodiment the polymer concentrate may further comprises a crosslinking agent. Preferred crosslinking agents include those having functional groups that can react with functional groups present on the random copolymer of propylene. Preferred crosslinking agents include alcohols, multiols, amines, diamines and/or triamines. Particular examples of crosslinking agents useful in this invention include polyamines such as ethylenediamine, diethylenetriamine, hexamethylenediamine, diethylaniinopropylamine, and/or menthanediamine.

Antioxidants

In another embodiment, the polymer concentrate may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4ethyl-6-t-butyl-phenol), 2,2'-methylene-bis(6-cyclohexyl-4-methylphenol), 1,6-hexanediol-bis([3-(3,5-di-t-butyl[4-hydroxyphenyl])propionate, and pentaerythrityl-tetrakis-[3-(3,5-di-t-butyl-4-hydroxyphenyl)]propionate. Preferred antioxidants include phenolic antioxidants, such as Irganox 1010, Irganox, 1076 both available from Ciba-Geigy.

Neutralizing Agents/Nucleating Agents

The polymer concentrate of the present invention may also include a neutralizing agent such as calcium stearate, magnesium hydroxide, aluminum hydroxide or hydrotalcite, and/or a nucleating agent such as a salt of benzoic acid, sodium-2, 2'-methylene-bis(4,6-di-t-butylphenyl) phosphate and benzyl sorbitol, and the like.

The polymer concentrate of the present invention may also include a nucleating agent. For the purposes of this invention, a nucleating agent is defined as a substance that, when added to a polyolefin at between 0.01 and 10 wt %, increases the crystallization temperature of the polyolefin by at least 5° C. as measured by DSC. Typically, nucleating agents also increase the rate of crystallization (both isothermal and non-isothermal crystallization) of the polyolefin. A special class of nucleating agents known as clarifying agents reduce the size of crystallites, thereby improving the transparency and clarity of articles made from the polyolefin.

Suitable nucleating agents are disclosed in Plastics Additive Handbook, 5th Ed.; H. Zweifel, Ed.; Hanser-Gardner Publications, (2001); Chapter 18, p. 949-972. Suitable nucleating agents are also disclosed by H. N. Beck in Heterogeneous Nucleating Agents for Polypropylene Crystallization, J. APPLIED POLY. SCI. Vol. 11, p. 673-685 (1967) and in Heterogeneous Nucleation Studies on Polypropylene, J. POLY. SCI.: POLY. LETTERS, Vol. 21, p. 347-351 (1983).

Suitable nucleating agents can be either homogeneous nucleating agents (i.e., soluble in the polyolefin) or heterogeneous nucleating agents (i.e., suspended or dispersed in the polyolefin). Suitable nucleating agents promote at least one crystal polymorph for the polyolefin. For example, when the polyolefin is polypropylene (PP), known crystal forms include the so-called alpha, beta, and gamma polymorphs; suitable nucleating agents therefore include those that promote alpha crystals in PP, those that promote beta crystals in PP, and those that promote gamma crystals in PP. Suitable nucleating agents improve one or more performance parameters of the polyolefin, such as increased clarity, reduced haze, increased stiffness, increased impact toughness, increased heat deflection temperature; and/or processing parameters, such as reduced cycle time or increased line speed.

The following list is intended to be illustrative of suitable choices of nucleating agents for inclusion in the instant formulations.

Suitable nucleating agents include fillers such as silica, kaolin, carbon black, and talc; metal salts including sodium salts, lithium salts, potassium salts, phosphonic acid salts, carboxylate salts, and aromatic carboxylic-acid salts (including norbornene carboxylic-acid salts); metal phosphates (including sodium phosphates), phosphate esters, and phosphate ester salts; metal salts of suberic acid (including the calcium salt); metal salts of hexahydrophthalic acid; salts of disproportionated rosin esters; sorbitol derivatives, including dibenzylidene sorbitol and derivatives, sorbitol acetal and derivatives, and sorbitol di-acetal and derivatives; quinacridone dyes; carboxamide derivatives, including naphthalene carboxamide derivatives; benzenetrisamide derivatives; trimesic acid derivatives; and polymeric nucleating agents such as poly(3-methyl-1-butene), poly(dimethylstyrene), poly(ethylene terephthalate), polyamides (nylons), and polycarbonates.

Specific examples of suitable nucleating agents are sodium benzoate and sodium naphthenoate, sodium 2,2'-methylenebis(4,6-di-tert-butylphenyl) phosphate, aluminum 2,2'-methylenebis(4,6-di-tert-butylphenyl) phosphate, di(p-tolylidene) sorbitol, dibenzylidene sorbitol, di(p-methylbenzylidene) sorbitol, di(p-ethylbenzylidene) sorbitol, bis(3,4-dimethylbenzylidene) sorbitol, and N',N'-dicyclohexyl-2,6-naphthalenedicarboxamide.

Additional specific examples of suitable nucleating agents include those available from Milliken Chemical under the "Millad" and "Hyperform" tradenames, including Millad 3905, Millad 3940, Millad 3988, HPN-68; those available from Ciba Specialty Chemicals under the "Irgaclear" and "Irgastab" tradenames, including Irgaclear D, Irgaclear DM, Irgaclear DM-LO, Irgastab NA11UH; those available from Asahi Denka Kogyo under the "ADKstab", "Amfine", and "NA" tradenames, including NA-11 and NA-21; those available from Mitsui Chemicals under the "NC" tradename, including NC-4; those available from New Japan Chemical under the "NJSTAR", "NU", "Gel All", and "Geniset" tradenames, including NU100, Gel All D, Gel All MD, Gel All DH, Geniset Md.; those available from EC Chemical (Japan) under the "EC" tradename, including EC-1, EC-4.

Suitable nucleating agents are disclosed in U.S. Pat. No. 4,016,118; U.S. Pat. No. 4,371,645; U.S. Pat. No. 5,049,605; U.S. Pat. No. 6,235,823; US 2004/0132884; WO 02/046300; WO 03/102069; EP 776933.

Preferred nucleating agents include dibenzylidene sorbitol derivatives, phosphate ester derivatives, and benzenetrisamide derivatives. Particularly preferred nucleating agents include Millad 3988, HPN-68, Irgaclear DM, NA-11, and sodium benzoate.

Slip Agents

The polymer concentrate of the present invention may also include a slip agent. The slip agent is preferably a fast bloom slip agent, and can be a hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate.

In one embodiment the slip agent is an ionic compound. Ionic slip agents include salt derivatives of aromatic or aliphatic hydrocarbon oils, notably metal salts of fatty acids, including metal salts of carboxylic, sulfuric, and phosphoric aliphatic saturated or unsaturated acid having a chain length of 7 to 26 carbon atoms, preferably 10 to 22 carbon atoms. Examples of suitable fatty acids include the monocarboxylic acids lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, and the like, and the corresponding sulfuric and phosphoric acids. Suitable metals include Li, Na, Mg, Ca, Sr, Ba, Zn, Cd, Al, Sn, Pb and so forth. Representative salts include, for example, magnesium stearate, calcium stearate, sodium stearate, zinc stearate, calcium oleate, zinc oleate, magnesium oleate and so on, and the corresponding metal higher alkyl sulfates and metal esters of higher alkyl phosphoric acids.

In another embodiment, the fatty acid metal salts are substantially absent from the polyolefin compositions of the present invention. By "substantially absent," it is meant that these compounds are not added deliberately to the compositions and, if present, are present at less than 1 weight %, more preferably less than 0.8 weight %, more preferably less than 0.5 weight %, more preferably less than 0.1 weight %, more preferably less than 0.05 weight %, more preferably less than 0.01 weight %, more preferably less than 0.001 weight %, based upon the weight of the composition.

In one embodiment the slip agent is a non-ionic functionalized compound. Suitable functionalized compounds include: (a) esters, amides, alcohols and acids of oils including aromatic or aliphatic hydrocarbon oils, for example, mineral oils, naphthenic oils, paraffinic oils; natural oils such as castor, corn, cottonseed, olive, rapeseed, soybean, sunflower, other vegetable and animal oils, and so on. Representative functionalized derivatives of these oils include, for example, polyol esters of monocarboxylic acids such as glycerol monostearate, pentaerythritol monooleate, and the like, saturated and unsaturated fatty acid amides or ethylenebis(amides), such as oleamide, erucamide, linoleamide, and mixtures thereof, glycols, polyether polyols like Carbowax, and adipic acid, sebacic acid, and the like; (b) waxes, such as carnauba wax, microcrystalline wax, polyolefin waxes, e.g. polyethylene waxes; (c) fluoro-containing polymers such as polytetrafluoroethylene, fluorine oils, fluorine waxes and so forth; and (d) silicon compounds such as silanes and silicone polymers, including silicone oils, polydimethylsiloxane, amino-modified polydimethylsiloxane, and so on.

Fatty amides useful in the present invention as slip agents are represented by the formula:

where R is a saturated or unsaturated alkyl group having of from 7 to 26 carbon atoms, preferably 10 to 22 carbon atoms, and $R^1$ is independently hydrogen or a saturated or unsaturated alkyl group having from 7 to 26 carbon atoms, preferably 10 to 22 carbon atoms. Compounds according to this structure include for example, palmitamide, stearamide, arachidamide, behenamide, oleamide, erucamide, linoleamide, stearyl stearamide, palmityl palmitamide, stearyl arachidamide and mixtures thereof.

Ethylenebis(amides) useful as slip agents in the present invention are represented by the formula:

$$RC(O)NHCH_2CH_2NHC(O)R$$

where each R is independently is a saturated or unsaturated alkyl group having of from 7 to 26 carbon atoms, preferably 10 to 22 carbon atoms. Compounds according to this structure include for example, stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof.

Commercially available examples of fatty amides include Ampacet 10061 which comprises 5% of a 50:50 mixture of the primary amides of erucic and stearic acids in polyethylene; Elvax 3170 which comprises a similar blend of the amides of erucic and stearic acids in a blend of 18% vinyl acetate resin and 82% polyethylene. These slip agents are available from DuPont. Slip agents also are available from Croda Universal, including Crodamide OR (an oleamide), Crodamide SR (a stearamide), Crodamide ER (an erucamide), and Crodamide BR (a behenamide); and from Crompton, including Kemamide S (a stearamide), Kemamide B (a behenamide), Kemamide O (an oleamide), Kemamide E (an erucamide), and Kemamide (an N,N'-ethylenebisstearamide). Other commercially available slip agents include Erucamid ER erucamide.

Generally preferred concentrations of the fatty amide slip agent are in the range of from about 0.001% to about 0.5% by weight of the composition, preferably of from about 0.01% to about 0.4% by weight and most preferably of from about 0.1 parts to about 0.3% by weight based on the weight of the composition. Generally preferred concentrations of the saturated fatty acid amide or ethylene-bis(amide) are in the range of from about 0.001 parts to about 0.5 parts by weight, preferably from about 0.025 parts to about 0.25 parts by weight, more preferably from about 0.05 parts to about 0.15 parts by weight based on the weight of the composition. Generally, preferred concentrations of the unsaturated fatty acid amide or ethylene-bis(amide) are in the range of from about 0.001 parts to about 1 part by weight, preferably from about 0.05 parts to about 0.75 parts by weight and most preferably of from about 0.1 parts to about 0.3 parts by weight based on the weight of the composition.

In a preferred embodiment the polymer concentrate comprises both a nucleating agent and a slip agent.

Fillers

In another embodiment, the polymer concentrate may comprise fillers. Suitable fillers include titanium dioxide, calcium carbonate, barium sulfate, silica, silicon dioxide, carbon black, sand, glass beads, mineral aggregates, talc, clay, wollastonite, mica, and the like.

Suitable fillers may have particles with an average aspect ratio greater than 1, preferably greater than 2, preferably greater than 3, preferably greater than 5, preferably greater than 10, preferably greater than 100, or may be pulverized or otherwise made into a fine dust such that the average aspect ratio of the filler particles is essentially 1. Preferably, the median particle diameter is 500 microns or less, preferably 400 microns or less, preferably 300 microns or less, preferably 200 microns or less, preferably 100 microns or less, preferably 80 microns or less, preferably 60 microns or less, preferably 40 microns or less, preferably 20 microns or less, preferably 10 microns or less, preferably 5 microns or less, preferably 2 microns or less, preferably 1 micron or less, preferably 0.5 micron or less, preferably 0.2 micron or less, preferably 0.1 micron or less, preferably 0.05 microns or less, preferably 0.02 micron or more, preferably 0.05 micron or more, preferably 0.1 micron or more, preferably 0.5 micron or more, preferably 1 micron or more, 5 microns or more, preferably 10 microns or more, preferably between 0.2 and 250 microns, preferably between 2 and 150 microns.

Additional embodiments contemplated include a nanoclay, also referred to herein as a nanocomposite, comprising organo-clay, and the polyolefin of the present invention, preferably the polyolefin comprising stabilization functionality, preferably the stabilization functionality being covalent.

The organo-clay may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

The organo-clay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

The organo-clay is preferably present in the nanocomposite at from 0.1 to 50 wt %, based on the total weight of the nanocomposite. The stabilization functionality may be selected from one or more of phenols, ketones, hindered amines, substituted phenols, substituted ketones, substituted hindered amines, and combinations thereof.

The nanocomposite may further comprise at least one elastomeric ethylene-propylene copolymer. The at least one elastomeric ethylene-propylene copolymer may be present in the nanocomposite from 1 to 70 wt %, based on the total weight of the nanocomposite. The nanocomposite may further comprise at least one non-functionalized thermoplastic polyolefin.

Preferably, the stabilization functionality is present in the at least one stabilization functionalized thermoplastic, and the organo-clay is present in the nanocomposite, each in an effective amount such that the heat aged failure of a molded sample of the nanocomposite by 10% when compared to a reference nanocomposite made with a thermoplastic polyolefin containing functionality substantially free of covalently-bonded stabilization functionality. In an embodiment, the stabilization functionality may be present in the at least one stabilization functionalized thermoplastic polyolefin from 0.01 to 15 wt % based on the total weight of the at least one stabilization functionalized thermoplastic.

The non-functionalized thermoplastic polyolefin is preferably miscible with the at least one first stabilization functionalized thermoplastic polyolefin. In such an embodiment, the at least one non-functionalized thermoplastic polyolefin may also be present in the nanocomposite from 1 to 40 wt %, based on the total weight of the nanocomposite, and the organo-clay may be present in the nanocomposite from 0.5 to 40 wt %, based on the total weight of the nanocomposite. Preferably, both the at least one first stabilization functionalized thermoplastic polyolefin and the at least one non-functionalized thermoplastic polyolefin each comprise one of polypropylene or polyethylene.

In another embodiment, a nanocomposite suitable for use in the polymer concentrate of the present invention may comprise:

a) at least one first non-functionalized polypropylene present in the nanocomposite from 10 to 98 wt %, based on the total weight of the nanocomposite;

b) at least one second polypropylene comprising stabilization functionality, the stabilization functionality selected from one or more of phenols, ketones, hindered amines, substituted phenols, substituted ketones, substituted hindered amines, or combinations thereof, and the stabilization functionality present in the stabilization functionalized polypropylene from 0.05 to 15 wt %, based on the total weight of the of the polypropylene comprising stabilization functionality, the at least one second polypropylene comprising stabilization functionality present in the nanocomposite from 10 to 90 wt %, based on the total weight of the nanocomposite;

c) an organo-clay wherein the organo-clay comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt, or combinations thereof, wherein the organo-clay further comprising a clay selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica, and wherein the organo-clay is present in the nanocomposite from 1 to 30 weight %, based on the total weight of the nanocomposite; and d) further comprising one or more of an ethylene-propylene elastomeric copolymer or an isobutylene rubber present in the nanocomposite at 2 to 70 wt %, based on the total weight of the nanocomposite.

Adhesion Promoters

In another embodiment the polymer concentrate may comprise one or more adhesion promoters including polar acids, polyaminoamides (such as Versamid 115, 125, 140, available from Henkel), urethanes (such as isocyanate/hydroxy terminated polyester systems, e.g. bonding agent TN/Mondur Cb-75 from Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins. Examples include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaminopropyltrimethoxysilane, ureidopropyltrimethyloxysilane, bis-.gamma.-trimethoxysilyl-propylurea, 1,3,5-tris-.gamma.-trimethoxysilylpropylisocyanurate, bis-.gamma.-trimethoxysilylpropylmaleate, fumarate and .gamma.-methacryloxypropyltrimethoxysilane, aminopropyltriethoxysilane, and combinations and derivatives thereof.

Waxes

Preferred waxes suitable for use in the polymer concentrate include polar or non-polar waxes, polypropylene waxes, polyethylene waxes, and wax modifiers. Particularly preferred waxes may be selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, ricebran wax, jojoba wax, bayberry wax, montan wax, peat wax, ozokerite wax, ear wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition.

Ester Polymers

In another embodiment the polymer concentrate may comprise one or more ester polymers (polyesters). In a preferred embodiment the additive comprises a blend of two (or more) phase system, where the polyester is a discontinuous phase.

Stabilizers

In another embodiment the polymer concentrate may comprise one or more stabilizers. Stabilizers suitable for use herein include hindered phenols, sulfur phenols, phosphorous-containing phenols, 1,3,5-trimethyl-2,4,6-tris(3-5-di-tert-butyl-4-hydroxybenzyl) benzene, pentaerythritol tetrakis-3(3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof.

Other Additives

Other preferred additives suitable for use in the polymer concentrate include block, antiblock, pigments, dyes, dyestuffs, processing aids, UV stabilizers, lubricants such as polydimethylsiloxane and calcium sterate, adjuvants, surfactants, color masterbatches, flow improvers, crystallization aids, antioxidants, polymeric additives, defoamers, preservatives, thickeners, rheology modifiers, humectants, fillers, water, and the like.

Polymeric additives may include homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

Desirable plasticizers and/or additives for use in the present invention may thus be described by any embodiment described herein, or any combination of the embodiments described herein. For example, in one embodiment, the plasticizer may include an NFP comprising a $C_6$ to $C_{200}$ paraffin having a pour point of less than −25° C. In another embodiment, the NFP may comprise an aliphatic hydrocarbon having a viscosity of from 0.1 to 1000 cSt at 100° C. In yet another embodiment, the polymer concentrate may comprise a polymer concentrate combined with a plasticizer and an additive such as a phthalate.

Polymer Concentrate

The polymer concentrate of the present invention may comprise a blend of one or more plasticizers (and optional additives) in combination with a one or more semi-amorphous polymers. The polymer concentrate may comprise a blend of semi-amorphous polymers or the polymer concentrate may comprise a blend of a semi-amorphous polymer and at least one semi-crystalline polymer. In a preferred embodiment, the polymer concentrate comprises a semi-amorphous polymer and a semi-crystalline polymer. The semi-amorphous polymer preferably comprises an alpha olefin copolymer, and the semi-crystalline polymer preferably comprises an alpha olefin homopolymer or copolymer, or heterophasic copolymer or blend with majority alpha olefin homopolymer or copolymer. More preferably, both the semi-amorphous polymer and the semi-crystalline polymer comprise ethylene, propylene, and/or ethylene and propylene.

In another embodiment, the concentrate comprises an "insitu" (also called a "reactor blend") impact copolymer and a plasticizer.

The impact copolymer may be a reactor blend of between 95 and 78, desirably between 90 and 80, and more desirably between 88 and 80 wt % of polypropylene (preferably homopolypropylene) and between 5 and 22, desirably between 10 and 20, and more desirably between 12 and 20 wt % of ethylene-propylene rubber. The ethylene propylene rubber is generally amorphous and is composed generally less than about 50 wt % ethylene, desirably of between 45 and 50, more desirably between 46 and 49, and most desirably between 47 and 48 wt % ethylene. The impact copolymer may be made in series reactors for a more intimately mixed blend. The polypropylene component of the impact copolymer may have a melt flow rate range of 1-275 g/10 min while the melt flow rate range of the ethylene propylene rubber component of the impact copolymer may have a melt flow rate in the range of 5-150 g/10 min. Commercially available impact copolymers suitable for use herein include PP7715E2 and PP7715E4 which are available from ExxonMobil Chemical Company. For specific details of how to produce impact copolymers please see U.S. Pat. No. 6,399,707. Likewise for a description of other examples of useful impact copolymers please see page 37 to 41 of WO 2004/014998.

Semi-Amorphous Polymer

In an alternate embodiment, the semi-amorphous polymer has an mm triad tacticity index of 75% or more (preferably 80% or more, preferably 85% or more, preferably 90% or more). Preferred semi-amorphous polymers have a melt flow rate determined by ASTM D1238 of 0.1 to 2000 dg/min (preferably 100 dg/min or less) at 230° C. In an alternate embodiment, the semi-amorphous polymer has an intermolecular compositional distribution as determined by thermal fractionation in hexane such that 85% by weight or more of the polyolefin is isolated as one or two adjacent, soluble fractions with the balance of the polyolefin in immediately preceding or succeeding fractions; and wherein each of these fractions has a wt % comonomer content with a difference of no greater than 20 wt % relative to the average wt % comonomer content of the copolymer polyolefin. In an alternate embodiment, the semi-amorphous polymer has an Mw/Mn of 1.5 to 40, preferably 1.6 to 20, preferably 1.8 to 10, even more preferably 1.8 to 2.5.

In an alternate embodiment, the semi-amorphous polymer useful herein has a heat of fusion of less than 70 J/g and a mm triad tacticity index of 75% or more; and/or a Melt Flow Rate (measured at 230° C.) of 0.1 to 2000 dg/min (preferably 100 dg/min or less); and/or an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and/or an Mw/Mn of 1.5 to 4.

In particular, preferred semi-amorphous polymers useful in this invention preferably have a percent crystallinity of 0.1% to less than 35% crystallinity. Preferably within this range, the semi-amorphous polymer of the polymer concentrate comprises less than 30% crystallinity, preferably less than 25% crystallinity, preferably less than 20% crystallinity, preferably less than 15% crystallinity, preferably less than 10% crystallinity. Also preferably, the semi-amorphous polymer of the polymer concentrate comprises at least 0.5% crystallinity, preferably at least 1% crystallinity, preferably at least 2% crystallinity, preferably at least 5% crystallinity.

Preferred semi-amorphous polymers useful in this invention preferably have a Melt Flow Rate (MFR) of 0.1 to 200 dg/min, preferably 0.1 to 100, preferably 0.5 to 50, preferably 1 to 25, preferably 1 to 15, preferably 2 to 10 dg/min (as measured by ASTM 1238, 2.16 kg and 230° C.); alternately the MFR is from 15 to 50 dg/min.

Preferred semi-amorphous polymers useful in this invention preferably have a DSC melting point of 105° C. or less, preferably 90° C. or less, preferably between 25 and 90° C., preferably between 30 and 80° C., preferably between 35 and 75° C., as measured by the DSC procedure described herein.

Preferred semi-amorphous polymers useful in this invention preferably have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8° C. between stages.

The intermolecular composition distribution of the copolymer may be determined by thermal fractionation in hexane as follows: about 30 grams of the semi-amorphous polymer is cut into small cubes of about ⅛ inch (0.32 cm) on the side and is then introduced into a thick walled glass bottle closed with screw cap along with 50 mg of Irganox1076, an antioxidant commercially available from Ciba-Geigy Corporation. Then, 425 ml of hexane (a principal mixture of normal and iso-isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the semi-amorphous polymer soluble at 40° C., 48° C., 55° C., and 62° C. are obtained at temperature increases of approximately 8° C. between stages.

The soluble polymers are dried, weighed and analyzed for composition, as wt % ethylene content. To produce a copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

Preferred semi-amorphous polymers useful in this invention preferably have a molecular weight distribution (Mw/Mn) of Mw/Mn of less than 5, preferably between 1.5 and 4, preferably between 1.5 and 3.

In an embodiment, the semi-amorphous polymer of the polymer concentrate may comprise at least 50% ethylene or propylene. Preferably, the semi-amorphous polymer of the polymer concentrate comprises a first monomer comprising at least 50 wt % ethylene or at least 50 wt % propylene, more preferably at least 50% propylene, and at least one other comonomer polymer comprising C2, and $C_4$-$C_{20}$ olefin, which is different from the first monomer. The first monomer and comonomer(s) of the semi-amorphous polymer of the polymer concentrate are preferably $C_2$-$C_6$ alpha olefins.

In a preferred embodiment, the semi-amorphous polymer may comprise a propylene-based copolymer referred to herein as a random copolymer of propylene or as a propylene-"comonomer" plastomer (e.g., propylene-ethylene plastomer). Suitable random copolymers of propylene have a heat of fusion of less than 70 J/g, and thus are semi-amorphous, and preferably comprise an average propylene content on a molar basis of from about 68 mol % to about 92 mol %, more preferably from about 75 mol % to about 91 mol %, even more preferably from about 78 mol % to about 88 mol %, most preferably from about 80 mol % to about 88 mol %. The balance of the random copolymer of propylene (i.e., the one or more comonomers) may be one or more alpha-olefins as specified above and/or one or more diene monomers. Most preferably the balanced of the random copolymer of propylene is ethylene.

The comonomer of the random copolymer of propylene may comprises about 8 to 32 mol % of ethylene (C2) and/or a $C_4$-$C_{20}$ olefin, more preferably about 9 to about 25 mol %, even more preferably about 12 to about 22 mol %, with about 13 to 20 mol % being still more preferred.

More preferably, the random copolymer of propylene comprises about 8 to 32 mol % ethylene, more preferably about 9 to about 25 mol % ethylene, even more preferably about 12 to about 22 mol % ethylene, with about 13 to 20 mol % ethylene being still more preferred as the comonomer.

The random copolymer of propylene may have a weight average molecular weight (Mw) of 5,000,000 or less, a number average molecular weight (Mn) of about 3,000,000 or less, a z-average molecular weight (Mz) of about 5,000,000 or less, and a g' index of 1.5 or less measured at the weight average molecular weight (Mw) of the polymer using isotactic polypropylene as the baseline, all of which may be determined by GPC, also known as size exclusion chromatography, e.g., 3D SEC.

In a preferred embodiment, the random copolymer of propylene may have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 300,000, wherein Mw is determined as described herein.

In a preferred embodiment, the random copolymer of propylene may have a Mn of about 5,000 to about 3,000,000 g/mole, more preferably a Mn of about 10,000 to about 1,000,000, more preferably a Mn of about 30,000 to about 500,000, more preferably a Mn of about 50,000 to about 200,000, wherein Mn is determined as described herein.

In a preferred embodiment, the random copolymer of propylene may have a Mz of about 10,000 to about 5,000,000 g/mole, more preferably a Mz of about 50,000 to about 1,000,000, more preferably a Mz of about 80,000 to about 500,000, more preferably a Mz of about 100,000 to about 300,000, wherein Mz is determined as described herein.

The molecular weight distribution index (MWD=(Mw/Mn)) of the random copolymer of propylene may be about 1.5 to 40.0, more preferably about 1.8 to 5 and most preferably about 1.8 to 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practice, and references cited therein.

In a preferred embodiment, the random copolymer of propylene may have a g' index value of about 1 to about 1.5, more preferably a g' of about 1.25 to about 1.45, when measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the random copolymer of propylene and $\eta_1$ is the intrinsic viscosity of a linear polymer of the same viscosity-averaged molecular weight ($M_v$) of the random copolymer of propylene. $\eta_1 = KM_v^\alpha$, K and α were measured values for linear polymers and should be obtained on the same instrument as the one used for the g' index measurement.

In a preferred embodiment, the random copolymer of propylene may have a crystallization temperature (Tc) measured with differential scanning calorimetry (DSC) of about 200° C. or less, more preferably, 150° C. or less.

In a preferred embodiment, the random copolymer of propylene may have a density of about 0.85 to about 0.95 g/ml, more preferably, about 0.87 to 0.92 g/ml, more preferably about 0.88 to about 0.91 g/ml as measured per the ASTM D-1505 test method at 25° C.

In a preferred embodiment, the random copolymer of propylene may have a melt flow rate (MFR) equal to or greater than 0.2 g/10 min., preferably between 2-500 g/10 min. and more preferably between 20-200 g/10 min., as measured according to the ASTM D-1238 test method.

In a preferred embodiment, the random copolymer of propylene may have a heat of fusion (Hf) determined according to the procedure described in ASTM E 794-85, which is less than 70 J/g, preferably greater than or equal to about 0.5 Joules per gram (J/g), and is less than or equal to about 25 J/g. Preferably less than or equal to about 20 J/g, preferably less than or equal to about 15 J/g. Also preferably greater than or equal to about 1 J/g, preferably greater than or equal to about 5 J/g according to the procedure described in ASTM E 794-85.

A chiral metallocene catalyst may ensure methyl groups of the propylene residues in the random copolymer of propylene have predominantly the same tacticity. Both syndiotactic and isotactic configuration of the propylene are possible, though the isotactic polymers may be preferred. The tacticity of the propylene residues leads to an amount of crystallinity in the polymers. The relatively low levels of crystallinity in the random copolymer of propylene may be derived from isotactic polypropylene obtained by incorporating alpha-olefin comonomers as described above.

The random copolymer of propylene may be partially crystalline, which preferably arises from crystallizable stereoregular propylene sequences. For use herein, the crystallinity of the random copolymer of propylene can also be expressed in terms of percentage of crystallinity, based on the heat of fusion of the polymer divided by the thermal energy for the highest order of polypropylene, which is estimated at 189 J/g (i.e., 100% crystallinity is equal to 189 J/g.) for purposes herein.

The random copolymer of propylene of the present invention preferably has a polypropylene crystallinity of about 0.25% to about 15%, more preferably 0.5 to 25%, more preferably 1 to 20%, more preferably 2 to 15%, more preferably from about 0.5% to about 13%, and most preferably from about 0.5% to about 11%.

In addition to this level of crystallinity, the random copolymer of propylene preferably has a single broad melting transition. However, suitable random copolymer of propylene polymer may show secondary melting peaks adjacent to the principal peak, but for purposes herein, such secondary melting peaks are considered together as a single melting point, with the highest of these peaks being considered the melting point of the random copolymer of propylene. The random copolymer of propylene preferably has a melting point of less than 100° C., preferably from about 25° C. to about 75° C., preferably about 25° C. to about 65° C., more preferably about 30° C. to about 60° C.

The procedure for Differential Scanning Calorimetry (DSC) is described as follows: About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

The random copolymer of propylene may have a Mooney viscosity ML (1+4)@125° C., as determined according to ASTM D1646, of less than 100, more preferably less than 75, even more preferably less than 60, most preferably less than 30.

The random copolymer of propylene of the present invention preferably comprises a random crystallizable copolymer having a narrow compositional distribution. The intermolecular composition distribution of random copolymer of propylene (e.g., the narrow compositional distribution) may be determined by thermal fractionation in a solvent such as a saturated hydrocarbon e.g., hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt % ethylene content) with a difference of no greater than 20% (relative) and more preferably 10% (relative) of the average weight percent (wt %) ethylene content of random copolymer of propylene. Thus the semi-amorphous random polypropylene copolymer is said to have a narrow compositional distribution if it meets this fractionation test criteria.

The length and distribution of stereoregular propylene sequences in a preferred random copolymer of propylene is consistent with substantially random statistical copolymerization. It is well known that sequence length and distribution are related to the copolymerization reactivity ratios. By substantially random, we mean a copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the random copolymer of propylene polymer may be determined by 13C NMR in such as way so as to locate the ethylene residues in relation to the neighboring propylene residues.

As outlined herein, to produce random copolymer of propylene with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred random copolymer of propylene polymers.

A preferred random copolymer of propylene used in the present invention is described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice.

In addition to one or more comonomers making up the major portion of the random copolymer of propylene polymer (i.e., alpha-olefins) selected such as, but not limited to, ethylene, alpha-olefins having 4 to 8 carbon atoms, and styrenes, random copolymer of propylene polymers, as described above can contain long chain branches, which can optionally be generated using one or more alpha, omega-dienes.

Alternatively, random copolymer of propylene may comprise at least one diene, and more preferably at least one non-conjugated diene, which may aid in vulcanization and other chemical modification and/or cross-linking processes. The amount of diene in random copolymer of propylene may preferably be no greater than about 10 wt %, more preferably no greater than about 5 wt %.

In a preferred embodiment, the diene may be selected from the group consisting of those that are used for the vulcanization of ethylene propylene rubbers. Specific examples of preferred dienes include ethylidene norbornene, vinyl norbornene, dicyclopentadiene, and 1,4-hexadiene (available from DuPont Chemicals).

In another embodiment, the semi-amorphous polymer of the polymer concentrate may comprise random copolymer of propylene in the form of a blend of discrete random copolymers of propylene. Such blends can include two or more polyethylene copolymers (as described above), two or more polypropylene copolymers (as described above), or at least one of each such polyethylene copolymer and polypropylene copolymer, so long as each of the polymers of the random copolymer of propylene blend would individually qualify as a random copolymer of propylene. Each of the random copolymers of propylene are described above and the number of random copolymer of propylene in a preferred embodiment may be three or less, more preferably two or less.

In an embodiment of the invention, the random copolymer of propylene polymer may comprise a blend of two random copolymer of propylene polymers differing in the olefin content. Preferably, one random copolymer of propylene may comprise about 7 to 13 mole % olefin, while the other random copolymer of propylene may comprise about 14 to 22 mole % olefin. In an embodiment, the preferred olefin in the random copolymer of propylene is ethylene.

The random copolymer of propylene polymers useful in the instant invention preferably comprise a particular triad tacticity. The term "tacticity" refers to the stereogenicity in the polymer. For example, the chirality of adjacent monomers can be of either like or opposite configuration. The term "diad" is used herein to designate two contiguous monomers; thus, three adjacent monomers are referred to herein as a triad. In the instance wherein the chirality of adjacent monomers is of the same relative configuration, the diad is termed isotactic. In the instance wherein the chirality of adjacent monomers is in an opposite relative configuration, the diad is termed syndiotactic. Another way to describe the configurational relationship is to term contiguous pairs of monomers having the same chirality as meso (m) and those of opposite configuration racemic (r).

When three adjacent monomers are of the same configuration, the stereoregularity of the triad is abbreviated as "mm". If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in a polymer may be determined, and then multiplied by 100 to indicate the percentage of that type of triad found in the polymer. The reactivity ratios and sequence distribution of the polymer may be determined by C-13 NMR, which locates the ethylene residues in relation to the neighboring propylene residues.

Random copolymers of propylene have unique propylene tacticity as measured by the % meso triad. As shown in detail in U.S. Ser. No. 09/108,772, filed Jul. 1, 1998, fully incorporated herein by reference, random copolymer of propylene polymers of this invention have a lower % meso triad for any given ethylene content when compared to U.S. Pat. No. 5,504,172. The lower content of % meso triads corresponds to relatively lower crystallinity that translates into better elastomeric properties such as high tensile strength and elongation at break coupled with very good elastic recovery. Good elastomeric properties are important for some of the potential applications of the present invention.

Preferred random copolymers of propylene used in embodiments of the present invention have a mm tacticity index (m/r), also referred to herein as a propylene tacticity index and/or as mm triad tacticity index, of at least 75%. The propylene tacticity index, expressed herein as "m/r", is determined by 13C nuclear magnetic resonance (NMR). The propylene tacticity index m/r is calculated as defined in H. N. Cheng, *Macromolecules,* 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the random copolymers of propylene have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred random copolymers of propylene useful in this invention have an mm triad tacticity index of three propylene units, as measured by $^{13}$C NMR, of 75% or greater, 80% or greater, 82% or greater, 85% or greater, or 90% or greater. The mm triad tacticity index of a polymer is the relative tacticity of a sequence of three adjacent propylene units, a chain consisting of head to tail bonds, expressed as a binary combination of m and r sequences. For purposes herein, it is expressed for semi-amorphous copolymers of the present invention as the ratio of the number of units of the specified tacticity to all of the propylene triads in the copolymer. The tacticity index (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

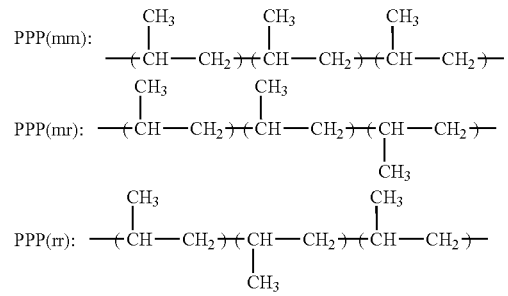

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the mm triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP (mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The triad tacticity can be determined from a $^{13}$C-NMR spectrum of the polymer, as described by J. A. Ewen, "Catalytic Polymerization of Olefins", (the Ewen method); and Eds. T. Keii, K. Soga; Kodanska Elsevier Pub.; Tokyo, 1986, P 271, and as described in detail in U.S. Patent Application US2004/054086 filed Mar. 18, 2004 on page 8, in numbered paragraphs [0046] to [0054], all of which are incorporated by reference herein.

Propylene polymers useful as semi-amorphous polymers herein are available commercially under the trade name Vistamaxx™ (ExxonMobil, Baytown Tex.). Suitable examples include: VM 1100, VM1120, VM2100, VM2120, VM2125, VM2210, VM2260, VM2320, VM2330, VM2371, VM3000, VM6100, VM6200.

In a preferred embodiment, the semi-amorphous polymers useful herein have a density of 0.88 g/cc or less, more preferably 0.87 g/cc or less, most preferably 0.86 g/cc or less. In another preferred embodiment, the semi-amorphous polymer has a % crystallinity of 15% or less, preferably 10% or less, preferably 5% or less. In another preferred embodiment, the semi-amorphous polymer comprises at least 50 mole % ethylene and has a % crystallinity of 15% or less, preferably 10% or less, preferably 5% or less. In another preferred embodiment, the semi-amorphous polymer comprises at least 50 mole % propylene and has a % crystallinity of 25% or less, preferably 20% or less, preferably 15% or less.

Preparation of Semi-Amorphous Random Copolymers of Propylene

Random copolymer of propylene useful as semi-amorphous polymers herein can be prepared by polymerizing propylene with one or more of a C2 or C4-C20 alpha olefin, most preferably the random copolymer of propylene comprises propylene and ethylene. The monomers are preferably polymerized in the presence of a chiral metallocene catalyst with an activator and optionally a scavenger. The comonomer or comonomers used in combination with propylene may be linear and/or branched. Preferred linear alpha-olefins include ethylene or C4 to C8 alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene.

In a preferred embodiment, a continuous solution polymerization process may be used to produce random copolymer of propylene comprising, for example, propylene and one or more of ethylene, octene or a diene. The polymerization process preferably utilizes a metallocene catalyst, namely, 1,1'-bis(4triethylsilylphenyl)methylene-(cyclopentadienyl) (2,7-di-tertiary-butyl-9-fluorenyl)hafnium dimethyl with dimethylaniliniumtetrakis(pentafluorophenyl) borate as an activator. An organoaluminum compound, namely, tri-n-octylaluminum, may be added as a scavenger to the monomer feed streams prior to introduction into the polymerization process. For production of more crystalline polymers, dimethylsilylbis(indenyl)hafnium dimethyl may be used in combination with dimethylaniliniumtetrakis(pentafluorophenyl) borate. Preferably the solution polymerization is conducted in a single, or in two, continuous stirred tank reactors connected in series. Hexane may be used as the solvent. In addition, toluene may be added to increase the solubility of the co-catalyst. The feed is transferred to the first reactor where the exothermic polymerization reaction is conducted adiabatically at a reaction temperature between about 50° C. to about 220° C. Hydrogen gas may also be added to the reactors as a further molecular weight regulator. If desired, polymer product is then transferred to the second reactor, which is also operated adiabatically at a temperature between about 50° C. to 200° C.

Additional monomers, solvent, metallocene catalyst, and activators can be fed to the second and/or additional reactors. The polymer content leaving the second reactor is preferably from 8 to 22 weight percent. A heat exchanger then heats the polymer solution to a temperature of about 220° C. The polymer solution is then brought to a Lower Critical Solution Temperature (LCST) liquid-liquid phase separator which causes the polymer solution to separate into two liquid phases—an upper lean phase and a lower polymer-rich phase. The upper lean phase contains about 70 wt % of the solvent and the lower polymer rich phase contains about 30 wt % polymer. The polymer solution then enters a low pressure separator vessel which operates at a temperature of about 150° C. and a pressure of 4-10 bar-g (400 to 1000 Pa) and flashes the lower polymer rich phase to remove volatiles and to increase the polymer content to about 76 wt %. A gear pump at the bottom of the flash vessel drives the polymer rich solution to a List devolatilizer. An extruder is coupled to the end of the List devolatilizer whereby the polymer material is transferred to a gear pump which pushes the polymer material through a screen pack. Then the polymer may be cut into pellets and fed to a water bath. A spin dryer may be used to dry the polymer pellets, which preferably have a final solvent content of less than about 0.5 wt %.

As stated above, preferred random copolymers of propylene of the present invention may be prepared by polymerizing propylene and at least one C2 or $C_4$-C20 alpha olefin in the presence of a chiral metallocene catalyst with an activator and optional scavenger, most preferably ethylene and propylene. Preferred chiral metallocenes are those known to favor incorporation of propylene for the production of predominantly isotactic polypropylene pentads and statistically random incorporation of the alpha-olefin comonomer(s). The term "metallocene" and "metallocene catalyst precursor" are terms known in the art to mean compounds possessing a Group IV, V, or VI transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (also referred to as an activator) in order to yield an active metallocene catalyst or catalyst system. An active metallocene catalyst refers generally to an organometallic complex with a vacant coordination site that can coordinate, insert, and polymerize olefins.

Preferred metallocenes for use herein include bridged and unbridged biscyclopentadienyl complexes where the cyclopentadienyl group are, independently, a substituted or unsubstituted cyclopentadienyl group, a substituted or unsubstituted indenyl group, or a substituted or unsubstituted fluorenyl group. Preferred metallocenes include those represented by the formula: $TCpCpMX_2$, where T is a bridging group such as a dialkyl silica group (such as dimethylsilyl) or a hydrocarbyl group (such as methyl, ethyl, or propyl), each Cp is, independently a substituted or unsubstituted cyclopentadienyl group, a substituted or unsubstituted indenyl group (preferably a 2, 4 or 2, 4, 7 substituted indenyl group), or a substituted or unsubstituted fluorenyl group, M is a group 4 metal (preferably Hf, Zr or Ti) and each X is independently a halogen or hydrocarbyl group (such as chlorine, bromine, methyl, ethyl, propyl, butyl, or phenyl).

Preferred metallocenes for use herein include cyclopentadienyl (Cp) complexes which have two Cp ring systems for ligands. The Cp ligands preferably form a "bent sandwich complex" with the metal and are preferably locked into a rigid configuration through a bridging group. Such preferred cyclopentadienyl complexes may have the general formula:

$(Cp^1R^1m)R^3n(Cp^2R^2p)MXq$

Wherein $Cp^1$ of ligand $(Cp^1R^1m)$ and $Cp^2$ of ligand $(Cp^2R^2p)$ are preferably the same, $R^1$ and $R^2$ each are, independently, a halogen or a hydrocarbyl, halocarbyl, hydrocarbyl-substituted organometalloid or halocarbyl-substituted organometalloid group containing up to 20 carbon atoms;

m is preferably 1 to 5;

p is preferably 1 to 5;

preferably two $R^1$ and/or $R^2$ substituents on adjacent carbon atoms of the cyclopentadienyl ring associated there can be joined together to form a ring containing from 4 to 20 carbon atoms;

$R^3$ is a bridging group;

n is the number of atoms in the direct chain between the two ligands and is preferably 1 to 8, most preferably 1 to 3;

M is a transition metal having a valence of from 3 to 6, preferably from group 4, 5, or 6 of the periodic table of the elements and is preferably in its highest oxidation state;

each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243; 5,278,264; 5,296,434; and 5,304,614, all of which are incorporated by reference for purposes of U.S. patent practice. Illustrative, but not limiting examples of preferred biscyclopentadienyl metallocenes of the type described above for the invention include the racemic isomers of:

μ-(CH3)2Si(indenyl)2M(Cl)2

μ-(CH3)2Si(indenyl)2M(CH3)2

μ-(CH3)2Si(tetrahydroindenyl)2M(Cl)2

μ-(CH3)2Si(tetrahydroindenyl)2M(CH3)2

μ-(CH3)2Si(indenyl)2M(CH2CH3)2

μ-(C6H5)2C(indenyl)2M(CH3)2;

wherein M may include Zr, Hf, and/or Ti.

Preferably these metallocenes are used in combination with one or more alumoxanes (preferably methyl alumoxane, or modified methyl alumoxane) and or one or more ionic activators such as N,N-dimethylanilinium tetraphenylborate, N,N-dimethylanilinium tetrakis(pentafluorophenyl) borate, diphenylcarbenium tetra(perfluorophenyl)borate, or N,N-dimethylanilinium tetrakis (heptafluoronaphthyl) borate.

Ethylene Based Semi-Amorphous Polymer

In another embodiment, the semi-amorphous polymer of the polymer concentrate may comprise a copolymer comprising at least 50 wt % ethylene, and having up to 50 wt %, preferably 1 to 35 weight %, even more preferably 1 to 6 weight % of a $C_3$-$C_{20}$ comonomer. The polyethylene copolymers preferably have a composition distribution breadth index (CDBI) above 90%, even more preferably above 95%. In another preferred embodiment the ethylene copolymer has a density of 0.86 to 0.925 g/cm$^3$ and a CDBI of over 90%, preferably between 95% and 99%. In another embodiment, the ethylene copolymer has a melt flow rate at 190° C. of 0.1 to 100 dg/min, preferably 0.5 to 50 dg/min, more preferably 0.8 to 30 dg/min.

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this invention a homopolymer is defined to have a CDBI of 100%.

The C3 to C20 and C4 to C20 olefin comonomers for the polyethylene or polypropylene copolymers described above may be any polymerizable olefin monomer and are preferably a linear, branched or cyclic olefin, even more preferably an alpha-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1. Suitable comonomers also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene. Preferred comonomers for the copolymer of ethylene are propylene, butene, hexene and/or octene.

The polyethylene or polypropylene copolymers described above may also contain termonomers and tetramonomers which may be one or more of the C3 to C20 olefins described above, any C4 to C20 linear, cyclic or branched dienes or trienes and any styreneic monomers such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

In a preferred embodiment, the polyethylene copolymers described above are metallocene polyethylenes (mPE's). The mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename EXACT™. For more information on the methods and catalysts/activators to produce such mPE homopolymers and copolymers see WO 94/26816; WO 94/03506; EPA 277,003; EPA 277,004; U.S. Pat. No. 5,153, 157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92

00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

Examples of Exact Plastomers suitable for use herein as semi-amorphous polymers include:

EXACT-Plastomers

| EXACT-Plastomers Grade | Composition | Density (g/cm3) | Melt-Index (dg/min) | DSC-Melting Peak (° C.), 10° C./min |
|---|---|---|---|---|
| 3024 | Ethylene/butene | 0.905 | 4.5 | 98 |
| 3035 | Ethylene/butene | 0.900 | 3.5 | 88 |
| 3128 | Ethylene/butene | 0.900 | 1.2 | 92 |
| 4006 | Ethylene/butene | 0.880 | 10 | 60 |
| 4011 | Ethylene/butene | 0.888 | 2.2 | 70 |
| 4033 | Ethylene/butene | 0.880 | 0.8 | 60 |
| 4049 | Ethylene/butene | 0.873 | 4.5 | 55 |
| 3040 | Ethylene/hexene | 0.900 | 16.5 | 96 |
| 3131 | Ethylene/hexene | 0.900 | 3.5 | 95 |
| 3132 | Ethylene/hexene | 0.900 | 1.2 | 96 |
| 3139 | Ethylene/hexene | 0.900 | 7.5 | 95 |
| 4056 | Ethylene/hexene | 0.883 | 2.2 | 72 |
| 4151 | Ethylene/hexene | 0.895 | 2.2 | 89 |
| 0201 | Ethylene/octene | 0.902 | 1.1 | 95 |
| 0203 | Ethylene/octene | 0.902 | 3.0 | 95 |
| 0210 | Ethylene/octene | 0.902 | 10 | 96 |
| 0230 | Ethylene/octene | 0.902 | 30 | 95 |
| 5061 | Ethylene/octene | 0.868 | 0.5 | 53 |
| 5062 | Ethylene/octene | 0.860 | 0.5 | 43 |
| 5101 | Ethylene/octene | 0.902 | 1.1 | 98 |
| 5171 | Ethylene/octene | 0.870 | 1.0 | 55 |
| 5181 | Ethylene/octene | 0.882 | 1.1 | 73 |
| 5361 | Ethylene/octene | 0.860 | 3.0 | 36 |
| 5371 | Ethylene/octene | 0.870 | 5.0 | 64 |
| 8201 | Ethylene/octene | 0.882 | 1.1 | 67 |
| 8203 | Ethylene/octene | 0.882 | 3.0 | 73 |
| 8210 | Ethylene/octene | 0.882 | 10 | 67 |
| 8230 | Ethylene/octene | 0.882 | 30 | 77 |

Other Semi-Amorphous Polymers

Other suitable polymer concentrate semi-amorphous polymers include propylene homopolymer and/or propylene copolymers that have been contacted with less than about 10 wt % of a semi-crystalline branched or coupled polymeric nucleating agent under nucleation conditions. Such polymer concentrates may be produced with an activated non metallocene, metal-centered, heteroaryl ligand catalyst, as described in WO 03/040095 on pages 21-52. Examples include a propylene/ethylene copolymer comprising at least about 60 weight percent of units derived from propylene and at least about 0.1 weight percent of units derived from ethylene.

Particular embodiments of such polymers include a propylene/ethylene copolymer comprising at least about 60 weight percent of units derived from propylene and at least about 0.1 weight percent of units derived from ethylene, as disclosed in WO 03/040095 A2 at page 9.

Other polymers useful as the semi-amorphous polymer in the polymer concentrate include one or more polypropylene copolymers having elastic properties. Such preferred propylene copolymers having elastic properties may be prepared according the procedures in WO 02/36651 which is incorporated by reference here. Likewise, the concentrate may comprise polymers consistent with those described in WO 03/040202, WO 03/040095, WO 03/040201, WO 03/040233, and/or WO 03/040442. Additionally, the polymer concentrate may comprise polymers consistent with those described in EP 1,233,191, and U.S. Pat. No. 6,525,157.

Semi-Crystalline Polymer

Polymer concentrates of present invention may also include a semi-crystalline polymer, preferably at least 1 wt % of a semi-crystalline polymer. A semi-crystalline polymer preferably has a melting point of 100° C. or greater, preferably between 100 and 170° C., preferably between about 100 and 160° C. Furthermore, a semi-crystalline polymer also preferably has at least 30% crystallinity, preferably at least 40% crystallinity, preferably at least 50% crystallinity. Preferably, the polymer concentrate comprises one or more C2-C40 poly alpha olefin polymers or copolymers. Still more preferably, the semi-crystalline polymer of the polymer concentrate of the polymer concentrate is isotactic polypropylene (iPP) comprising at least 80% [m] dyads, based on the total number of dyads present in the polymer. Preferably, the semi-crystalline polymer of the polymer concentrate has a 1% secant flexural modulus of 20 MPa or more, preferably 50 MPa or more, preferably 80 MPa or more, 100 MPa or more, preferably 200 MPa or more, preferably 400 MPa or more, preferably 600 MPa or more, preferably 800 MPa or more, preferably 1000 MPa or more.

In an embodiment, the semi-crystalline polymer of the polymer concentrate of the polymer concentrate may include various semi-crystalline C2-C40 polyolefin polymers or copolymers, either alone, or in a blend with other polymers. Accordingly, the semi-crystalline polymer may comprise a single discrete polymer, or a blend of discrete polymers. Such blends may include two or more polyolefins such as polypropylene-polyethylene copolymers, two or more polypropylene copolymers, or a propylene polymer or copolymer and an ethylene polymer or copolymer, where the polymers in the blend each qualify as a semi-crystalline polymer, or wherein the total blend qualifies as a semi-crystalline polymer (e.g., having a melting point of 100° C. or higher).

In a preferred embodiment the semi-crystalline polymer is a metallocene based polyethylene (mPE) and/or metallocene based polypropylene (mPP). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted.

In another embodiment, the polymer concentrate may comprise a semi-crystalline polymer comprising at least one of homopolypropylene, isotactic polypropylene, highly isotactic polypropylene (e.g., having greater than about 50% m-pentads), syndiotactic polypropylene, random copolymer of propylene and ethylene and/or butene and/or hexene, polybutene, ethylene/vinyl acetate copolymer, low density polyethylene (density 0.915 to less than 0.935 g/cm3) linear low density polyethylene, ultra low density polyethylene (density 0.86 to less than 0.90 g/cm3), very low density polyethylene (density 0.90 to less than 0.915 g/cm3), medium density polyethylene (density 0.935 to less than 0.945 g/cm3), high density polyethylene (density 0.945 to 0.98 g/cm3), ethylene/methylacrylate copolymer, ethylene/acrylate copolymer, copolymers of acrylic acid, ethylene/acrylic acid copolymers, polymethylmethacrylate or any other polymers polymerizable by a high-pressure free radical process, polyvinylchloride, polybutene-1, isotactic polybutene, acrylonitrile-butadiene-styrene (ABS) resins, elastomers such as ethylene-propylene rubber (EPR), vulcanized EPR, EPDM, block copolymer elastomers such as styrene-butadiene-styrene (SBS), styrene-ethylene/butene-styrene (SEBS), nylons (polyamides), polycarbonates, PET (polyethylene terephthalate) resins, crosslinked polyethylene, copolymers of ethylene and vinyl alcohol (EVOH), polymers of aromatic monomers such as polystyrene, poly-1 esters, graft copolymers generally, polyacrylonitrile homopolymer or copolymers, thermoplastic polyamides, polyacetal, polyvinylidine fluoride and other fluorinated elastomers, polyethylene glycols and polyisobutylene, so long as the polymer has a melting point of about 100° C. or higher.

The semi-crystalline polymer of the polymer concentrate may include syndiotactic rich C3-C40 homopolymer or copolymer, isotactic C3-C40 homopolymer or copolymer, which may be defined as being a polyolefin homopolymer or copolymer having less than 90 wt % solubility in toluene at room temperature.

The semi-crystalline syndiotactic rich polypropylene, (srPP) may be defined herein to comprise at least about 80% [r] dyads. Preferably at least about 85% [r] dyads, with at least about 90% [r] dyads preferred, with at least about 95% [r] dyads more preferred, with at least about 99% [r] dyads yet still more preferred.

The semi-crystalline isotactic polypropylene, (iPP) may be defined herein to comprise at least about 80% [m] dyads. Preferably at least about 85% [m] dyads, with at least about 90% [m] dyads preferred, with at least about 95% [m] dyads more preferred, with at least about 99% [m] dyads yet still more preferred.

In a preferred embodiment, preferred semi-crystalline polymers may include polypropylene and/or other alpha olefins such as ethylene (C2) and from C4 to C40 alpha olefins. Examples of alpha olefins include butene-1, pentene-1, hexene-1, heptene-1, octene-1, nonene-1, decene-1, undecene-1, dodecene-1, tridecene-1, penetdecene-1, hexadecene-1, heptadecene-1, octadecene-1, and branched olefins including 3-methylbutene-1,4-methylepentene-1, and 4,4-dimethylepentene-1. Suitable comonomers may also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene. Preferred comonomers for the copolymer of ethylene are propylene, butene, hexene and/or octene.

In another embodiment, the semi-crystalline polymer may comprise a homopolymer or a copolymer comprising at least 50 wt % ethylene, and having up to 50 wt %, preferably 1 to 35 weight %, even more preferably 1 to 6 weight % of a $C_3$-$C_{20}$ comonomer.

In another embodiment, the semi-crystalline polymer may comprise a copolymer comprising at least 50 wt % propylene, and having up to 50 wt %, preferably 1 to 35 wt %, even more preferably 1 to 6 wt % ethylene, and/or a C4-C20 comonomer.

The polyethylene or polypropylene copolymers described in relation to the semi-crystalline polymer of the polymer concentrate may also contain termonomers and tetramonomers which may be one or more of the C3 to C20 olefins described above, any C4 to C20 linear, cyclic or branched dienes or trienes and any styreneic monomers such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

In a preferred embodiment, the semi-crystalline polymer comprises a metallocene based propylene homopolymer or copolymer. The polypropylene copolymer preferably has an MFR (melt flow rate) of 1 to 20 as measured according to ASTM D 1238 (230° C., 2.16 kg). In another embodiment the polypropylene copolymer preferably has a CDBI of 50% or more, preferably above 60%, even more preferably above 70%. Polypropylenes having a CDBI above 60% are available from Exxon Chemical Company in Baytown, Tex. under the tradename ACHIEVE™.

Examples of ACHIEVE polymers include:

| Achieve Polymers | Melt Flow Rate |
|---|---|
| Achieve 1605 | 32 |
| Achieve 1654E1 | 16 |
| Achieve 3825 | 32 |
| Achieve 3854 | 24 |

In an embodiment, the semi-crystalline polymer comprises an ethylene homopolymer or an ethylene copolymer having a composition distribution breadth index (CDBI) of less than 90%, preferably of 50% or more, preferably above 60%, even more preferably above 70%. In one embodiment the CDBI is above 60% and less than 85%, even more preferably between 60 and 80%. In another particularly preferred embodiment, the ethylene copolymer has a CDBI between 65 and 85%, even more preferably between 70 and 85%. In a particularly preferred embodiment the ethylene copolymer has a CDBI of 65 to 85%, a density of 0.915 to 0.96 g/cm³ and a Mw/Mn between 1 and 2.5.

In a preferred embodiment, the polyethylene copolymers described above are metallocene polyethylenes (mPE's). The usage of the term polyethylene herein is defined to include metallocene polyethylenes. The mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename EXCEED™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

Examples of Exceed™ Polymers suitable for use herein include:

| EXCEED-Polymers | | |
|---|---|---|
| Exceed Polymers Grade | Melt Index (g/10 min) | Density (g/cm³) |
| Exceed 2227ED | 2.2 | 0.927 |
| Exceed 1012CA | 1 | 0.912 |
| Exceed 1018CA | 1 | 0.918 |
| Exceed 1018CC | 1 | 0.918 |
| Exceed 1018DA | 1 | 0.918 |
| Exceed 1018EA | 1 | 0.918 |
| Exceed 1018EB | 1 | 0.918 |
| Exceed 1018FA | 1 | 0.918 |

-continued

EXCEED-Polymers

| Exceed Polymers Grade | Melt Index (g/10 min) | Density (g/cm³) |
|---|---|---|
| Exceed 1018LC | 1 | 0.918 |
| Exceed 1018LE | 1 | 0.918 |
| Exceed 1023CA | 1 | 0.923 |
| Exceed 1318CA | 1.25 | 0.918 |
| Exceed 1327CA | 1.3 | 0.927 |
| Exceed 1327ED | 1.3 | 0.927 |
| Exceed 1518CA | 1.5 | 0.918 |
| Exceed 1518EC | 1.5 | 0.918 |
| Exceed 2018CA | 2 | 0.918 |
| Exceed 2018EB | 2 | 0.918 |
| Exceed 2718CB | 2.7 | 0.918 |
| Exceed 3418CB | 3.5 | 0.918 |
| Exceed 3512 CB | 3.5 | 0.912 |
| Exceed 3518 Series | 3.5 | 0.918 |
| Exceed 3527CB | 3.5 | 0.927 |
| Exceed 4518PA | 4.5 | 0.918 |
| Exceed 1018 Series | 1 | 0.918 |

In a preferred embodiment, the semicrystalline polymer is an impact copolymer having a melt flow rate of 0.2 to dg/min or more (as measured by ASTM 1238 at 230° C.)(preferably 0.2 to 200 dg/min, preferably 0.5 to 150 dg/min, preferably 1 to 50 dg/min) preferably comprising polypropylene and ethylene-propylene copolymer. Preferably, the propylene-based impact copolymer is made using an in-situ blending process, where two or more reactors are combined in parallel or series to make the different components of the impact copolymer, which are subsequently blended together before entering the finishing stage of the manufacturing process. Preferably, the synthesis involves combining two or more of the following technologies: gas-phase polymerization, slurry polymerization, solution polymerization.

Suitable impact copolymers are commercially available from ExxonMobil Chemical, Dow Chemical (including those marketed under the "Inspire" tradename), and Sunoco Chemical. Suitable examples include:

ExxonMobil Chemical impact copolymers

| Grade | Melt Flow Rate (g/10 min, 2.16 kg, 230° C.) | Flexural Modulus (MPa) |
|---|---|---|
| AXO3B | 35 | 1270 |
| Exxpol Enhance 8114 | 27 | 1000 |
| Exxpol Enhance 8224 | 27 | 1000 |
| PP7032 | 4-5 | 1100-1345 |
| PP7033 | 8 | 1120-1250 |
| PP7035 | 35 | 1100 |
| PP7414 | 20 | 1034 |
| PP7684 | 20 | 1290 |
| PP7694 | 19 | 1270 |

Dow Chemical impact copolymers

| Grade | Melt Flow Rate (g/10 min, 2.16 kg, 230° C.) | Flexural Modulus (MPa) |
|---|---|---|
| 7C05 | 15 | 1230 |
| 7C06 | 1.5 | 1280 |
| 7C12 | 22 | 1230 |
| 7C50 | 8 | 960 |
| C104 | 1.2 | 1240 |
| C700 | 35 | 1520 |
| C702 | 18 | 1035 |
| C759 | 21 | 1380 |
| C783 | 3.8 | 1340 |
| Inspire D114 | 0.5 | 1260 |
| Inspire D334 | 1.9 | |
| Profax SC204 | 3.8 | 1590 |
| Profax SC315 | 3.8 | 1310 |
| Profax SD242 | 35 | 1450 |
| Profax SG702 | 18 | 1100 |
| Profax SG722 | 25 | 1030 |
| Profax SG802N | 35 | 1100 |
| Profax SG875 | 35 | 1030 |
| Profax SV152 | 1.4 | 1100 |
| Profax SV258 | 1.2 | 1240 |
| Profax SV955 | 35 | 1450 |
| Profax 7523 | 4 | 1170 |
| Profax 7624 | 1.4 | 1170 |
| Profax 7823 | 0.45 | 1100 |
| Profax 8623 | 1.5 | 970 |
| Profax 8523 | 4 | 970 |

Sunoco Chemical impact copolymers

| Grade | Melt Flow Rate (g/10 min, 2.16 kg, 230° C.) | Flexural Modulus (MPa) |
|---|---|---|
| KN-501 | 8 | 1170 |
| KS-501 | 18 | 1100 |
| KV-751 | 35 | 1170 |
| MJ-014 | 4 | 1210 |
| MV-011 | 35 | 1170 |
| MV-501 | 38 | 1310 |
| TI4005 | 0.5 | 1340 |
| TI4015 | 1.6 | 1240 |
| TI4040 | 4 | 1410 |
| TI4130 | 13 | 1100 |
| TI4230 | 21 | 1070 |
| TI4350 | 35 | 1380 |
| TI4500 | 50 | 1170 |
| TI4700 | 70 | 1310 |
| TI41000 | 100 | 1310 |
| TI4900 | 115 | 1450 |

Suitable impact copolymers are also commercially available from Basell Polyolefins. The definition of impact copolymer used herein is meant to include certain grades made using the "Catalloy" process that Basell identifies as "Advanced Polyolefins" and are commercially available under the Adflex, and Softell tradenames. Basell Polyolefins also sells impact copolymers under the Hifax and Profax tradenames. Examples include:

Basell Polyolefins impact copolymers

| Grade | Melt Flow Rate (g/10 min, 2.16 kg, 230° C.) | Flexural Modulus (MPa) |
|---|---|---|
| Adflex C200 | 6 | 230 |
| Adflex Q100 | 0.6 | 100 |
| Adflex Q300 | 0.6 | 330 |
| Adflex T100 | 2.5 | 120 |
| Adflex X100 | 8 | 100 |
| Hifax CA10 | 0.6 | 80 |

-continued

Basell Polyolefins impact copolymers

| Grade | Melt Flow Rate (g/10 min, 2.16 kg, 230° C.) | Flexural Modulus (MPa) |
|---|---|---|
| Hifax CA12 | 0.9 | 350 |
| Hifax CA60 | 14 | 80 |
| Softell CA02 | 0.6 | 20 |
| Profax SA933 | 1.4 | 970 |
| Profax SB642 | 22 | 690 |
| Profax SB823 | 20 | 1000 |
| Profax SB891 | 35 | 1380 |
| Profax SB912 | 6 | 1450 |
| Profax SC204 | 3.8 | 1590 |
| Profax SC315 | 3.8 | 1310 |
| Profax SD242 | 35 | 1450 |
| Profax SG702 | 18 | 1100 |
| Profax SG722 | 25 | 1030 |
| Profax SG802N | 35 | 1100 |
| Profax SG875 | 35 | 1030 |
| Profax SV152 | 1.4 | 1100 |
| Profax SV258 | 1.2 | 1240 |
| Profax SV955 | 35 | 1450 |
| Profax 7523 | 4 | 1170 |
| Profax 7624 | 1.4 | 1170 |
| Profax 7823 | 0.45 | 1100 |
| Profax 8623 | 1.5 | 970 |
| Profax 8523 | 4 | 970 |

Polymer Concentrate

The polymer concentrate preferably comprises at least about 1 wt % of semi-amorphous polymer. Preferably, at least about 10 wt %, preferably at least about 20 wt %, preferably at least about 30 wt %, preferably at least about 40 wt %, preferably at least about 50 wt %, preferably at least about 60 wt %, preferably at least about 70 wt %, preferably at least about 80 wt %, preferably at least about 90 wt %, preferably at least about 95 wt %, preferably at least about 99 wt % of semi-amorphous polymer, based on the total weight of the concentrate.

Further, in additional embodiments, the polymer concentrate preferably comprises at least about 1 wt % of semi-crystalline polymer. Preferably, at least about 5 wt %, preferably at least about 10 wt %, preferably at least about 20 wt %, preferably at least about 30 wt %, preferably at least about 40 wt %, preferably at least about 50 wt %, preferably at least about 60 wt %, preferably at least about 70 wt %, preferably at least about 80 wt %, preferably at least about 90 wt %, preferably at least about 99 wt % of semi-crystalline polymer, based on the total weight of the polymer concentrate.

In a particularly preferred embodiment, the concentrate comprises from 5 to 70 weight % of semi amorphous polymer (preferably 5 to 95 weight %, preferably 5 to 85 weight %, preferably 10 to 80 weight %, preferably 10 to 75 weight %, preferably 20 to 50 weight %), from 5 to 70 weight % of semi-crystalline polymer (preferably 1 to 60 weight %, preferably 10 to 75, weight %, preferably 20 to 50 weight %) and from 5 to 75 weight % of one or more plasticizers (preferably 5 to 60 weight %, preferably 10 to 45 weight %, preferably 10 to 35 weight %), based upon the weight of the semi-amorphous polymer, the semi-crystalline polymer and the plasticizer. In a particularly preferred embodiment, the semi-amorphous polymer has a heat of fusion of 50 J/g or less, the semi-crystalline polymer has a melting point of 120° C. or more and the plasticizer has A) a flash point of 200° C. and B) a pour point less than −25° C. or a kinematic viscosity at 100° C. of 35 cSt or more. In another particularly preferred embodiment, the semi-amorphous polymer has a heat of fusion of 35 J/g or less, the semi-crystalline polymer is polypropylene having a melting point of 120° C. or more and the plasticizer has A) a flash point of 200° C. and B) a pour point less than −35° C. or a kinematic viscosity at 100° C. of 35 cSt or more. In another particularly preferred embodiment, the semi-amorphous polymer has a heat of fusion of 50 J/g or less and a triad tacticity of 80% or more, the semi-crystalline polymer is isotactic polypropylene, propylene random copolymer, or propylene impact copolymer having a melting point of 140° C. or more and the plasticizer has a flash point of 200° C. or more and a pour point less than −35° C. or a kinematic viscosity at 100° C. of 45 cSt or more. In another particularly preferred embodiment, the semi-amorphous polymer has a heat of fusion of 50 J/g or less and a triad tacticity of 80% or more, and the semi-crystalline polymer is isotactic polypropylene having a melting point of 140° C. or more.

Additives may be present in the polymer concentrate at less than about 90 wt %, preferably less than about 80 wt %, preferably less than about 70 wt %, preferably less than about 60 wt %, preferably less than about 50 wt %, preferably less than about 40 wt %, preferably less than about 30 wt %, preferably less than about 20 wt %, preferably less than about 10 wt %, preferably less than about 5 wt %, preferably less than about 1 wt %, preferably less than about 0.1 wt %, based on the total weight of the polymer concentrate.

In a preferred embodiment, the polymer concentrate comprises greater than or equal to about 1%, preferably greater than or equal to about 10%, preferably greater than or equal to about 20%, preferably greater than or equal to about 30%, preferably greater than or equal to about 40%, preferably greater than or equal to about 50% random copolymer of propylene as described above. More preferably, the polymer concentrate comprises greater than 60%, preferably greater than about 70%, preferably greater than about 80%, preferably greater than about 90%, preferably greater than about 95% random copolymer of propylene, based on the total weight of the polymer concentrate.

In a preferred embodiment, the polymer concentrate comprises less than about 99% polyolefin polymer other than the random copolymer of propylene. Preferably, the polymer concentrate comprises less than about 90%, preferably less than about 80%, preferably less than about 70%, preferably less than about 60%, preferably less than about 50%, preferably less than about 40%, preferably less than about 30%, preferably less than about 20%, preferably less than about 10%, preferably less than about 1% of the polymer concentrate comprises polyolefin polymer other than the random copolymer of propylene, based on the total weight of the polymer concentrate.

In a still more preferred embodiment, the polymer concentrate comprises 1 wt % or more isotactic polypropylene having at least 80% [m] dyads (iPP). Preferably also less than about 50% isotactic polypropylene having at least 80% [m] dyads (iPP). Preferably, the polymer concentrate comprises less than 40%, preferably less than about 30%, preferably less than about 20%, preferably less than about 10%, preferably less than about 5% iPP, based on the total weight of the polymer concentrate. Accordingly, in a preferred embodiment, the semi-crystalline polymer of the present invention may comprises polyethylene, isotactic polypropylene having at least 80% [m] dyads, syndiotactic rich polypropylene having at least 80% [r] dyads, or a combination thereof.

In another embodiment, the concentrate further comprises from 1 to 50 weight % of semi-crystalline polymer, based upon the weight of the composition, preferably 5 to 25 weight %, preferably 10 to 20 wt %.

In another embodiment, the concentrate comprises from:
a. 5 to 50 weight % of semi-crystalline polymer, preferably 15 to 40 weight %, preferably 20 to 40 wt %; from
b. from 10 to 80 wt % elastomer, preferably 15 to 50, preferably 20 to 30; and
c. 5 to 60 wt % NFP (preferably having a VI of 120 or more, a specific gravity of 0.86 or less and a pour point of −10° C. or less), preferably 10 to 50, preferably 15 to 40, based upon the weight of the composition.

Formation of Polymer Concentrates

The polymer concentrate of the present invention comprises at least 1 wt % plasticizer combined with a semi-amorphous polymer, and optionally one or more additives. Preferably the polymer concentrate (i.e., the masterbatch) of the present invention comprises at least 5 wt % plasticizer combined with a semi-amorphous polymer, and optionally one or more additives. A method to produce the polymer concentrate (or masterbatch) typically includes the steps of contacting the plasticizer, the polymers, and optionally one or more additives, under high shear conditions. The blending of the plasticizer, the polymers, and optionally, one or more additives is preferably effected under conditions where both the polymers and the plasticizer are molten or liquid and under sufficiently high shear conditions to ensure intimate mixing of the high amount of the plasticizer. If necessary or convenient, two or more of the individual components may be physically blended prior to melt blending to produce the final composition. The components of the concentrate are conveniently melt blended in a twin or single screw extruder or a kneader. Alternatively, a Banbury mixer may be used. Where a twin or single screw extruder or a kneader is used, it may be preferred to cool the screw particularly when producing concentrates containing a high plasticizer content which prevents the composition from sticking to the screw or generating sufficient friction for efficient mixing.

The ratio of the mixture of the plasticizer, and additional additives, and the polymer concentrate in the polymer concentrate may depend upon the quantity of plasticizer and/or additive desired in the end product.

In an embodiment, the polymer concentrate may be produced by melt blending (and/or other mixing procedures) the plasticizer with the polymer concentrate, and optionally with one or more additives to produce the polymer concentrate of the present invention.

The order in which the various components of the polymer concentrate are combined may be varied to affect the properties of the inventive composition. In one embodiment, the semi-amorphous polymer and the semi-crystalline polymer of the polymer concentrate may first be combined to produce a carrier composition, which may then be combined with the plasticizer and optionally one or more additives to produce the polymer concentrate.

In another embodiment, the plasticizer may be combined with the semi-amorphous polymer to produce a semi-amorphous plasticized intermediate. The semi-amorphous plasticized intermediate may then be combined with the semi-crystalline polymer to produce the polymer concentrate.

In still another embodiment, the plasticizer may be combined with the semi-crystalline polymer of the polymer concentrate to produce a semi-crystalline plasticized intermediate. The semi-crystalline plasticized intermediate may then be combined with the semi-amorphous polymer to produce the polymer concentrate.

Each of the above processes may also include incorporation of one or more additives to the individual components, to the intermediate compositions, and/or to the final polymer concentrates. Also, each of the above processes may be accomplished in one continuous process, or in a plurality of blending, mixing, compounding, and/or kneading processes known to those of skill in the art.

Properties of Polymer Concentrates

The present invention is preferably able to be pelletized into a plurality of free flowing particles. Pellets (also referred to herein as particles) of the present invention are preferably free flowing to the extent that they may be utilized in solids handling equipment typically used in commerce to produce various polymeric formulations and end products. The polymer concentrate thus provides a means for supplying various liquids to end product formulations in a solid form (i.e., as a polymer concentrate).

In an embodiment, the polymer concentrate comprises about 1 to about 90 wt % of the plasticizer. Preferably, the polymer concentrate comprises greater than or equal to about 20 wt %, preferably greater than or equal to about 30 wt %, preferably greater than or equal to about 40 wt %, preferably greater than or equal to about 50 wt %, preferably greater than or equal to about 60 wt %, preferably greater than or equal to about 70 wt %, preferably greater than or equal to about 80 wt % of the plasticizer.

Importantly, the polymer concentrate of the present invention can preferably be pelletized by conventional pelletization methods. As used herein, the term pellet may be interchangeable referred to as granules, particles, and the like, all of which are directed to discrete entities of the inventive composition. Examples of conventional pelletization methods may include the steps of extruding the polymer concentrate through a die, followed by cutting the extrudate into pellets or particles, preferably cutting or pelletizing the extrudate while in contact with a cooling fluid. Examples include the extrusion and the cutting of the composition utilizing an underwater pelletizer, such as those described in U.S. Pat. Nos. 4,569,810 and 4,663,099, the disclosures of which are incorporated herein by reference in their entirety. The cooling water is typically sufficiently cooled to solidify the material shortly after it is extruded through the die. It is preferred that the temperature of this cooling water be below about 15° C., more preferably below about 10° C. Another suitable pelletization method is the strand-cut method, where one or more strands of molten polymer exit from the extruder die into a water bath, are directed along a continuous path in such a way to keep them under water for sufficient time to cool and harden, and then exit the water bath typically to an air drier to remove water, and are subsequently pelletized. In both underwater and strand-cut pelletization methods, the water bath may be replaced by any appropriate liquid that will not dissolve the polymer, including common cooling-bath liquids like water-ethylene glycol mixtures.

It is contemplated that any conventional extruder operated under conventional conditions would be useful in pelletizing the composition of the present invention. The die hole size, extrusion speed, and the like are not regarded for purposes herein to be critical to the present invention. However, the die holes should be sufficiently small and the extrusion speed should be sufficiently slow so as to yield solid particles in combination with the temperatures of the composition and cooling fluid. After the particles have been formed in the cooling fluid it is preferred that all of the cooling fluid be separated from the particles. When a liquid is the cooling fluid, a drying step may be required.

Preferably, pellets or particles of the inventive composition are solids that do not "cold flow" to an appreciable extent at or near about 25° C. By cold flow, it is meant that little to no distortion of the material occurs in the absence of an external load or force acting on the pellets of the present invention, except for the force of gravity produced by the pellets themselves. Cold flow may also be expressed in terms of a change in dimensions and shape of a material when that material is not being subjected to stress, external weight, or pressures above normal storage conditions, generally at room temperature (e.g., 25° C.) to about 50° C. (~120° F.).

Accordingly, a pelletized polymer concentrate of the present invention may comprise a length and a width, wherein the width is less than the length. The ratio of the length to the width (i.e., the length divided by the width) is defined for purposes herein as the aspect ratio of a particular pellet of the pelletized polymer concentrate.

When a pellet of the present invention having an aspect ratio as defined above is allowed to sit on a flat surface at about 25° C. in the absence of any external force other than gravity, the aspect ratio of that pellet of the polymer concentrate preferably changes by less than 5%, preferably less than 4%, more preferably less than 3%, more preferably less than 2%, more preferably less than 1%, more preferably less than 0.5% over a period of 24 hours.

Preferably, pellets and/or particles of the polymer concentrate of the present invention may be regarded as a pourable free-flowing polymer concentrate. As such, the particles of the present invention are not tacky or sticky, and thus do not block, which is to say the pellets do not stick to one another nor to other surfaces so as to form agglomerates comprising a plurality of pellets to an extent which prevents the pellets from being pourable.

By "pourable free-flowing" it is meant that the particles will flow through a funnel and yield a pourability value according to ASTM D1895 Method B modified to use a funnel having a 29 mm bottom opening as described herein, preferably both initially and after elevated temperature storage (e.g., storage at 120° F. for 7 days). Accordingly, the particles of the present invention are pourable free-flowing in that they may be poured through a funnel having a 2.9 cm opening at the narrow end.

An initial pourability value (i.e., prior to aging or storage) of the particles of the present invention may be about 120 seconds or less, when determined according to ASTM D1895 Method B modified to use a funnel having a 29 mm bottom opening. Preferably, the pourability value is about 60 seconds or less, more preferably about 30 seconds or less, still more preferably about 10 seconds or less, more preferably about 5 seconds or less, still more preferably about 2 seconds or less, when determined according to ASTM D1895 Method B modified to use a funnel having a 29 mm bottom opening. Accordingly, the polymer concentrate of the present invention may preferably be pelletized into a plurality of pourable free flowing particles that may be poured through a funnel having a 29 mm bottom opening. In a preferred embodiment, the plurality of pourable free flowing particles of the polymer concentrate may be poured through a funnel having a 29 mm bottom opening in 120 seconds or less, preferably in 60 seconds or less, more preferably in 30 seconds or less, more preferably in 20 seconds or less.

After aging of the particles at 120° F. for 7 days, the aged pourability value of the particles of the present invention may be about 300 seconds or less, when determined according to ASTM D1895 Method B modified to use a funnel having a 29 mm bottom opening. Preferably, after aging the pourability value is about 200 seconds or less, more preferably about 100 seconds or less, still more preferably about 50 seconds or less, more preferably about 30 seconds or less, still more preferably about 10 seconds or less, when determined according to ASTM D1895 Method B modified to use a funnel having a 29 mm bottom opening.

Preferably the polymer concentrates of the present invention are not tacky at room temperature or at higher temperatures encountered during storage, and thus do not have a tendency to block or agglomerate in such a way as to prevent the free flow of the pellets. In a preferred embodiment of the present invention, the particles of the present invention do not exude plasticizer contained within the pellets. As such, in another preferred embodiment, the particles of the present invention are homogeneous, and are said not to exude plasticizer. In yet another preferred embodiment, the polymer concentrates of the present invention show no visible phase separation as demonstrated by the polymer concentrate having no visually detectable loss of the plasticizer on an absorbent surface (e.g., a paper towel) after a portion of the polymer concentrate (e.g., a plurality of pellets or particles) is aged on the absorbent surface for 24 hours at 25° C.

In a preferred embodiment, the compositions described herein are formed into particles, granules or pellets and those particles, granules or pellets are dusted with a polyolefin powder, preferably a microfine polyolefin powder. Preferably the powder is used at 0.01-10 wt % (preferably 0.1 to 5 wt %, preferably 0.1 to 1 wt %) based upon the weight the composition. Preferred polyolefin powders are typically polyethylene (including low density PE, linear-low density PE, medium density PE, and high density PE), polypropylene, or ethylene vinyl acetate copolymers. A preferred polyolefin powder is made from polyethylene with a density 0.91 to 0.96 g/cc (preferably 0.915 to 0.925 g/cc) and an MI of 1 to 100 dg/min (preferably 5 to 50 dg/min). The polyolefin powders may have a mesh size of from 1 to 100 (preferably 5 to 100, preferably 10 to 70) and a median diameter of 5 to 2000 micron (preferably 10 to 500 micron, preferably 10 to 100 micron, preferably 15 to 25 micron). Useful polyolefin powders are available from Equistar Chemical (part of Lyondell Chemical) under the tradename Microthene™, including Microthene™ F grades and Microthene™ G grades such as Microthene™ FN510, Microthene™ FN532, Microthene™ FA700, and Microthene™ FP-800. A particularly preferred microfine powder is Microthene™ FA709-00, which is a high density polyethylene powder (0.952 g/cc) having a reported melt index of 10 dg/min, a reported melting point of 134° C., and an average particle size of 20 microns.

The exudation of the plasticizer from the polymer concentrate may also be qualitatively evaluated tactilely. For example, a sample of the polymer concentrate may be aged for a week or more under a variety of conditions (e.g., at room temperature, elevated temperature, under an external force, and the like). Next, the presence of plasticizer on the surface of the sample may be evaluated by the examiner by simply wiping a clean dry absorbent cloth over the sample surface to detect the presence of exuded plasticizer. The presence of plasticizer may also be evaluated by the examiner wiping a clean dry finger over the surface of the sample to detect an oily layer or film on the surface. Results indicative of no exudation may be given a "Pass" rating, while the presence of an oily layer on the surface of the sample may be given a "Fail" rating.

The tacky character of the samples may also be qualitatively evaluated tactilely. For example, the polymer concentrate may be evaluated for being sticky to the evaluator's hand or other substrate. In an example, the particles of the polymer concentrate are not tacky in that the particles at 25° C. cannot be fully lifted off of a paper substrate by pressing one or more of the particles between the paper substrate and a clean dry finger, followed by attempting to lift the particles vertically off of the paper substrate with the finger at a rate of about 1 cm per second.

In another example, a sample strip of the polymer concentrate measuring about 2 cm wide, about 10 cm long, and about 0.2 cm thick may be placed on a paper towel or other non-sticky substrate so that the sample lies flat on a hard surface. The evaluators would then press the sample strip between the non-sticky substrate and their clean dry finger and then attempt to lift the sample vertically off of the paper towel at a rate of about 1 cm per second. Samples which did not adhere to the evaluators finger with enough force to support their own weight (i.e., cannot be fully lifted off of the substrate), may be qualitatively adjudged not to be sticky and thus obtain a Pass value. Samples which adhere to the examiners finger well enough to be lifted completely off of the surface may be qualitatively adjudged to be sticky, and thus obtain a Fail value. In place of an examiners finger, the examiner may attempt this test utilizing an identical sample of the subject material, or another substrate in place of his or her finger.

The composition of the present invention may have a plasticizer which is miscible with the polyolefin as indicated visually by the lack of phase separation between the plasticizer and the polymer concentrate, and also by no change in the number of peaks in the Dynamic Mechanical Thermal Analysis trace (DMTA according to ASTM D4065. Lack of miscibility is indicated by an increase in the number of peaks in DMTA trace over those in the unplasticized polymer concentrate.

The composition of the present invention, when viewed under an optical microscope, may also be shown to comprise a plasticizer, which is miscible with the polyolefin polymer concentrate. Preferably, the composition of the present invention is stable in that plasticizer blooming and/or exudation do not develop with time.

In an embodiment, the composition of the present invention may also be determined to be free flowing based on the following three protocols:

The first, Protocol A, may be performed as follows: The particles may be visually inspected on a flat surface. The amount of sticking together, movement relative to one another, or sticking to the surface may be noted after moving particles with an instrument. Should the particles or pellets exhibit sticking to one another and/or dragging on the flat surface, the particles would be deemed not to be free flowing and compaction testing would not be attempted, because experience has shown that if the pellets agglomerate on a flat surface, the agglomeration in a compaction test would be unacceptable. If the particles flow freely on a flat surface and do not visibly stick to each other, Protocol B, the compaction test, may then be used.

The second type of test run would be a compaction test, Protocol B. Two to ten grams (the weight of the sample will depend upon the product's density and bulk density) of a sample may be placed in a compaction cell. The compaction cell volume would be approximately 12.5 cm$^3$, the diameter of the cell is about 25 mm, and the height is approximately 25 mm. A load would then be placed on the particles of either 280 grams or 1 kilogram to simulate either a loaded box (Condition 1) or loaded bulk rail car (Condition 2), respectively. The cell with the weight would then be placed in an oven for 24 or 48 hours at one or more of three temperatures, 38° C., 49° C. and 60° C. These conditions being intended to simulate bulk handling typical of polymer compositions. The cell would then be removed from the oven, cooled to room temperature, and the condition of the pellets evaluated as to whether the pellets:

1) fused into a solid block (not free flowing)
2) remained separate (did not fuse, free flowing)
3) fused into a solid block in the cell, but broke apart easily when touched;
4) fused into a solid block but broke apart into individual pellets when pressure was applied to the pellets.

Result 1 would not indicate a free flowing composition. Results 2-4 would indicate a free flowing pellet.

The third type of test that could be run would be a flowability test, Protocol C. This test is specifically designed to simulate both the internal geometry of a bulk rail car as well as a storage silo. Both geometries are replicated in a device that has a circular cross section and has an angled bottom. In this test, a cylindrical device would be used, (referred to as a test silo) which would have a cylindrical inner cavity having a 30 cm total length axially along a central axis, and 9 cm internal diameter radially disposed about that central axis. The cylinder inner cavity would be bound on a bottom side by a narrowing (frusta-conical) constriction radially disposed about the central axis to a diameter of 3 cm, and having an angle of 30° to the central axis. Approximately 500 g of particles or pellets would be placed in the test silo with the bottom covered with a bottom stopper. The test silo would then be placed in an oven for 3 days at a predefined temperature, typically about 43° C. The test silo would then be removed from the oven, the bottom stopper would then be removed, and the time required for the test silo to empty of the pellets would be recorded. If the pellets empty in less than 5 minutes from the test silo, the pellets would be considered free flowing. If the pellets do not empty in less than 5 minutes (300 seconds), they may be prodded from the bottom of the test silo (e.g., using a spatula) and the timing continued. If another 5 minutes elapses without the container emptying, the test would be discontinued and the pellets adjudged not to be free flowing.

Use of the Polymer Concentrate

The polymer concentrate of the present invention may be utilized in producing an article. Typically a method to make an article comprises the steps of:

combining a semi-amorphous polymer having a heat of fusion of less than 70 J/g with a plasticizer and optionally one or more additives, to produce a polymer concentrate, combining the polymer concentrate with one or more final materials to produce an article precursor; and forming the article at least partially from the article precursor, preferably wherein the polymer concentrate shows no visible phase separation as demonstrated by the polymer concentrate having no visually detectable loss of the plasticizer after a portion of the polymer concentrate is aged on an absorbent surface for 24 hours at 25° C.

In another embodiment, a method to make an article comprises the steps of:

combining a plasticizer and a semi-amorphous polymer having a heat of fusion of less than 70 J/g with a semi-crystalline polymer having a melting point of 100° C. or greater, and optionally one or more additives, to a polymer concentrate, pelletizing the polymer concentrate into a plurality of free flowing particles;

combining at least a portion of the particles of the polymer concentrate with one or more final materials (such as an olefin polymer) to produce an article precursor; and forming an article at least partially from the article precursor.

In another embodiment, a method to make an article comprises the steps of:

combining an semi-amorphous polymer having a heat of fusion of less than 70 J/g with a semi-crystalline polymer having a melting point of 100° C. or greater, and optionally one or more additives, to produce a carrier composition;

combining the carrier composition with a plasticizer to produce a polymer concentrate, pelletizing the polymer concentrate into a plurality of free flowing particles;

combining at least a portion of the particles of the polymer concentrate with one or more final materials to produce an article precursor; and forming the article at least partially from the article precursor, wherein the polymer concentrate shows no visible phase separation as demonstrated by the polymer concentrate having no visually detectable loss of the plasticizer after a portion of the particles of the polymer concentrate is aged on an absorbent surface for 24 hours at 25° C.

Likewise, the order in which the components of the concentrate (the semi-amorphous polymer, the semi-crystalline polymer), the plasticizer, and optionally one or more additives are combined to produce the polymer concentrate utilized in the above methods may also be varied.

For example, in an embodiment, the method to make an article may comprise the steps of combining an semi-amorphous polymer having a heat of fusion of less than 70 J/g with a semi-crystalline polymer having a melting point of 100° C. or greater to produce a carrier composition; followed by combining the carrier composition with a plasticizer to produce a polymer concentrate, followed by combining at least a portion of the polymer concentrate with one or more final materials to produce an article precursor; and forming the article at least partially from the article precursor.

In another embodiment the method to make an article may comprise the steps of combining an semi-amorphous polymer having a heat of fusion of less than 70 J/g with a plasticizer, followed by combining with a semi-crystalline polymer having a melting point of 100° C. or greater and optionally one or more additives, to produce a polymer concentrate, followed by combining at least a portion of the polymer concentrate with one or more final materials to produce an article precursor; and forming the article at least partially from the article precursor.

In yet another embodiment, the method to make an article may comprise the steps of combining a semi-crystalline polymer having a melting point of 100° C. or greater with a plasticizer, followed by combining with an semi-amorphous polymer having a heat of fusion of less than 70 J/g, and optionally one or more additives, to produce a polymer concentrate, followed by combining at least a portion of the polymer concentrate with one or more final materials to produce an article precursor; and forming the article at least partially from the article precursor The article precursor may comprise (i.e., the one or more final materials which may be combined with the polymer concentrate of the present invention may comprise) a semi-amorphous polypropylene copolymer, a polymer comprising amorphous polypropylene grafted to isotactic polypropylene, a $C_2$-$C_{40}$ polymer, an elastomer, a random copolymer, an impact copolymer, a tackifier, a crosslinking agent, an antioxidant, a neutralizing agent, a nucleating agent, a filler, an adhesion promoter, a wax, an ester polymer, or a combination thereof. Accordingly, the article precursor may include polypropylene, polyethylene, an elastomer, a styrene-isoprene-styrene polymer, a styrene-butadiene-styrene polymer, a styrene-ethylene/propylene-styrene polymer, a styrene-co-butadiene-styrene polymer, a polyurethane, a woven fabric, polyester, an absorbent, a tissue, an elastomeric material, a superabsorbent polymer, polyvinylchloride, polyvinylidine chloride, polyvinyl acetate, wood, paper, rayon, nylon, cellulosic pulp, cellulosic fluff, or a combination thereof.

Accordingly, the polymer concentrate of the present invention may be used as a masterbatch, as a blend, or alone to produce a disposable article, a consumer good, an article of manufacture, or the like. For example, an article of the present invention may comprise a nonwoven fabric, a non-woven web, a non-elastic nonwoven fabric, an elastic nonwoven fabric, a necked-bonded laminate, a stretch-bonded laminate, a spunbond-meltblown-spunbond laminate, a polypropylene spunbonded layer, a polyethylene layer, a combination polyethylene and polypropylene spunbonded layer, an elastic strand, a woven fabric, a body fluid impermeable backsheet, a body fluid impermeable layer, a body fluid permeable layer, a body fluid permeable cover, an absorbent, a tissue, a polyolefin film, a polyester film, a polyvinylchloride film, a polyvinylidine chloride film, a polyvinyl acetate film, an elastic attachment tape, a frontal tape backing, wood, paper, a barrier film, a film laminate, a nonwoven composite, a textile material, a woven material, a durable fabric, an elastomeric strand, an elastomeric web, a coverstock material, a nonwoven polyethylene, a perforated polyethylene, a filament, a porous web, a fiber, a loop fastener material, an elastic side panel, a fastening tape, an elastic band, a superabsorbent batt, an automotive panel, a decorative panel, a diaper, a fixture, or a combination thereof.

The article precursor of the present invention may thus comprise polybutene, ethylene/vinyl acetate copolymer, polyethylene having a density of 0.915 to less than 0.935 g/cm3, linear polyethylene having a density of 0.915 to less than 0.935 g/cm3, polyethylene having a density of 0.86 to less than 0.90 g/cm3, polyethylene having a density of 0.90 to less than 0.915 g/cm3, polyethylene having a density of 0.935 to less than 0.945 g/cm3, polyethylene having a density of 0.945 to 0.98 g/cm3, ethylene/methyl acrylate copolymer, ethylene/acrylic acid copolymer, polymethylmethacrylate, polyvinylchloride, polybutene-1, isotactic polybutene, acrylonitrile-butadiene-styrene resin, ethylene-propylene rubber, vulcanized ethylene-propylene rubber, ethylene-propylene-diene rubber, styrene-butadiene-styrene (SBS) or styrene-ethylene-butene-styrene (SEBS) block copolymer elastomer, polyamide, polycarbonate, polyethylene terephthalate resin, crosslinked polyethylene, ethylene/vinyl alcohol copolymer, polystyrene, polyester, polyacrylonitrile, polyacetal, polyvinylidine fluoride, polyethylene glycol, polyisobutylene, or a combination thereof.

Those skilled in the art will recognize other unnamed applications and processes which fall within the scope of this invention. It is not our intent to exclude such applications and processes which are apparent in light of our description, but merely offer helpful exemplification of our invention. In an effort to further clarify our invention, we provide a brief history and examples of our own testing. This is provided as exemplification, and not for limitation.

EXAMPLES

Experimental

Molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of the detector calibrations have been described in T. Sun, P. Brant, R. R. Chance, and W. W. Graessley, *Macromolecules*, Volume 34, Number 19, 6812-6820, (2001); Brief descriptions of the components are below.

The SEC with three Polymer Laboratories PLgel 10 mm Mixed-B columns, a nominal flow rate 0.5 cm$^3$/min, and a nominal injection volume 300 microliters was common to both detector configurations. The various transfer lines, columns and differential refractometer (the DRI detector, used mainly to determine eluting solution concentrations) were contained in an oven maintained at 135° C.

The LALLS detector was the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal was sent to a data acquisition board (National Instruments) that accumulates readings at a rate of 16 per second. The lowest four readings were averaged, and then a proportional signal was sent to the SEC-LALLS-VIS computer. The LALLS detector was placed after the SEC columns, but before the viscometer.

The viscometer was a high temperature Model 150R (Viscotek Corporation). It consisted of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer was calculated from their outputs. The viscometer was inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The branching index, also referred to herein as the g' index, was measured using SEC with an on-line viscometer (SEC-VIS) and are reported as g' at each molecular weight in the SEC trace. The g' index is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = K M_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonmer is butene, branches of greater than two carbons should not be present). For a homopolymer of propylene, the GPC should not show branches of more than one carbon atom. When a linear standard is desired for a polymer where the comomoner is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticty as measured by Carbon 13 NMR.

Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the curves were measured and used to determine the heat of fusion and the degree of crystallinity. The percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene. For polymers displaying multiple melting or crystallization peaks, the highest melting peak was taken as peak melting point, and the highest crystallization peak was taken as peak crystallization temperature. For the semi-amorphous polymers, having comparatively low levels of crystallinity, the melting temperature is measured and reported during the first heating cycle. Prior to the DSC measurement, the sample is aged (typically by holding it at ambient temperature for a period of 5 days) or annealed to maximize the level of crystallinity.

Melt flow rate (MFR) determined according to ASTM D1238 (Condition L). Shore A and Shore D hardness determined according to ASTM D2240. Tensile properties, including Tensile Strength, and Strain at Break were determined according to ASTM D-638 at a crosshead speed of 20 in/min. Flexure properties at room temperature were determined according to ASTM D790A, including the 1% Secant Modulus, using a 2 inch support span. VICAT Softening Temperature was determined under 200 gram load according to ASTM D648.

Glass transition temperature, Tg, of the polymeric composition was measured by DMTA (Dynamic Mechanical Thermal Analysis). Tg was determined from the location of the loss tangent maximum. The instrument used was the Rheometrics Solid Analyzer RSA II in the tension mode (0.1% strain, 1 Hz frequency, and 2° C./min heating rate). The sample had a dimension of about 23 mm×6.42 mm×0.7 mm after loading. After molding, the samples were conditioned under ambient conditions for two weeks before the DMTA runs. Density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm$^3$. The units for density are g/cm$^3$.

Pour Point is measured by ASTM D97. Kinematic Viscosity (KV) is measured by ASTM D445. Viscosity index (VI) is determined by ASTM D2270. Color (APHA scale) is determined by ASTM D1209. Specific gravity is determined by ASTM D4052. Flash point is determined by ASTM D92.

The exudation of plasticizer of the samples was evaluated tactilely, wherein the polymer concentrate was tactilely evaluated for the presence of plasticizer on the surface (oily layer or film on the surface), after aging of a week or more at room temperature. The absence of any oily residue on the sample was indicative of no exudation (Pass).

The tacky character of the samples was evaluated tactilely, wherein a sample of the polymer concentrate was pressed between a paper substrate and a clean dry finger, followed by attempting to lift the sample vertically off of the paper substrate with the finger at a rate of about 1 cm per second. A sample which could not be lifted completely off of the paper substrate was given a pass result. A sample which was tacky enough to support its own weight was given a fail result.

The flowability of the materials was evaluated using a method similar in design to ASTM D1895-96 Test method B, which was modified to use a funnel having a 29 mm bottom opening. The modification was made merely to coincide with available testing apparatus. In particular, the test apparatus consisted of a funnel with removable bottom seal and a receiving bin. The funnel had an inner diameter of 73 mm, with a bottom opening of 29 mm. The length of the cone-shape portion of the funnel was 50 mm. ASTM D1895 Test Method B calls for a funnel having a 127 mm ID at the top, and a 25.4 mm ID as the bottom with a frustoconical shape radially disposed about a central axis and extending 230 mm from the top to the bottom. For testing purposes herein, the bottom ID was considered to be significant. The testing procedure was as follows:

1. Load funnel with approximately 500 grams of pellets;
2. Remove bottom seal of the funnel and start time count using a timer,
3. Stop counting when all the pellets had flowed out and record time.

Examples

The present invention, while not meant to be limiting by, may be better understood by reference to the following examples and tables. Polymers and modifiers used in these examples are described in Tables 1-2.

Sample Preparation Methods

Samples were prepared by blending the desired composition, followed by compression molding.

Blending

Two methods were used to generate examples of modified blends. The first method, which is referred to as the Extruder Method, involved "dry blending" polymer granules or pellets with appropriate amounts of modifier and an additive package (including, for example, antioxidants) in a tumble blender to achieve a homogeneous mixing of components at the desired modifier and additive concentrations. This was followed by compounding and pelletizing the blend using an extruder at an appropriate extrusion temperature above the melting point of the polymer, typically in the range of 150 to 220° C. depending on the polymer.

The second method, which is referred to as the Brabender Method. The components were blended using a Brabender. The procedure involved mixing polymer pellets with the plasticizer in a heated C. W. Brabender Instruments Plasticorder to achieve a homogeneous melt at the desired plasticizer concentration. The Brabender was equipped with a Prep-Mixer head (approximately 200 cm$^3$ volume) and roller blades. The operating temperature was above the melting point of the polymer, typically in the range of 180 to 200° C. Polymer was first melted in the Brabender at 60 RPM. Then, while mixing, fluid was added slowly to prevent pooling in the melted polymer. The blend was then mixed for 5 minutes at 60 RPM under a nitrogen purge. The Brabender was opened and the melt removed from the mixing head and blades as quickly as possible, and allowed to solidify.

Compression Molding

The following is a description of a typical compression molding protocol. Material to be molded was preheated at 350° F. with no pressure for 5 minutes. Then 25 tons pressure was applied and held for 6 minutes before controlled cooling started at 27° F./min according to D4703-03.

TABLE 1

List of polymers used in Examples

| Trade name | Description | Source |
| --- | --- | --- |
| Semi-amorphous polymer 1 | Experimental propylene ethylene copolymer having about 16 weight % ethylene, and MFR of about 3 dg/min, an Hf of about 11 J/g, and an isotactic triad fraction of about 90% made using a metallocene catalyst in a solution process at about 70° C. (dimethylsilylbisindenyl hafnium dimethyl with dimethylaniliniumtetrakis (pentafluorophenyl) borate) | ExxonMobil Chemical Company, Houston Texas |
| Exact 5061 | Ethylene octene copolymer produced by metallocene catalyst system having a reported melt index (190° C.) of 0.5 g/10 min, a reported MFR (230° C.) of 0.9 dg/min, a reported density of 0.868 g/cc, a reported melting temperature of 53° C., and a reported Shore A hardness of 65. | ExxonMobil Chemical Company, Houston Texas |
| Exact 5361 | Ethylene octene copolymer produced by metallocene catalyst system having a reported melt index (190° C.) of | ExxonMobil Chemical |

TABLE 1-continued

List of polymers used in Examples

| Trade name | Description | Source |
|---|---|---|
| | 3 dg/min, a reported density of 0.860 g/cc, a reported melting temperature of 36° C., and a reported Shore A hardness of 52. | |
| Exact 5371 | Ethylene octene copolymer produced by metallocene catalyst system having a reported melt index (190° C.) of 5 dg/min, a reported density of 0.870 g/cc, a reported melting temperature of 64° C., and a reported Shore A hardness of 70. | ExxonMobil Chemical |
| PP9302E1 | Random propylene copolymer (RCP) made by a Ziegler-Natta catalyst having about 4 wt % ethylene and a reported MFR of 2.1 dg/min. | ExxonMobil Chemical Company |
| PP3155 | Homopolypropylene produced using a Ziegler-Natta Catalyst system having a reported MFR of 36 g/10 min, a reported density of 0.9 g/cc and a reported Mw/Mn of 2.8, and a melting point of about 161° C. | ExxonMobil Chemical Company Houston, Texas |
| PP1043N | Homopolypropylene produced using a Ziegler-Natta catalyst having a reported MFR of about 5.3 g/10 min, and a melting point of about 162° C. | ExxonMobil Chemical Company Houston, Texas |
| mHPP | Experimental isotactic polypropylene produced using a metallocene catalyst (dimethylsilyl bis (2-methyl-,4-phenylindenyl) zirconium dimethyl with (dimethylaniliniumtetrakis(pentafluorophenyl) borate; at 80° C. in liquid propylene slurry having an MFR of about 7.5 dg/min; peak melting point 152° C.; Mw/Mn < 2.3; additive package consisting of 1000 ppm Irgnox 2215 | ExxonMobil Chemical Company Houston, Texas |
| PP8244E1 | Polypropylene impact copolymer produced using a Ziegler-Natta catalyst system that is then modified with an ethylene polymer. The ICP has a melting point of about 161° C., an MFR of about 27 dg/min, and density of about 0.90 g/cc. | ExxonMobil Chemical Company Houston, Texas |
| AXO3Be3 | Polypropylene impact copolymer produced using a Ziegler-Natta catalyst system with a reported MFR (230° C.) of 35 dg/min and flexural modulus of 1270 MPa. | ExxonMobil Chemical |

TABLE 2

List of modifiers used in Examples

| Fluid | Source | Viscosity @ 40° C., cst | Viscosity @ 100° C., cst | Specific Gravity; 60° F. | Flash point, COC, ° F. | Pour point, ° C. | Molecular Weight |
|---|---|---|---|---|---|---|---|
| SpectraSyn 10 | ExxonMobil Chemical | 66 | 10 | 0.835 | 511 | −48 | 720 |
| SpectraSyn 100 | ExxonMobil Chemical | 1240 | 100 | 0.853 | 541 | −30 | 2830 |
| Paralux 6001 R | ChevronTexaco | 118 | 13 | 0.875 | 525 | −21 | 582 |
| Jayflex DIOA | ExxonMobil Chemical | 9 | — | 0.930 | — | — | 370 |

Examples 1-12

Examples 1-12 in Tables 3 and 4 were prepared using the Brabender method. These compositions contain Semi-amorphous polymer 1 and Exact 5061 with different plasticizer loadings, respectively. Both polymers demonstrate strong capability of fluid incorporation, for instance, Semi-amorphous polymer 1 can incorporate up to 60 wt % SpectraSyn without exudation.

Examples 13-32

Tables 5-9 reveal various compositions of polypropylene/Semi-amorphous polymer 1 blends containing different levels of plasticizers such as SpectraSyn-10, Paralux 6001R and Jayflex DIOA prepared using the Brabender method.

Examples 33-41

Examples 33-37 reveal the impact of the plasticizer loading on pellet flowability. Examples 38-41 demonstrate the good pelletizability of semi-amorphous/semi-crystalline/plasticizer compositions.

TABLE 3

Physical properties of Semi-amorphous polymer 1/SpectraSyn 10 blends

| | Examples | | | | | | | |
|---|---|---|---|---|---|---|---|---|
| | 1 | 2 | 3 | 4 | 5 | 6 | 7 | 8 |
| Plasticizer concentration (wt %) | 0 | 5 | 10 | 20 | 30 | 40 | 50 | 60 |
| MFR (dg/min) | 2 | 3 | 4 | 8 | 20 | 43 | 120 | >150 |
| Shore A Hardness | 67.6 | 65 | 61.4 | 54 | 47.6 | 40 | 29.4 | 18.4 |
| Tensile strength (MPa) | 8.6 | 7.9 | 6.5 | 5 | 3.8 | 2.7 | 1.9 | 1.1 |
| Energy at break (ft-lbf) | 32.8 | 30.8 | 26.1 | 19.5 | 14.7 | 9.9 | 6.3 | 4 |
| 1% Secant modulus (psi) | 1940 | 1749 | 1687 | 1302 | 992 | 731 | 531 | 397 |
| Tg (° C.) | −23.0 | −26.9 | −29.5 | −35.3 | −41.1 | −47.2 | −53.2 | −58.8 |
| Exudation of plasticizer | pass | pass | pass | pass | pass | pass | pass | pass |
| Tacky character | pass | pass | pass | pass | pass | pass | pass | pass |

TABLE 4

Physical properties of Exact 5061/SpectraSyn 10 blends

| | Examples | | | |
|---|---|---|---|---|
| | 9 | 10 | 11 | 12 |
| Plasticizerconcentration (wt %) | 0 | 10 | 20 | 40* |
| MFR (dg/min) | 0.5 | 0.8 | 1.7 | 7.3 |
| Shore A Hardness | 75 | 68 | 64 | 49 |
| Tensile strength (MPa) | 12 | 12 | 9 | 5 |
| Strain at break (%) | 1561 | — | — | — |
| 1% Secant modulus (psi) | 1606 | 1274 | 911 | 456 |
| Exudation of plasticizer | Pass | Pass | Pass | fail |
| Tacky character | Pass | Pass | Pass | fail |

*slight oil blooming

TABLE 5

Mechanical properties of 20/80 PP3155/Semi-amorphous polymer 1 blends with different SpectraSyn 10 loading

| | Examples | | | | |
|---|---|---|---|---|---|
| | 13 | 14 | 15 | 16 | 17 |
| Plasticizer concentration (wt %) | 0 | 10 | 30 | 50 | 60 |
| Density (g/cm³) | 0.870 | 0.866 | 0.858 | <0.853 | <0.853 |
| Shore A Hardness | 78 | 74 | 60 | 42 | 26 |
| Tensile strength (MPa) | 14.8 | 11.9 | 6.4 | 3 | 1.7 |
| Energy at break (ft-lbf) | 58.2 | 50.9 | 27.6 | 13.9 | 6.5 |
| 1% Secant modulus (psi) | 4045 | 2594 | 1149 | 367 | — |
| Exudation of plasticizer | Pass | pass | pass | pass | pass |
| Tacky character | Pass | pass | pass | pass | pass |

TABLE 6

Mechanical properties of 50/50 HPP/Semi-amorphous polymer 1 blends with different SpectraSyn 10 loading

| | Examples | | | |
|---|---|---|---|---|
| | 18 | 19 | 20 | 21 |
| Plasticizer concentration (wt %) | 10 | 26.7 | 43.3 | 60 |
| MFR (dg/min) | 8.4 | 26.0 | 130.0 | 866.0 |
| Shore A Hardness | 87 | 85 | 73 | 51 |
| Tensile Strength (MPa) | 19.6 | 13.5 | 6.3 | 1.4 |
| Strain at break (%) | 1177 | 1164 | 809 | 174 |
| 1% Secant modulus (psi) | 31784 | 13390 | 4402 | 753 |
| VICAT at 200 gram load (° C.) | 140.8 | 130 | 88.8 | 47.1 |
| Exudation of plasticizer | Pass | pass | pass | pass |
| Tacky character | Pass | pass | pass | pass |

TABLE 7

Mechanical properties of 50/50 mHPP/Semi-amorphous polymer 1 blends with different Paralux 6001R loading

| | Examples | | |
|---|---|---|---|
| | 22 | 23 | 24 |
| Plasticizer concentration (wt %) | 10% | 26.7% | 43.3% |
| MFR (dg/min) | 9 | 24 | 164 |
| Shore A Hardness | 82 | 80 | 72 |
| Tensile Strength (MPa) | 16 | 11 | 6.3 |
| Strain at break (%) | 1100 | 900 | 400 |
| 1% Secant modulus (psi) | 38469 | 14788 | 3822 |
| VICAT at 200 gram load (° C.) | 141 | 130 | 87 |
| Exudation of plasticizer | Pass | pass | pass |
| Tacky character | Pass | pass | pass |

TABLE 8

Mechanical properties of 50/50 mHPP/Semi-amorphous polymer 1 blends with different Jayflex DIOA loading

| | Examples | | | |
|---|---|---|---|---|
| | 25 | 26 | 27 | 28 |
| Plasticizer concentration (wt %) | 10 | 26.7 | 43.3 | 60 |
| MFR (dg/min) | 9.4 | 28.2 | 154.0 | 1170.0 |
| Shore A Hardness | — | — | 78.0 | 54.0 |
| Shore D Hardness | 46.0 | 33.0 | 21.2 | — |
| Tensile Strength (MPa) | 19.3 | 13.7 | 7.3 | 1.7 |
| Strain at break (%) | 1119 | 1153 | 729 | 243 |
| 1% Secant modulus (psi) | 34846 | 16522 | 6589 | 989 |
| VICAT at 200 gram load (° C.) | 141 | 131.6 | — | 61.6 |
| Exudation of plasticizer | Pass | pass | pass | pass |
| Tacky character | Pass | pass | pass | pass |

TABLE 9

Mechanical properties of 50/50 ICP PP8244E1/Semi-amorphous polymer 1 blends with different SpectraSyn 10 loading

| | Examples | | | |
|---|---|---|---|---|
| | 29 | 30 | 31 | 32 |
| Plasticizer concentration (wt %) | 10.0 | 26.7 | 43.3 | 60.0 |
| MFR (dg/min) | 8.1 | 27.8 | 126.3 | 920.2 |
| Shore A Hardness | 83.6 | 70.2 | 54.0 | 34.8 |
| Tensile Strength (MPa) | 12.9 | 7.5 | 3.3 | 0.9 |
| Strain at break (%) | 1738 | 1806 | 1453 | 893 |
| 1% Secant modulus (psi) | 7790 | 3356 | 960 | 317 |
| VICAT at 200 gram load (° C.) | 56.5 | 46 | 41.3 | |
| Exudation of plasticizer | Pass | pass | pass | pass |
| Tacky character | Pass | pass | pass | pass |

TABLE 10

Flowability Test results of selected blends

| | Examples | | | | |
|---|---|---|---|---|---|
| | 33 | 34 | 35 | 36 | 37 |
| Composition | Group 1 Semi-amorphous polymer 1/ PP1043N | Group 2 Exact 5061/ PP1043N | Group 3 PP1043N/ Semi-amorphous polymer 1 | Group 4 PP1043N/ Exact 5061 | Group 5 Comparative PP9302E1 |
| Proportions | 80/20 | 80/20 | 80/20 | 70/30 | Neat |
| Physical state | Extruded Pellets | Extruded Pellets | Extruded Pellets | Extruded Pellets | Extruded Pellets |
| SpectraSyn 10 Loading (wt %) | Time (sec) | Time (sec) | Time (sec) | Time (sec) | Time (sec) |
| 0 | 6.7 | 6.0 | 4.0 | 5.2 | 4.5 |
| 15 | — | — | — | — | 18.5 |
| 30 | 6.6 | 7.3 | 6.1 | 7.1 | Fail |
| 50 | 85.0 | Fail | Fail | Fail | Fail |

TABLE 11

Pelletizability of selected blends

| | Examples | | | |
|---|---|---|---|---|
| | 38 | 39 | 40 | 41 |
| semi-amorphous polymer | Exact 5361 | Exact 5371 | Exact 5361 | Exact 5371 |
| semi-crystalline polymer | AXO3BE3 | AXO3BE3 | AXO3BE3 | AXO3BE3 |
| plasticizer | SpectraSyn 10 | SpectraSyn 10 | SpectraSyn 100 | SpectraSyn 100 |
| Proportions (wt %) | 72/8/20 | 72/8/20 | 72/8/20 | 72/8/20 |
| Physical state | Extruded Pellets | Extruded Pellets | Extruded Pellets | Extruded Pellets |
| Pelletizability | Excellent | excellent | excellent | excellent |
| MFR (dg/min; 230° C.) | 31 | 41 | 11 | 16 |

The above examples are provided as exemplification of the present invention, and are not intended to in any way limit the present invention, which is best defined by the appended claims.

Accordingly, the present invention further relates to:

1A. A method to make an article comprising:
combining a semi-amorphous polymer having a heat of fusion of less than 70 J/g with a plasticizer and optionally one or more additives, to produce a polymer concentrate (A), combining the polymer concentrate with one or more polymers (B) to produce an article precursor; and forming the article at least partially from the article precursor.

2A. The method of 1A, wherein the polymer concentrate shows no visible phase separation as demonstrated by the polymer concentrate having no visually detectable loss of the plasticizer on an absorbent surface, after a portion of the polymer concentrate is aged on the absorbent surface for 24 hours at 25° C.

3A. The method of 1A or 2A, wherein the semi-amorphous polymer comprises propylene, and has an mm triad tacticity index of 75% or greater.

4A. The method of 1A, 2A or 3A wherein the polymer concentrate comprises 0.1 to 95 wt % of the semi-amorphous polymer, based upon the weight of the concentrate, preferably 0.5 to 70 wt %, preferably 1 to 50 wt %, preferably 1 to 10 wt %, preferably 5 to 20 wt % of the semi-amorphous polymer.

5A. The method of 1A, 2A, 3A, or 4A wherein the polymer concentrate comprises 1 to 70 wt % of the plasticizer, based upon the weight of the concentrate, preferably 5 to 60 wt %, preferably 10 to 50 wt %, preferably 15 to 50 wt %, preferably at least 50 wt %, preferably 20-50 wt % of the plasticizer.

6A. The method of any of 1A to 5A, wherein the plasticizer comprises a paraffin, a hydrocarbon fluid, a polyalpha olefin oligomer, a polybutene, a mineral oil, a phthalate, a substituted phthalate, a substituted mellitate, a substituted adipate, or a combination thereof, wherein the substitutions comprise $C_1$ to $C_{20}$ hydrocarbons.

7A. The method of any of 1A to 5A, wherein the plasticizer comprises a polyalpha olefin oligomer comprising $C_{20}$ to $C_{1500}$ paraffins.

8A. The method of any of 1A to 5A, wherein the plasticizer comprises a polyalpha olefin comprising linear alpha olefins having 5 to 14 carbon atoms.

9A. The method of any of 1A to 5A, wherein the plasticizer comprises a polyalpha olefin having a mixture of oligomers of two or more alpha olefins selected from alpha olefins having 5 to 24 carbon atoms, preferably a mixture of two or more olefins selected from the group consisting of.

10A. The method of any of 1A to 5A, wherein the plasticizer comprises a polyalpha olefin having a mixture of oligomers of 1-decene.

11A. The method of any of 1A to 10A wherein the plasticizer has a flash point of 200° C. or more, preferably 220° C. or more, preferably 230° C. or more, preferably 250° C. or more.

12A. The method of any of 1A to 11A, wherein the semi-amorphous polymer comprises a first monomer comprising at least 50 wt % ethylene or at least 50 wt % propylene, and at least one other comonomer comprising a $C_2$-$C_{20}$ olefin which is different from the first monomer.

13A. The method of any of 1A to 12A, wherein the semi-crystalline polymer comprises one or more $C_2$-$C_{40}$ poly alpha olefins, preferably polypropylene, polyethylene, isotactic polypropylene having at least 80% [m] dyads, syndiotactic rich polypropylene having at least 80% [r] dyads, or a combination thereof.

14A. The method of any of 1A to 13 wherein the semi-crystalline polymer comprises an ethylene homopolymer or an ethylene copolymer having a composition distribution breadth index of 90% or greater. 15A. The method of any of 1A to 12A, wherein the semi-amorphous polymer comprises an ethylene copolymer having a composition distribution breadth index of 60% to 85%.

16A. The method of any of 1A to 14A, wherein the semi-amorphous polymer comprises 68 to 92 mol % propylene, and 8 to 32 mol % of ethylene, or a $C_4$-$C_{20}$ olefin.

17A. The method of any of 1A to 16A, wherein the semi-amorphous polymer has a weight average molecular weight of 5,000 to 5,000,000, a number average molecular weight of 5,000 to 3,000,000, a z-average molecular weight of 10,000 to 5,000,000.

18A. The method of any of 1A to 17A, wherein the semi-amorphous polymer has a polypropylene crystallinity of about 0.25% to about 15%.

19A. The method of any of 1A to 14A, 16A 17A or 18A, wherein the semi-crystalline polymer is isotactic polypropylene comprising at least 80% [m] dyads.

20A. The method of any of 1A to 19A, wherein the semi-crystalline polymer comprises an ethylene homopolymer or an ethylene copolymer having a composition distribution breadth index of 60% to 85%.

21A. The method of any of 1A to 20A, wherein the semi-amorphous polymer has a melt flow rate of 0.1 to 2000 dg/min, using a 2.16 kg mass at 230° C., preferably 1 to 25 dg/min.

22A. The method of any of 1A to 21A, wherein the semi-amorphous polymer has an intermolecular compositional distribution as determined by thermal fractionation in hexane such that 85% by weight or more of the semi-amorphous polymer is isolated as one or two adjacent, soluble fractions with the balance of the semi-amorphous polymer in immediately preceding or succeeding fractions; wherein each of these fractions has a wt % comonomer content with a difference of no greater than 20 wt % relative to the average wt % comonomer content of the copolymer, wherein the fractions are obtained at temperature increases of approximately 8° C. between stages.

23A. The method of any of 1A to 22A, wherein the semi-amorphous polymer has a 0.1% to less than 35% crystallinity, preferably 1% to less than 20% crystallinity.

24A. The method of any of 1A to 23A, wherein the semi-amorphous polymer has a melting point of 90° C. or less, preferably between 30 and 80° C.

25A. The method of any of 1A to 24A, wherein the plasticizer has a kinematic viscosity at 100° C. of 35 cSt or more, preferably 45 cSt ore more, preferably 50 cSt or more.

26A. The method of any of 1A to 25A wherein the plasticizer has a pour point of −20° C. or less, preferably −25° C. or less, preferably −30° C. or less, preferably −35° C. or less, preferably −40° C. or less, preferably −50° C. or less.

27A. The method of any of 1A to 26A wherein the polymer concentrate comprises an amorphous polypropylene grafted to isotactic polypropylene having a Viscosity of 8000 mPa·sec or less at 190° C. (as measured by ASTM D 3236).

28A. The method of any of 1A to 27A, wherein the article precursor comprises a semi-amorphous polypropylene copolymer and one or more of a $C_2$-$C_{40}$ polymer, an elastomer, a random copolymer, an impact copolymer, a tackifier, a crosslinking agent, an antioxidant, a neutralizing agent, a nucleating agent, a filler, an adhesion promoter, a wax, an ester polymer, or a combination thereof.

29A. The method of any of 1A to 28A, wherein the polymer (B) is polypropylene having a melting point 90° C. or more, isotactic polypropylene, syndiotactic polypropylene, polyethylene, or blends thereof.

30A. The method of any of 1A to 29A, wherein the polymer concentrate (and or the plasticized polymer) is pelletized into a plurality of pourable free flowing particles, (preferably the free flowing particles may be poured through a funnel having a 29 mm bottom opening, preferably the plurality of pourable free flowing particles of the polymer concentrate may be poured through a funnel having a 29 mm bottom opening in 120 seconds or less, preferably 60 seconds or less, preferably 30 seconds or less, preferably 20 seconds or less.

31A. The method of any of 1A to 30A, wherein the plasticizer is miscible with the semi-amorphous polymer as indicated by no change in the number of peaks in the dynamic mechanical thermal analysis trace of the polymer concentrate, as compared to the dynamic mechanical thermal analysis trace of the semi-amorphous polymer.

32A. The method of any of 1A to 31A, wherein the polymer (B) comprises one or more of polybutene, ethylene/vinyl acetate copolymer, polyethylene having a density of 0.915 to less than 0.935 g/cm3, linear polyethylene having a density of 0.915 to less than 0.935 g/cm3, polyethylene having a density of 0.86 to less than 0.90 g/cm3, polyethylene having a density of 0.90 to less than 0.915 g/cm3, polyethylene having a density of 0.935 to less than 0.945 g/cm3, polyethylene having a density of 0.945 to 0.98 g/cm3, ethylene/methyl acrylate copolymer, ethylene/acrylic acid copolymer, polymethylmethacrylate, polyvinylchloride, polybutene-1, isotactic polybutene, acrylonitrile-butadiene-styrene resin, ethylene-propylene rubber, vulcanized ethylene-propylene rubber, ethylene-propylene-diene rubber, (SBS) or styrene-ethylene-butene-styrene(SEBS) block copolymer elastomer, polyamide, polycarbonate, polyethylene terephthalate resin, crosslinked polyethylene, ethylene/vinyl alcohol copolymer, polystyrene, polyester, polyacrylonitrile, polyacetal, polyvinylidine fluoride, polyethylene glycol, polyisobutylene, or a combination thereof.

33A. The method of any of 1A to 32A, wherein the article precursor comprises polypropylene, polyethylene, elastomer, a styrene-isoprene-styrene polymer, a styrene-butadiene-styrene polymer, a styrene-ethylene/propylene-styrene polymer, a styrene-co-butadiene-styrene polymer, a polyurethane, a woven fabric, polyester, an absorbent, a tissue, an elastomeric material, a superabsorbent polymer, polyvinylchloride, polyvinylidine chloride, polyvinyl acetate, wood, paper, rayon, nylon, cellulosic pulp, cellulosic fluff, or a combination thereof.

34A. The method of any of 1A to 33A wherein the semi-amorphous polymer comprises a copolymer comprising at least 50 wt % ethylene, and having up to 50 wt % of a C3 to C20 comonomer, preferably having 1 to 35 wt % of a C3 to C20 comonomer, preferably butene and or hexene and or octene.

35A. The method of 34A wherein the ethylene copolymers have a composition distribution breadth index (CDBI) above 90%, preferably above 95% and, optionally, a melt flow rate at 190° C. of 0.1 to 100 dg/min preferably 0.5 to 50 dg/min.

36A. The method of 34A or 35A wherein the ethylene copolymer is a metallocene polyethylene.

All testing procedures are incorporated by reference herein to the extent they are not inconsistent with this invention. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A method to make an article comprising:
    combining a semi-amorphous polymer having a heat of fusion of between 0.5 and 70 J/g and a melting point of greater than 0° C. and less than 100° C. with a plasticizer and optionally one or more additives, to produce a polymer concentrate, wherein the polymer concentrate is formed into pourable free flowing particles, thereafter combining the polymer concentrate with one or more polymers to produce an article precursor; and
    forming the article at least partially from the article precursor, wherein the plasticizer has a flash point of 200° C. or more and a pour point of −20° C. or less.

2. The method of claim 1, wherein the polymer concentrate shows no visible phase separation as demonstrated by the polymer concentrate having no visually detectable loss of the plasticizer on an absorbent surface, after a portion of the polymer concentrate is aged on the absorbent surface for 24 hours at 25° C.

3. The method of claim 1, wherein the semi-amorphous polymer comprises at least 50 weight % propylene, and has an mm triad tacticity index of 75% or greater.

4. The method of claim 1, wherein the polymer concentrate comprises 0.1 to 95 wt % of the semi-amorphous polymer.

5. The method of claim 1, wherein the polymer concentrate comprises 0.5 to 70 wt % of the semi-amorphous polymer.

6. The method of claim 1, wherein the polymer concentrate comprises 1 to 50 wt % of the semi-amorphous polymer.

7. The method of claim 1, wherein the polymer concentrate comprises 1 to 10 wt % of the semi-amorphous polymer.

8. The method of claim 1, wherein the concentrate further comprises from 1 to 50 weight % of a semi-crystalline polymer, based upon the weight of the composition.

9. The method of claim 1, wherein the polymer concentrate comprises 1 to 70 wt % of the plasticizer.

10. The method of claim 1, wherein the polymer concentrate comprises 5 to 60 wt % of the plasticizer.

11. The method of claim 1, wherein the polymer concentrate comprises 10 to 50 wt % of the plasticizer.

12. The method of claim 1, wherein the polymer concentrate comprises 15 to 50 wt % of the plasticizer.

13. The method of claim 1, wherein the polymer concentrate comprises at least 50 wt % of the plasticizer.

14. The method of claim 1, wherein the polymer concentrate comprises 20-50 wt % of the plasticizer.

15. The method of claim 1, wherein the plasticizer comprises a paraffin, a hydrocarbon fluid, a polyalpha olefin oligomer or a combination thereof.

16. The method of claim 1, wherein the plasticizer comprises a polyalpha olefin oligomer comprising $C_{20}$ to $C_{1500}$ paraffins.

17. The method of claim 1, wherein the plasticizer comprises a polyalpha olefin comprising oligomers of linear alpha olefins having 5 to 24 carbon atoms.

18. The method of claim 1, wherein the plasticizer comprises a polyalpha olefin comprising a mixture of oligomers of two or more $C_5$ to $C_{24}$ alpha olefins.

19. The method of claim 1, wherein the plasticizer has a kinematic viscosity at 100° C. of 5 cSt or more.

20. The method of claim 19, wherein the plasticizer has a flash point of 220° C. or more.

21. The method of claim 19 wherein the plasticizer has a specific gravity of 0.855 or less.

22. The method of claim 19 wherein the plasticizer has a pour point of −30° C. or less.

23. The method of claim 1, wherein the plasticizer has a flash point of 220° C. or more, a kinematic viscosity at 100° C. of 35 cSt or more, and a specific gravity of 0.855 or less.

24. The method of claim 1 wherein the semi-amorphous polymer comprises 97 to 75 weight % propylene, 3 to 25 wt % ethylene and has a heat of fusion of 50 J/g or less and an mm triad tacticity index of 80% or more and wherein the plasticizer has 1) a flash point of 220° C. or more and 2) a kinematic viscosity at 100° C. of 35 cSt or more, or a pour point of −30° C. or less.

25. The method of claim 1 wherein the plasticizer has a VI of 120 or more.

26. The method of claim 1, wherein the article precursor comprises a semi-amorphous polypropylene copolymer, and one or more of a polymer comprising amorphous polypropylene grafted to isotactic polypropylene, a $C_2$-$C_{40}$ polymer, an elastomer, a random copolymer, an impact copolymer, a tackifier, a crosslinking agent, an antioxidant, a neutralizing agent, a nucleating agent, a filler, an adhesion promoter, a wax, an ester polymer, or a combination thereof.

27. The method of claim 1 wherein the polymer to be combined with the concentrate is selected from the group consisting of polypropylene, polyetheylene, and blends thereof.

28. The method of claim 1 wherein the polymer to be combined with the concentrate is selected from the group consisting of polypropylene or polyethylene having a melting point over 100° C.

29. The method of claim 1 wherein the polymer to be combined with the concentrate is selected from the group consisting of isotactic polypropylene, syndiotactic polypropylene, and copolymers of propylene and from 1 to 10 weight % of ethylene.

30. The method of claim 1 wherein the polymer concentrate is formed into a free flowing pellet before it is combined with the polymer.

31. The method of claim 1 wherein the polymer concentrate is pelletized.

32. The method of claim 1, wherein the polymer concentrate is pelletized into a plurality of pourable free flowing particles that can be poured through a funnel having a 29 mm bottom opening as determined using ASTM 1895-method B.

33. The method of claim 32, wherein the plurality of pourable free flowing particles of the polymer concentrate can be poured through a funnel having a 29 mm bottom opening in 120 seconds or less as determined using ASTM 1895-method B.

34. The method of claim 32, wherein the plurality of pourable free flowing particles of the polymer concentrate can be poured through a funnel having a 29 mm bottom opening in 20 seconds or less as determined using ASTM 1895-method B.

35. The method of claim 1, wherein the plasticizer is miscible with the semi-amorphous polymer as indicated by no change in the number of peaks in the dynamic mechanical thermal analysis trace of the polymer concentrate, as compared to the dynamic mechanical thermal analysis trace of the semi-amorphous polymer.

36. The method of claim 1 wherein the semi-amorphous polymer is combined with a semi-crystalline polymer having a melting point of 100° C. or greater, and optionally one or more additives, to produce a carrier composition; thereafter the carrier composition is combined with the plasticizer to produce the polymer concentrate, thereafter the concentrate is formed into a plurality of free flowing particles that are thereafter combined with the one or more polymers to form the article precursor.

37. The method of claim 36, wherein the polymer concentrate shows no visible phase separation as demonstrated by the polymer concentrate having no visually detectable loss of the plasticizer on an absorbent surface, after a portion of the polymer concentrate is aged on the absorbent surface for 24 hours at 25° C.

38. The method of claim 36, wherein the semi-amorphous polymer comprises at least 50 weight % propylene and has an mm triad tacticity index of 75% or greater.

39. The method of claim 36, wherein the plasticizer comprises a paraffin, a hydrocarbon fluid, a polyalpha olefin oligomer or a combination thereof.

40. The method of claim 36 wherein the plasticizer has a flash point of 220° C. or more.

41. The method of claim 40 wherein the plasticizer has a kinematic viscosity of 5 cSt or more at 100° C.

42. The method of claim 36, wherein the particles of the polymer concentrate may be poured through a funnel having a 29 mm bottom opening as determined using ASTM 1895-method B.

43. The method of claim 41, wherein the particles of the polymer concentrate may be poured through a funnel having a 29 mm bottom opening in 120 seconds or less as determined using ASTM 1895-method B.

44. The method of claim 36, wherein the particles of the polymer concentrate may be poured through a funnel having a 29 mm bottom opening in 20 seconds or less as determined using ASTM 1895-method B.

45. The method of claim 36 wherein the semi-amorphous polymer comprises 97 to 75 weight % propylene, 3 to 25 wt % ethylene and has a heat of fusion of 50 J/g or less and an mm triad tacticity index of 80% or more and wherein the plasticizer has a kinematic viscosity at 100° C. of 35 cSt or more.

46. The method of claim 36, wherein the additive includes a polymer comprising amorphous polypropylene grafted to isotactic polypropylene, a $C_2$-$C_{40}$ polymer, an elastomer, a random copolymer, an impact copolymer, a tackifier, a crosslinking agent, an antioxidant, a neutralizing agent, a nucleating agent, a filler, an adhesion promoter, a wax, an ester polymer, or a combination thereof.

47. The method of claim 36, wherein the semi-crystalline polymer comprises polyethylene, isotactic polypropylene having at least 80% [m] dyads, syndiotactic rich polypropylene having at least 80% [r] dyads, or a combination thereof.

48. The method of claim 36, wherein the semi-crystalline polymer is an impact copolymer.

49. The method of claim 36, wherein the article precursor comprises at least one of the following polymers: polybutene, ethylene/vinyl acetate copolymer, polyethylene having a density of 0.915 to less than 0.935 $g/cm^3$, linear polyethylene having a density of 0.915 to less than 0.935 $g/cm^3$, polyethylene having a density of 0.86 to less than 0.90 $g/cm^3$, polyethylene having a density of 0.90 to less than 0.915 $g/cm^3$, polyethylene having a density of 0.935 to less than 0.945 $g/cm^3$, polyethylene having a density of 0.945 to 0.98 $g/cm^3$, ethylene/methyl acrylate copolymer, ethylene/acrylic acid copolymer, polymethylmethacrylate, polyvinylchloride, polybutene-1, isotactic polybutene, acrylonitrile-butadiene-styrene resin, ethylene-propylene rubber, vulcanized ethylene-propylene rubber, ethylene-propylene-diene rubber, block copolymer elastomer, or styrene-ethylene-butene-styrene block copolymer elastomer, polyamide, polycarbonate, polyethylene terephthalate resin, crosslinked polyethylene, ethylene/vinyl alcohol copolymer, polystyrene, polyester, polyacrylonitrile, polyacetal, polyvinylidine fluoride, polyethylene glycol, polyisobutylene, or a combination thereof.

50. The method of claim 36, wherein the semi-amorphous polymer comprises an ethylene homopolymer or an ethylene copolymer having a composition distribution breadth index of 90% or greater.

51. The method of claim 36, wherein the semi-crystalline polymer comprises an ethylene copolymer having a composition distribution breadth index of 60% to 85%.

52. The method of claim 36, wherein the article precursor comprises one or more of the following polymers: polypropylene, polyethylene, an elastomer, a polyurethane, a woven fabric, polyester, an absorbent, a tissue, a superabsorbent polymer, polyvinylchloride, polyvinylidine chloride, polyvinyl acetate, wood, paper, rayon, nylon, cellulosic pulp, cellulosic fluff, or a combination thereof.

53. The method of claim 36, wherein the plasticizer is miscible in the carrier composition as indicated by no change in the number of peaks in the dynamic mechanical thermal analysis trace of the polymer concentrate, as compared to the dynamic mechanical thermal analysis trace of the carrier composition in the absence of the plasticizer.

54. The method of claim 36, wherein the semi-amorphous polymer has a melt flow rate of 0.1 to 2000 dg/min at 230° C./2.16 kg.

55. The method of claim 45, wherein the semi-amorphous polymer has a melt flow rate of 1 to 25 dg/min at 230° C./2.16 kg.

56. The method of claim 45, wherein the semi-amorphous polymer has an intermolecular compositional distribution as determined by thermal fractionation in hexane such that 85% by weight or more of the semi-amorphous polymer is isolated as one or two adjacent, soluble fractions with the balance of the semi-amorphous polymer in immediately preceding or succeeding fractions; wherein each of these fractions has a wt % comonomer content with a difference of no greater than 20 wt % relative to the average wt % comonomer content of the copolymer, wherein the fractions are obtained at temperature increases of approximately 8° C. between stages.

57. The method of claim 36, wherein the semi-amorphous polymer has an Mw/Mn of 1.5 to 4.

58. The method of claim 36, wherein the semi-amorphous polymer has a melting point of 90° C. or less.

59. The method of claim 45, wherein the semi-amorphous polymer has a melting point between 30 and 80° C.

60. A method to produce a film comprising combining a semi-amorphous polymer having a heat of fusion of between 2 and 60 J/g and a melting point of greater than 0° C. and less than 100° C. with a plasticizer and a semi-crystalline polymer having a melting point of 100° C. or more to form a polymer concentrate; thereafter forming the polymer concentrate into free flowing particles; thereafter combining the polymer concentrate particles with a polymer and thereafter forming the combination into a film wherein the plasticizer has a flash point of 200° C. or more and a pour point of −20° C. or less.

61. The method of claim 60 wherein the semi-amorphous polymer comprises 97 to 75 weight % propylene, 3 to 25 wt % ethylene and has a heat of fusion of 50 J/g or less and an mm triad tacticity index of 80% or more and wherein the plasticizer has 1) a flash point of 220° C. or more and 2) a kinematic viscosity at 100° C. of 35 cSt or more, or a pour point of −30° C. or less.

62. A method to produce a non-woven fabric comprising combining a semi-amorphous polymer having a heat of fusion of between 2 and 60 J/g and a melting point greater than 0° C. and less than 100° C. with a plasticizer and a semi-crystalline polymer having a melting point of 100° C. or more to form a polymer concentrate; thereafter forming the polymer concentrate into free flowing particles; thereafter combining the polymer concentrate particles with a polymer and thereafter forming the combination into a non-woven fabric, wherein the plasticizer has a flash point of 200° C. or more and a pour point of −20° C. or less.

63. The method of claim 62 wherein the semi-amorphous polymer comprises 97 to 75 weight % propylene, 3 to 25 wt % ethylene and has a heat of fusion of 50 J/g or less and an mm triad tacticity index of 80% or more and wherein the plasticizer has 1) a flash point of 220° C. or more and 2) a kinematic viscosity at 100° C. of 35 cSt or more, or a pour point of −30° C. or less.

64. A method to produce a molded article comprising combining a semi-amorphous polymer having a heat of fusion of between 2 and 60 J/g and a melting point greater than 0° C. and less than 100° C. with a plasticizer and a semi-crystalline polymer having a melting point of 100° C. or more to form a polymer concentrate; thereafter forming the polymer concentrate into free flowing particles; thereafter combining the polymer concentrate particles with a polymer and thereafter forming the combination into a molded article wherein the plasticizer has a flash point of 200° C. or more and a pour point of −20° C. or less.

65. The method of claim 64 wherein the semi-amorphous polymer comprises 97 to 75 weight % propylene, 3 to 25 wt % ethylene and has a heat of fusion of 50 J/g or less and an mm triad tacticity index of 80% or more and wherein the plasticizer has 1) a flash point of 220° C. or more and 2) a kinematic viscosity at 100° C. of 35 cSt or more, or a pour point of −30° C. or less.

66. The method of claim 30 wherein the pellet is dusted with a polyolefin powder.

67. A process to make an article comprising combining an elastomer and at least 10 wt % of a semi-crystalline polymer, (based upon the weight of the elastomer and the semi-crystalline polymer) with an NFP having a VI of 120 or more, a pour point of −10° C. or less, and a specific gravity of less than 0.86 to form a concentrate, wherein the polymer concentrate is formed into pourable free flowing particles, thereafter combining the concentrate with a polymer to form an article precursor, and thereafter forming an article from the precursor, wherein the elastomer is selected from the group consisting of ethylene propylene rubber, ethylene propylene diene monomer rubber, neoprene rubber, butyl rubber, halobutyl rubber, copolymers of isobutylene and para-alkylstyrene, and halogenated copolymers of isobutylene and para-alkylstyrene.

68. The method of claim 1 wherein the semi-amorphous polymer comprises a copolymer comprising at least 50 wt % ethylene, and having up to 50 wt % of a C3 to C20 comonomer.

69. The method of claim 1 wherein the semi-amorphous polymer comprises a copolymer comprising at least 50 wt % ethylene, and having 1 to 35 wt % of a C3 to C20 comonomer.

70. The method of claim 68 wherein the ethylene copolymers have a composition distribution breadth index (CDBI) above 90%.

71. The method of claim 68 wherein the ethylene copolymers have a composition distribution breadth index (CDBI) above 95% and a melt flow rate at 190° C. of 0.1 to 100 dg/min.

72. The method of claim 68 wherein the ethylene copolymers have a melt flow rate at 190° C. of 0.1 to 100 dg/min.

73. The method of claim 68 wherein the ethylene copolymers have a melt flow rate at 190° C. of 0.5 to 50 dg/min.

74. The method of claim 68 wherein the ethylene copolymer is a metallocene polyethylene.

75. The method of claim 68 wherein the comonomer comprises butene and or hexene and or octene.

76. The method of claim 1 wherein the concentrate comprises at least about 5 wt % plasticizer, and the concentrate is obtained by mixing the semi-amorphous polymer in a single or twin screw extruder at a shear rate of 100 sec$^{-1}$ or more.

77. The process of claim 76 wherein the elastomer is a ethylene propylene rubber or ethylene propylene diene monomer rubber.

78. The process of claim 76 wherein the elastomer is a two (or more) phase system where the elastomer is a discontinuous phase within a continuous phase comprising a semi-crystalline polyolefin.

79. The process of claim 1 wherein the plasticizer has a specific gravity of 0.855 or less and a VI of 120 or more.

80. A method to make an article comprising:
combining a semi-amorphous polymer having a heat of fusion of between 0.5 and 70 J/g and a melting point of greater than 0° C. and less than 100° C. with a plasticizer and optionally one or more additives, to produce a polymer concentrate, wherein the polymer concentrate is formed into pourable free flowing particles, thereafter combining the polymer concentrate with one or more polymers to produce an article precursor; and
forming the article at least partially from the article precursor, wherein the plasticizer is selected from the group consisting of a phthalate, a substituted phthalate, a substituted mellilate, a substituted adipate, or a combination thereof, where the substitutions on the adipate are $C_1$ to $C_{20}$ hydrocarbons.

81. A method to make an article comprising:
combining a semi-amorphous polymer having a heat of fusion of between 0.5 and 70 J/g and a melting point of greater than 0° C. and less than 100° C. with a plasticizer and optionally one or more additives, to produce a polymer concentrate, wherein the polymer concentrate is formed into pourable free flowing particles, thereafter combining the polymer concentrate with one or more polymers to produce an article precursor; and
forming the article at least partially from the article precursor, wherein the plasticizer has a flash point of 200° C. or more and a pour point of −20° C. or less and wherein the semi-amorphous polymer comprises at least 50 wt % ethylene and up to 50 wt % of a C3 to C20 comonomer.

82. The method of claim 81 wherein the plasticizer has a VI of 120 or more and a specific gravity of 0.855 or less.

83. The method of claim 81, wherein the particles of the polymer concentrate may be poured through a funnel having a 29 mm bottom opening in 20 seconds or less as determined using ASTM 1895-method B.

84. A method to make an article comprising:
combining a semi-amorphous polymer having a heat of fusion of between 0.5 and 70 J/g and a melting point of greater than 0° C. and less than 100° C. with a plasticizer and optionally one or more additives, to produce a polymer concentrate, wherein the polymer concentrate is formed into free flowing particles that can be poured through a funnel having a 29 mm bottom opening in 300 seconds or less after storage at 49° C. for 7 days as determined using ASTM 1895-method B, thereafter combining the polymer concentrate with one or more polymers to produce an article precursor; and forming the article at least partially from the article precursor, wherein the plasticizer has a flash point of 200° C. or more, a pour point of −20° C. or less, and a Kinematic viscosity at 100° C. of 4 to 350 cSt.

85. The method of claim 1 wherein the polymer used to produce the article is not the same as the polymer used to make the concentrate.

86. The method of claim 84 wherein the polymer used to produce the article is not the same as the polymer used to make the concentrate.

87. The method of claim 1 wherein the particles of the polymer concentrate may be poured through a funnel having a 29 mm bottom opening in 50 seconds or less after storage at 49° C. for 7 days as determined using ASTM 1895-method B.

88. The method of claim 1 wherein the particles of the polymer concentrate may be poured through a funnel having a 29 mm bottom opening in 30 seconds or less after storage at 49° C. for 7 days as determined using ASTM 1895-method B.

89. The method of claim 1 wherein the particles of the polymer concentrate may be poured through a funnel having a 29 mm bottom opening in 10 seconds or less after storage at 49° C. for 7 days as determined using ASTM 1895-method B.

\* \* \* \* \*